United States Patent [19]
Elms

[11] Patent Number: 5,134,691
[45] Date of Patent: Jul. 28, 1992

[54] BIDIRECTIONAL COMMUNICATION AND CONTROL NETWORK WITH PROGRAMMABLE MICROCONTROLLER INTERFACING DIGITAL ICS TRANSMITTING IN SERIAL FORMAT TO CONTROLLED PRODUCT

[75] Inventor: Robert T. Elms, Monroeville Boro, Pa.

[73] Assignee: Westinghouse Electric Corp., Pittsburgh, Pa.

[21] Appl. No.: 389,924

[22] Filed: Jul. 26, 1989

Related U.S. Application Data

[62] Division of Ser. No. 847,404, Apr. 1, 1986, Pat. No. 5,007,013.

[51] Int. Cl.⁵ .................. G06F 13/36; G06F 13/42; G06F 15/46
[52] U.S. Cl. .................. 395/200; 364/DIG. 2; 364/932.8; 364/926.9; 364/919
[58] Field of Search ... 364/200 MS File, 900 MS File, 364/DIG. 1, DIG. 2; 375/7, 121; 395/200

[56] References Cited

U.S. PATENT DOCUMENTS

| | | | |
|---|---|---|---|
| 4,293,924 | 1/1981 | Struger et al. | 364/900 |
| 4,413,319 | 11/1983 | Schultz et al. | 364/900 |
| 4,456,956 | 6/1984 | El-Gohary et al. | 364/200 |
| 4,644,547 | 2/1987 | Vercellotti et al. | 364/200 |
| 4,833,600 | 5/1989 | Brodsky | 364/200 |
| 4,912,723 | 3/1990 | Verbanets, Jr. et al. | 375/7 |
| 4,974,199 | 11/1990 | Verbanets, Jr. et al. | 364/900 |

Primary Examiner—Thomas C. Lee
Assistant Examiner—L. Donaghue
Attorney, Agent, or Firm—M. J. Moran

[57] ABSTRACT

The invention relates to a bi-directional communication and control system which includes a common network line over which messages are transmitted in a specific message format and a plurality of hardware based digital IC's which are coupled to said common network line and are arranged to receive messages from and transmit messages to said network line in said specific format. Specifically, the invention concerns a multipurpose two-way communication device which is connected to one of said digital ICs, said device being operable in a master mode in which said device interfaces an external controller to said network line through said connected digital IC so that said external controller can act as the master controller for said plurality of digital ICs coupled to said common network line. The multipurpose device is also operable in an expanded slave mode in which a controlled product connected to the multipurpose device is interfaced to said network line through said connected digital IC so that a master controller on said network line can transmit messages to and receive messages from said product through the series combination of said digital IC and said multipurpose device.

1 Claim, 64 Drawing Sheets

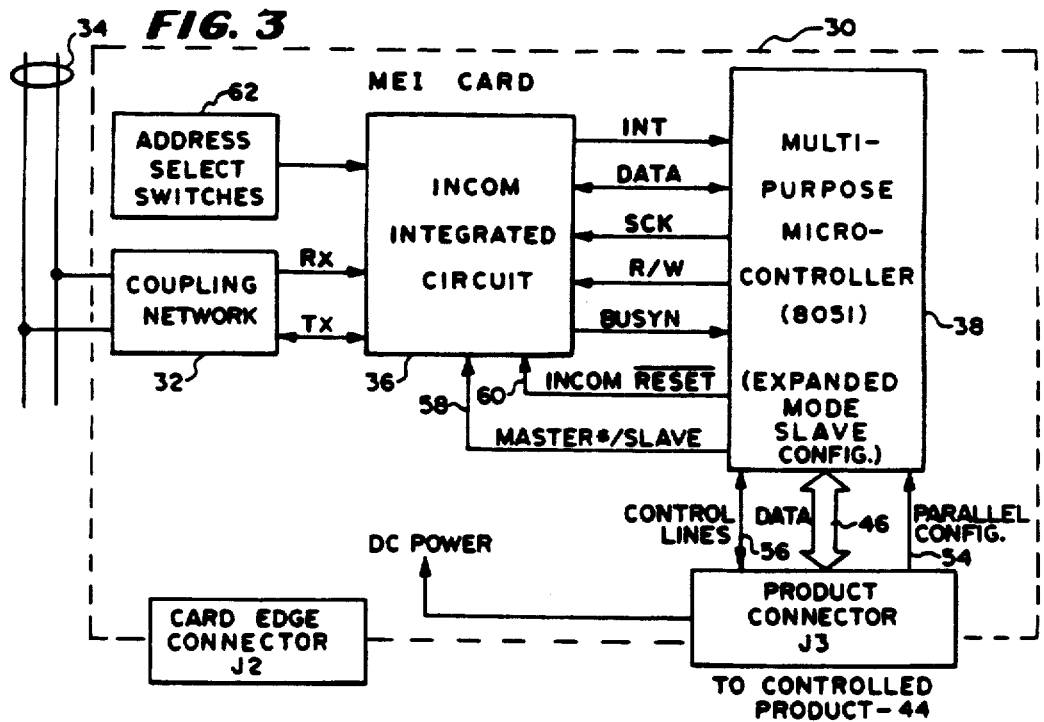
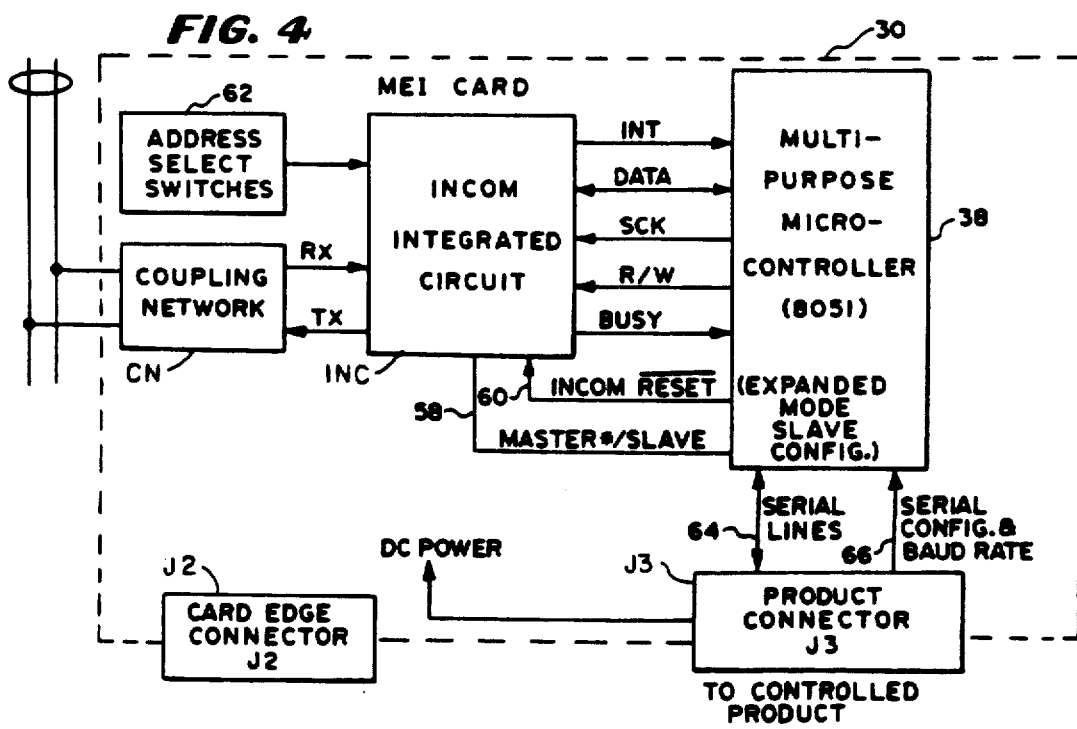

FIG. 7

| INPUT CONT*/DATA | 1 | 2 | OUTPUT CONT*/DATA |
|---|---|---|---|
| OUTPUT ACK* | 3 | 4 | GROUND |
| INPUT STR* | 5 | 6 | GROUND |
| OUTPUT STR* | 7 | 8 | SLAVE PAR*/SER |
| INPUT ACK* | 9 | 10 | RESET* |
| DATA BIT 0 | 11 | 12 | V+ |
| DATA BIT 1 | 13 | 14 | SERIAL OUT |
| DATA BIT 2 | 15 | 16 | SERIAL IN |
| DATA BIT 3 | 17 | 18 | BAUD 0 |
| DATA BIT 4 | 19 | 20 | BAUD 1 |
| DATA BIT 5 | 21 | 22 | BAUD 2 |
| DATA BIT 6 | 23 | 24 | +5V |
| DATA BIT 7 | 25 | 26 | +5V |

MEI PRODUCT* CONNECTOR J3

FIG. 8

| COMPONENT SIDE | | | SOLDER SIDE |
|---|---|---|---|
| GROUND | 15 | 16 | +5V |
| DTR* | 13 | 14 | +5V |
| DSR* | 11 | 12 | RESET* |
| CTS* | 9 | 10 | MASTER*/SLAVE |
| RTS* | 7 | 8 | BAUD 2 |
| RXD | 5 | 6 | BAUD 1 |
| TXD | 3 | 4 | BAUD 0 |
| GROUND | 1 | 2 | V+ |

MEI CARD EDGE CONNECTOR J2

FIG. 9

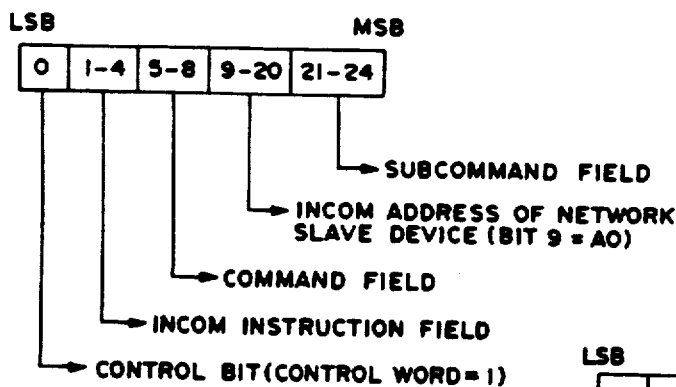

- SUBCOMMAND FIELD
- INCOM ADDRESS OF NETWORK SLAVE DEVICE (BIT 9 = A0)
- COMMAND FIELD
- INCOM INSTRUCTION FIELD
- CONTROL BIT (CONTROL WORD = 1)

FIG. 10

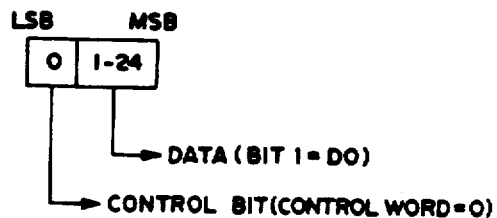

- DATA (BIT 1 = D0)
- CONTROL BIT (CONTROL WORD = 0)

FIG. 22 - BYTE FORMAT
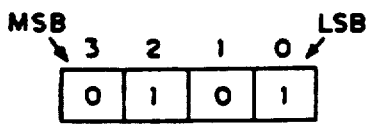
(a) LOWER NIBBLE, BITS 0 THRU 3
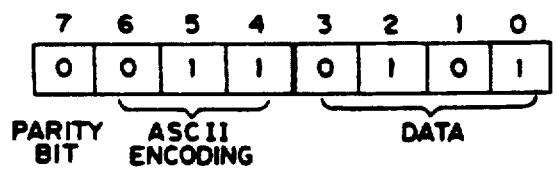
(b) ASCII "ADD-ON" TO NIBBLE
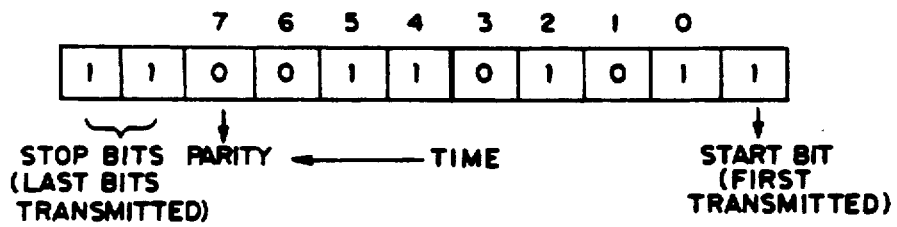
(c) TRANSMITTED BYTE
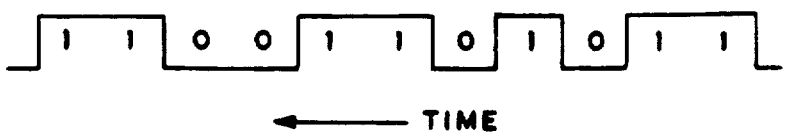
(d) REPRESENTATION OF TRANSMISSION
FIG. 23
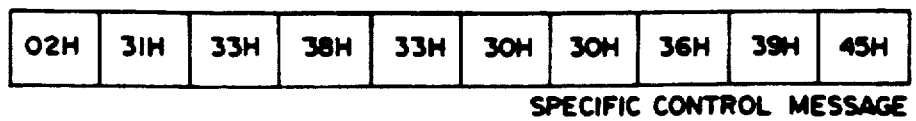
SPECIFIC CONTROL MESSAGE

FIG. 24

LEGAL ASCII CHARACTERS

| CHARACTERS | DESCRIPTION | VALID TRANS. | VALID RECV | HEX CODES | KEYBOARD GENER. |
|---|---|---|---|---|---|
| ALPHABET A THRU F | UPPER CASE ALPHABET CHARACTERS A THRU F | X | X | 41 THRU 46 | A THRU F |
| ALPHABET a THRU f | LOWER CASE ALPHABET CHARACTERS a THRU f | X | X | 61 THRU 66 | a THRU f |
| 0 THRU 9 | NUMERIC CHARACTERS 0 THRU 9 | X | X | 30 THRU 39 | 0 THRU 9 |
| STX | START OF TEXT | X | X | 02 | Ctrl b |
| ACK | ACKNOWLEDGE A 10-BYTE MESSAGE | X |  | 06 | Ctrl f |
| NAK | NEGATIVE ACKNOWLEDGE OF 10-BYTE MESSAGE | X |  | 15 | Ctrl u |
| BS | ERASE LAST CHARACTER RECEIVED | X | X | 08 | Ctrl h |
| RUB | ERASE LAST CHARACTER RECEIVED |  | X | 7F | RUBOUT KEY |
| LF | LINE FEED |  | X | 0A | Ctrl j |
| CR | CARRIAGE RETURN |  | X | 0D | Ctrl m |
| DC2 | TURN ON ECHOING FEATURE OF IQ-2000's COMMUNICATION CARD |  | X | 12 | Ctrl p |
| DC4 | TURN OFF ECHOING FEATURE OF IQ-2000's COMMUNICATION CARD |  | X | 14 | Ctrl t |
| A | ECHO FORMAT ACKNOWLEDGE IN RESPONSE TO THE DC2 AND DC4 CHARACTERS | X |  | 41 | A |
| N | ECHO FORMAT NEGATIVE ACKNOWLEDGE IN RESPONSE TO DC2 AND DC4 CHARACTERS | X |  | 4E | N |
| XOFF | IQ-2000's COMMUNICATION CARD IS BUSY PROCESSING THE PREVIOUS MESSAGE | X |  | 13 | Ctrl s |
| XON | IQ-2000's COMMUNICATION CARD HAS COMPLETED PROCESSING THE PREVIOUS MESSAGE | X |  | 11 | Ctrl q |

FIG. 25
DATA TRANSFER EXAMPLE #1

| EVENT NUMBER | MESSAGE OR CHARACTER BYTES | | | | | | | | | |
|---|---|---|---|---|---|---|---|---|---|---|
| | STX / STX | O / 1/2 | DATA / IC/3 | DATA / C | DATA / SC | DATA / A0 | DATA / A1 | DATA / A2 | CS0 / CS0 | CS1 / CS1 |
| 1 | STX 02 | 1 31 | 3 33 | 8 38 | 3 33 | 3 33 | 2 32 | 0 30 | A 41 | E 45 |
| 2 | ACK 06 | | | | | | | | | |
| 3 | STX 02 | 2 32 | 3 33 | 1 31 | 0 30 | 3 33 | 2 32 | 0 30 | 3 33 | F 46 |
| 4 | STX 02 | 1 31 | 3 33 | 0 30 | 4 34 | 3 33 | 2 32 | 0 30 | 1 31 | F 46 |
| 5 | ACK 06 | | | | | | | | | |
| 6 | STX 02 | 0 30 | 0L 1 31 | 0H 0 30 | 1L A 41 | 1H 4 34 | 2L C 43 | 2H 6 36 | D 44 | D 44 |
| 7 THRU 16 | SECOND THRU ELEVENTH DATA MESSAGE NEEDED TO TRANSMIT THE ENTIRE BUFFER | | | | | | | | | |
| 17 | STX 02 | 2 32 | 3 33 | 1 31 | 0 30 | 3 33 | 2 32 | 0 30 | 3 33 | F 46 |

← DATA
← CONTROL

FIG. 26
DATA TRANSFER EXAMPLE #2

| EVENT NUMBER | MESSAGE OR CHARACTER BYTES | | | | | | | | | |
|---|---|---|---|---|---|---|---|---|---|---|
| | STX / STX | O / 1/2 | DATA / IC/3 | DATA / C | DATA / SC | DATA / A0 | DATA / A1 | DATA / A2 | CS0 / CS0 | CS1 / CS1 |
| 1 | STX 02 | 1 31 | 3 33 | 8 38 | 3 33 | 9 39 | 0 30 | 0 30 | 6 36 | E 45 |
| 2 | ACK 06 | | | | | | | | | |
| 3 | STX 02 | 2 32 | 3 33 | 1 31 | 0 30 | 9 39 | 0 30 | 0 30 | F 46 | E 45 |
| 4 | STX 02 | 1 31 | 3 33 | 1 31 | 6 36 | 9 39 | 0 30 | 0 30 | A 41 | E 45 |
| 5 | ACK 06 | | | | | | | | | |
| 6 | STX 02 | 0 30 | 18L 3 33 | 18H 0 30 | 19L A 41 | 19H E 45 | 20L 2 32 | 20H 4 34 | D 44 | D 44 |
| 7 | STX 02 | 2 32 | 3 33 | 1 31 | 0 30 | 9 39 | 0 30 | 0 30 | F 46 | E 45 |

← DATA
← CONTROL

FIG. 27
DATA TRANSFER EXAMPLE #3

| EVENT NUMBER | MESSAGE OR CHARACTER BYTES ||||||||||  |
|---|---|---|---|---|---|---|---|---|---|---|---|
| | STX | O | DATA | DATA | DATA | DATA | DATA | DATA | CS0 | CS1 | ←DATA |
| | STX | 1/2 | IC/3 | C | SC | A0 | A1 | A2 | CS0 | CS1 | ←CONTROL |
| 1 | STX 02 | 1 31 | 3 33 | 8 38 | 4 34 | 4 34 | 2 32 | 1 31 | 7 37 | E 45 | |
| 2 | ACK 06 | | | | | | | | | | |
| 3 | STX 02 | 2 32 | 3 33 | 1 31 | 0 30 | 4 34 | 2 32 | 1 31 | 1 31 | F 46 | |
| 4 | STX 02 | 1 31 | 3 33 | 2 32 | 1 31 | 4 34 | 2 32 | 1 31 | 0 30 | F 46 | |
| 5 | ACK 06 | | | | | | | | | | |
| 6 | STX 02 | 0 30 | OL 4 34 | OH A 41 | 1L 0 30 | 1H 0 30 | 2L 5 35 | 2H 2 32 | 9 39 | E 45 | |
| 7 | STX 02 | 0 30 | 3L 1 31 | 3H 4 34 | 4L 2 32 | 4H E 45 | 5L 7 47 | 5H F 46 | 3 33 | D 44 | |
| 8 | STX 02 | 2 32 | 3 33 | 1 31 | 0 30 | 4 34 | 2 32 | 1 31 | 1 31 | F 46 | |

FIG. 28
MASTER REQUEST FOR IQ-2000 STATUS

| EVENT NUMBER | MESSAGE OR CHARACTER BYTES ||||||||||  |
|---|---|---|---|---|---|---|---|---|---|---|---|
| | STX | O | DATA | DATA | DATA | DATA | DATA | DATA | CS0 | CS1 | ←DATA |
| | STX | 1/2 | IC/3 | C | SC | A0 | A1 | A2 | CS0 | CS1 | ←CONTROL |
| 1 | STX 02 | 1 31 | 3 33 | 0 30 | 0 30 | 2 32 | A 41 | 4 34 | A 41 | E 45 | |
| 2 | ACK 02 | | | | | | | | | | |
| 3 | STX 02 | 0 30 | 3 33 | 0 30 | STOO 8 38 | 2 32 | A 41 | 4 34 | 3 33 | E 45 | |

FIG.29
MASTER REQUEST FOR MEI CARD STATUS

| EVENT NUMBER | MESSAGE OR CHARACTER BYTES | | | | | | | | | |
|---|---|---|---|---|---|---|---|---|---|---|
| | STX | O | DATA | DATA | DATA | DATA | DATA | DATA | CS0 | CS1 | ←DATA
| | STX | 1/2 | IC/3 | C | SC | A0 | A1 | A2 | CS0 | CS1 | ←CONTROL
| 1 | STX 02 | 1 31 | 3 33 | 0 30 | 8 38 | 4 34 | 5 35 | 3 33 | 6 36 | E 45 |
| 2 | ACK 06 | | | | | | | | | |
| 3 | STX 02 | 0 30 | A 41 | A 41 | 5 35 | 0 30 | 0 30 | 8 38 | D 44 | D 44 |
| 4 | STX 02 | 2 32 | 3 33 | 1 31 | 0 30 | 4 34 | 5 35 | 3 33 | C 43 | E 45 |

FIG.30
MASTER REQUEST TO RESET PRODUCT

| EVENT NUMBER | MESSAGE OR CHARACTER BYTES | | | | | | | | | |
|---|---|---|---|---|---|---|---|---|---|---|
| | STX | O | DATA | DATA | DATA | DATA | DATA | DATA | CS0 | CS1 | ←DATA
| | STX | 1/2 | IC/3 | C | SC | A0 | A1 | A2 | CS0 | CS1 | ←CONTROL
| 1 | STX 02 | 1 31 | 3 33 | 0 30 | 9 39 | 6 36 | 2 32 | 0 30 | 9 39 | E 45 |
| 2 | ACK 06 | | | | | | | | | |
| 3 | STX 02 | 2 32 | 3 33 | 1 31 | 0 30 | 6 36 | 2 32 | 0 30 | 0 30 | F 46 |

FIG.31
MASTER REQUEST TO RESET PRODUCT, DIRECT RESPONSE

| EVENT NUMBER | MESSAGE OR CHARACTER BYTES | | | | | | | | | |
|---|---|---|---|---|---|---|---|---|---|---|
| | STX | O | DATA | DATA | DATA | DATA | DATA | DATA | CS0 | CS1 | ←DATA
| | STX | 1/2 | IC/3 | C | SC | A0 | A1 | A2 | CS0 | CS1 | ←CONTROL
| 1 | STX 02 | 1 31 | 3 33 | D 44 | 0 30 | 2 32 | 1 31 | A 41 | 0 30 | E 45 |
| 2 | ACK 06 | | | | | | | | | |
| 3 | STX 02 | 2 32 | 3 33 | 2 32 | 0 30 | 2 32 | 1 31 | A 41 | A 41 | E 45 |

FIG.32
MASTER REQUEST TO RESET PRODUCT, MEI RESPONSE

| EVENT NUMBER | MESSAGE OR CHARACTER BYTES | | | | | | | | | |
|---|---|---|---|---|---|---|---|---|---|---|
| | STX | O | DATA | DATA | DATA | DATA | DATA | DATA | CS0 | CS1 | ←DATA
| | STX | 1/2 | IC/3 | C | SC | A0 | A1 | A2 | CS0 | CS1 | ←CONTROL
| 1 | STX 02 | 1 31 | 3 33 | 9 39 | 0 30 | 4 34 | 2 32 | 1 31 | A 41 | E 45 |
| 2 | ACK 06 | | | | | | | | | |
| 3 | STX 02 | 2 32 | 3 33 | 1 31 | 0 30 | 4 34 | 2 32 | 1 31 | 1 31 | F 46 |

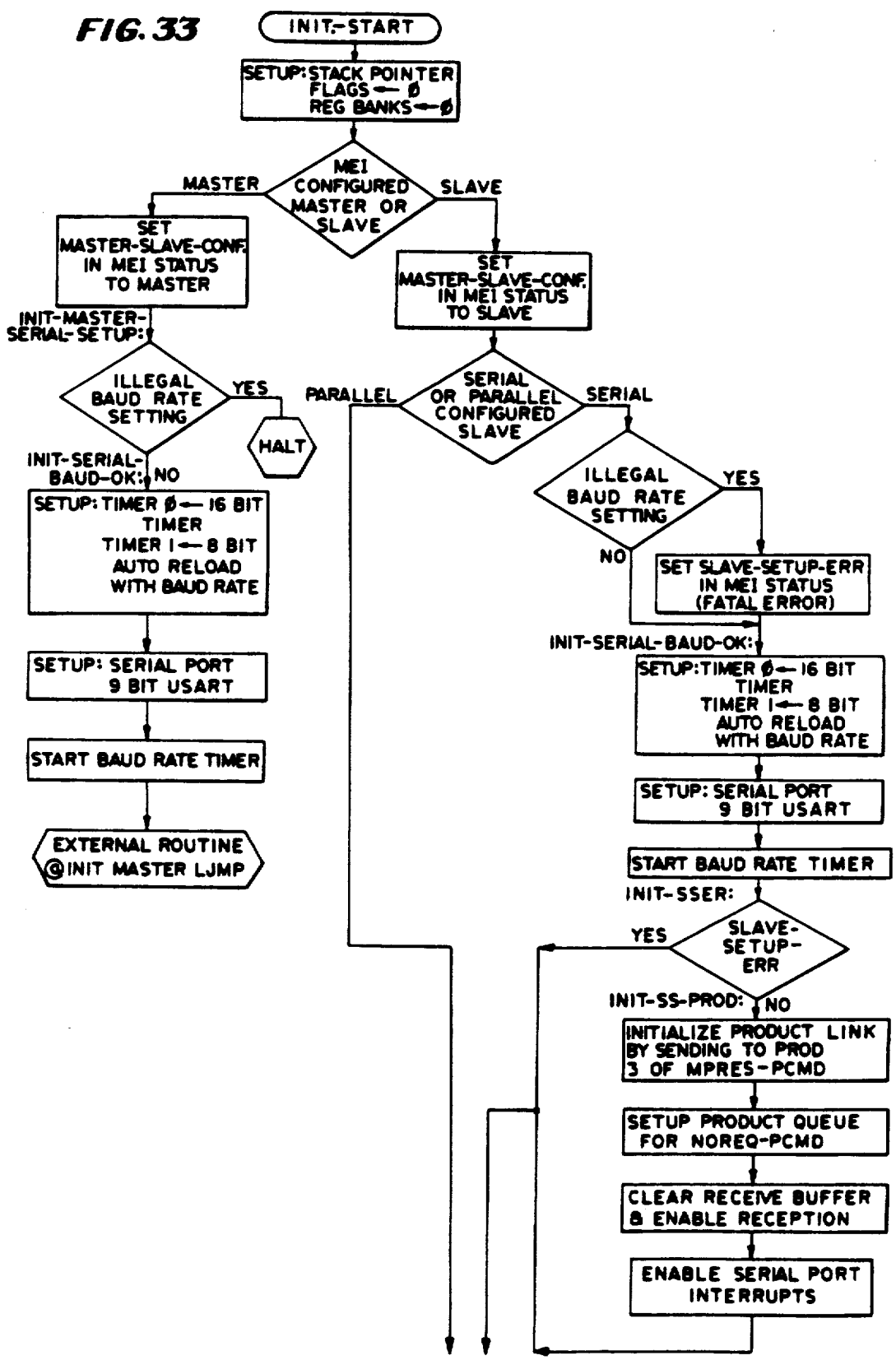

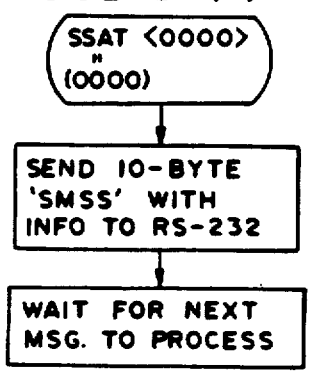
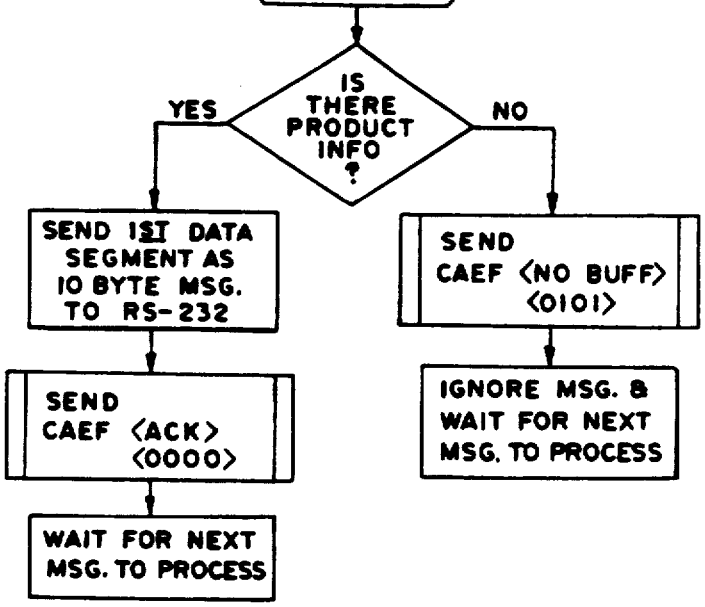
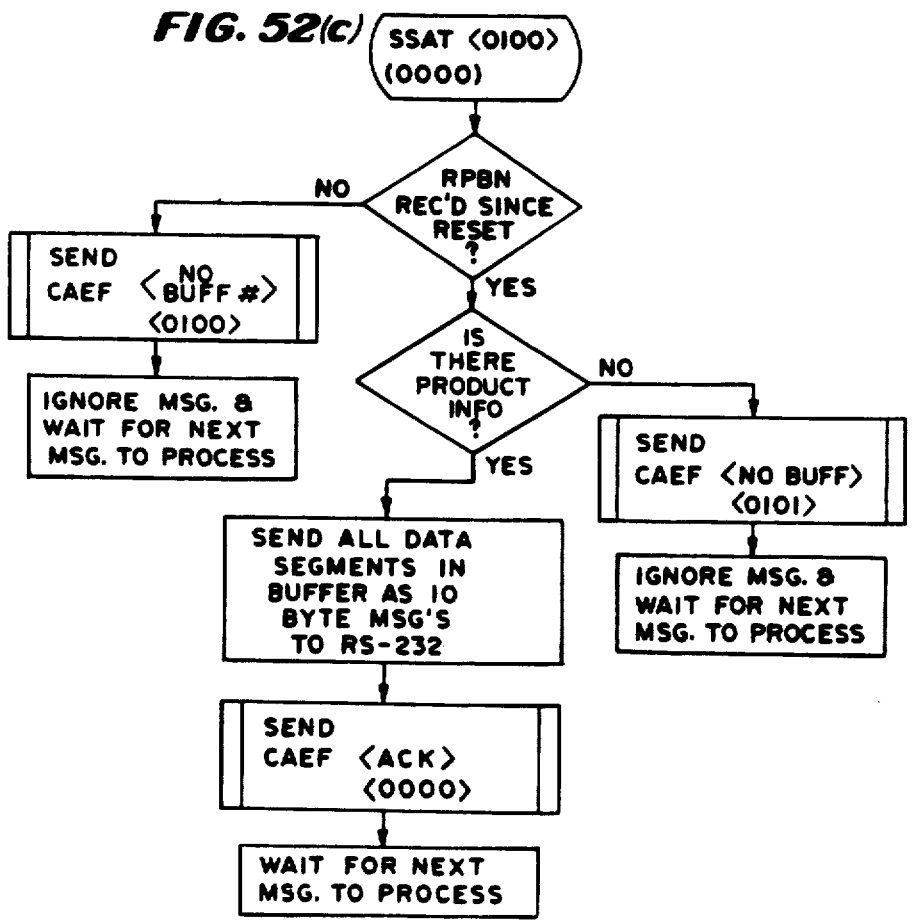

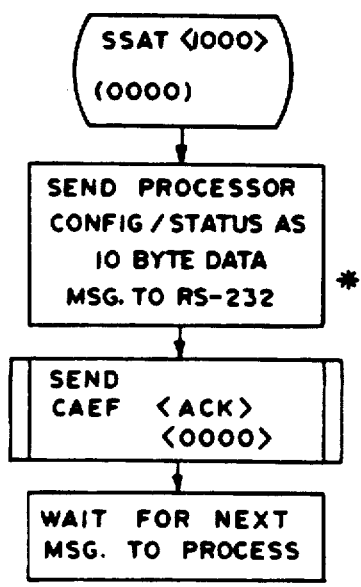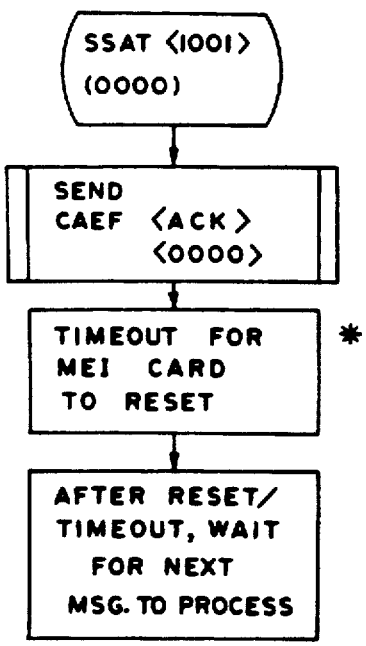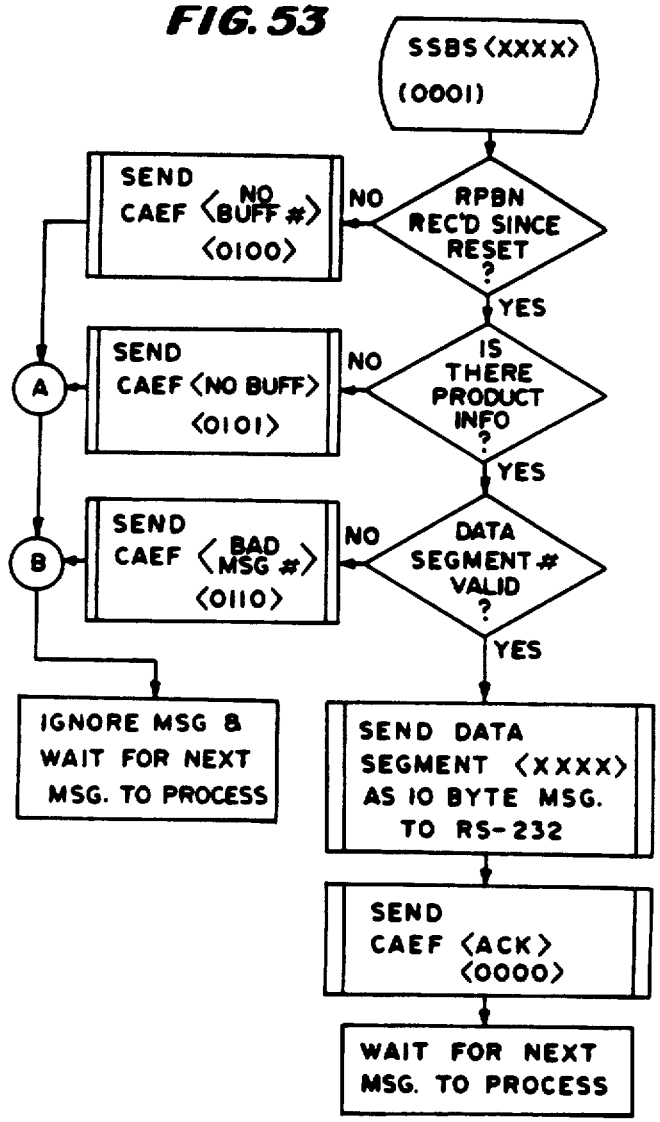

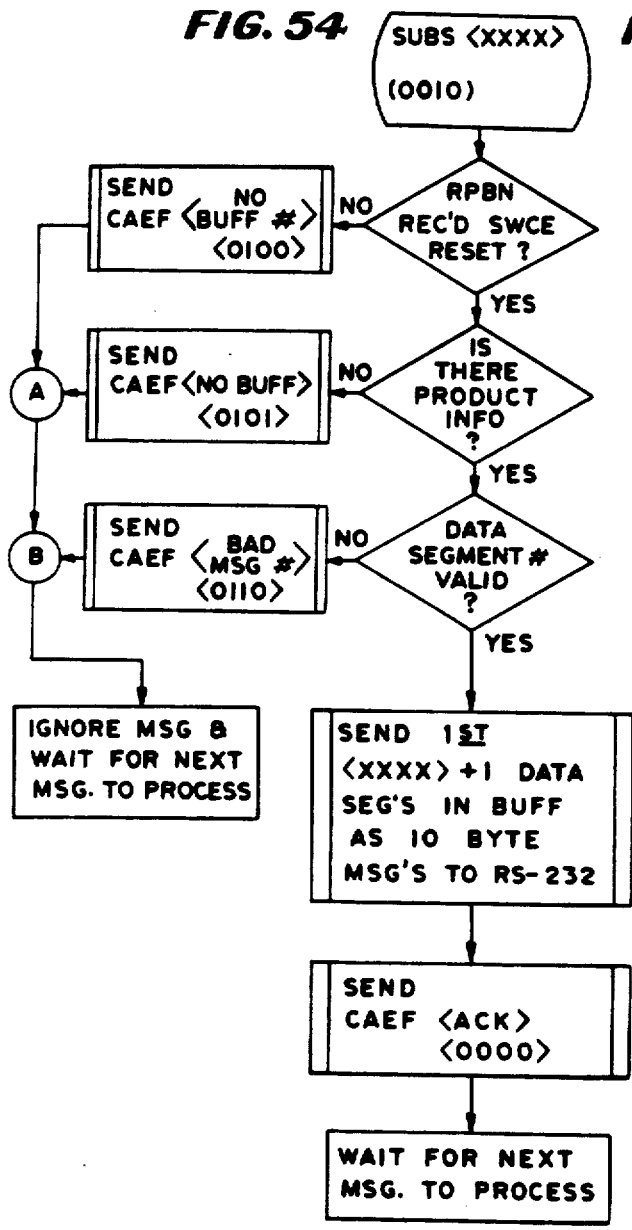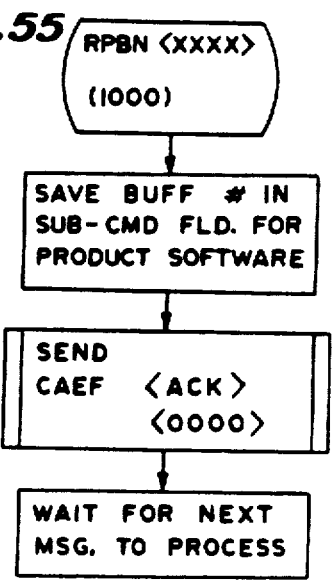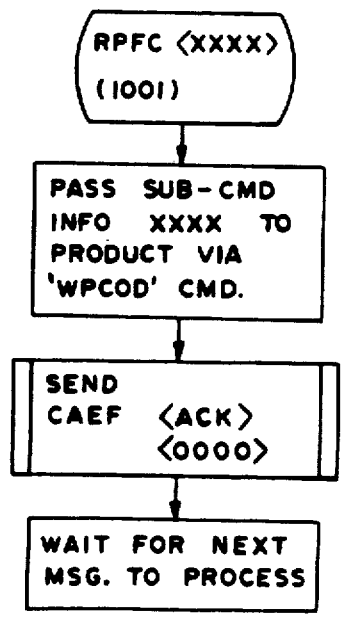
FIG. 54
FIG. 55
FIG. 56

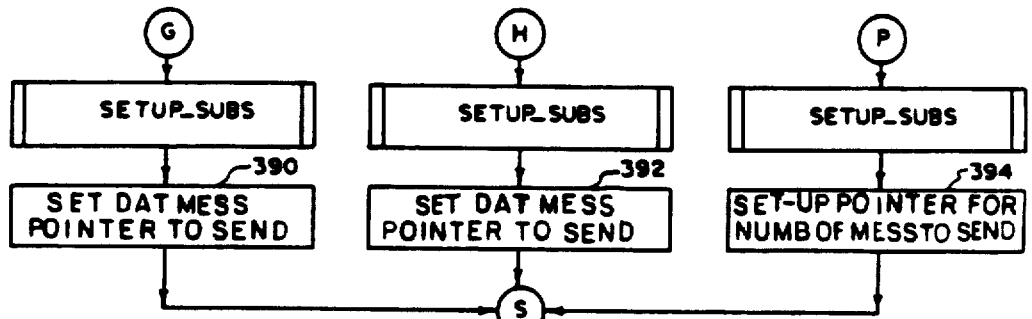
FIG. 69
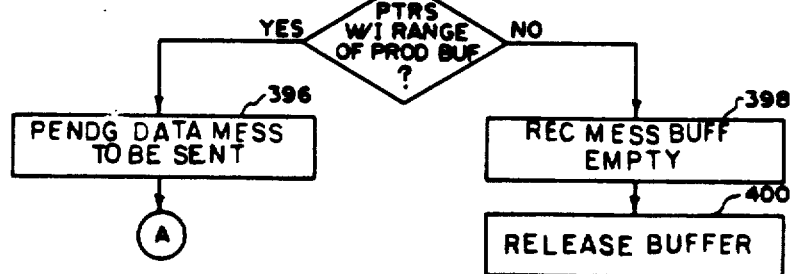
FIG. 70
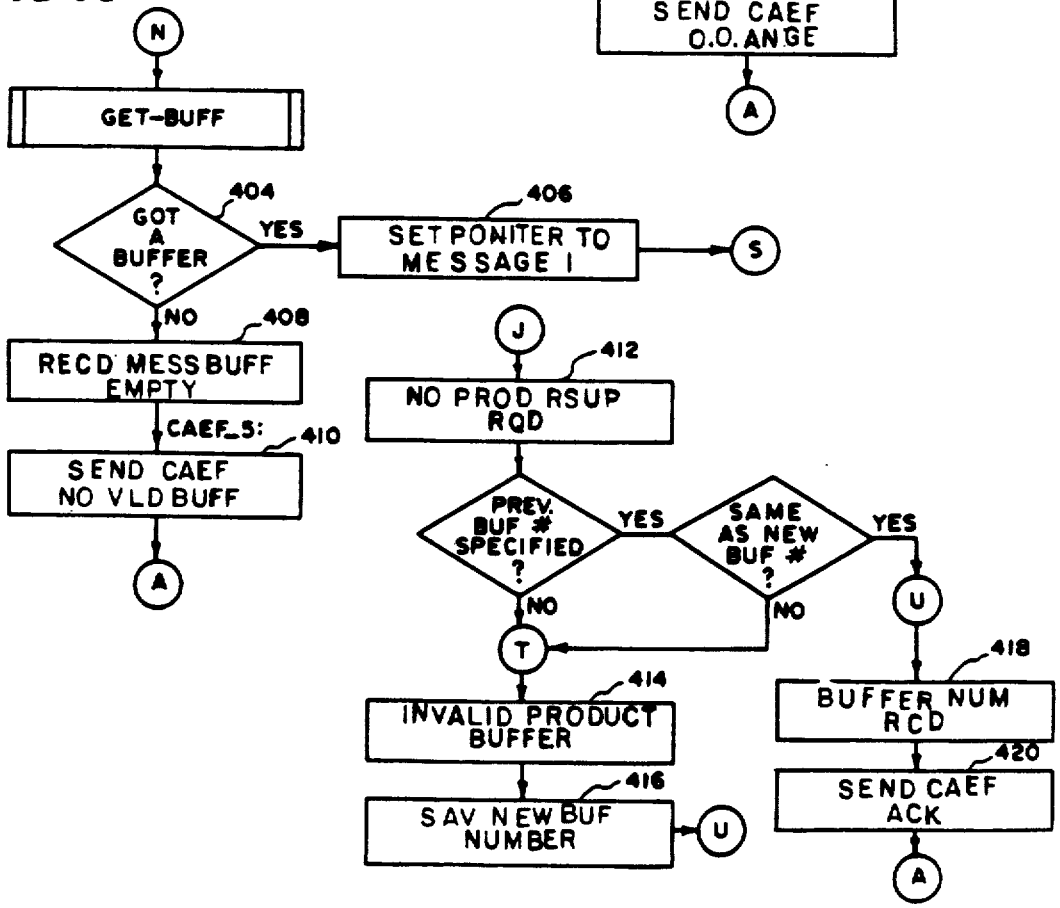

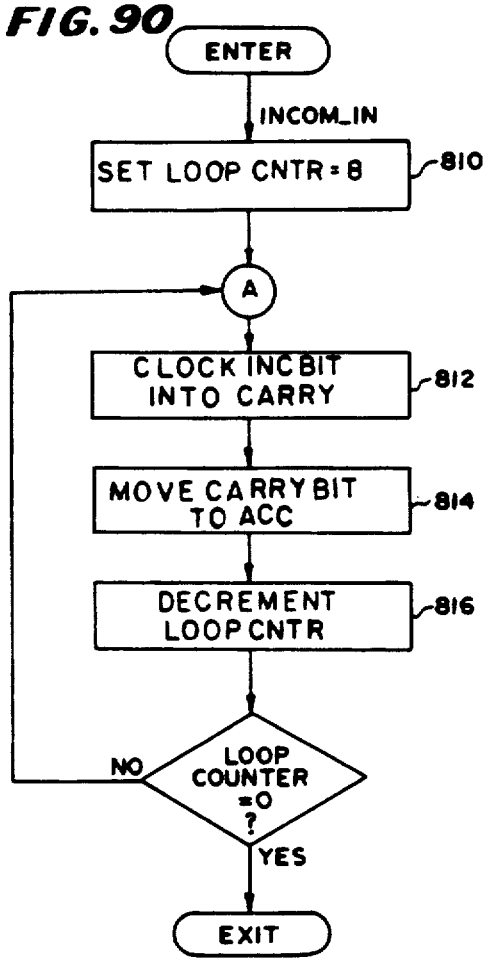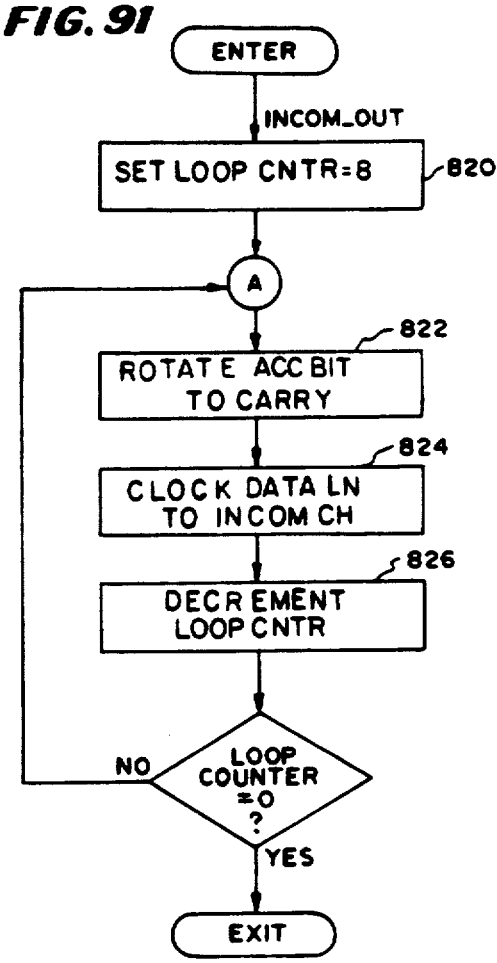

BIDIRECTIONAL COMMUNICATION AND CONTROL NETWORK WITH PROGRAMMABLE MICROCONTROLLER INTERFACING DIGITAL ICS TRANSMITTING IN SERIAL FORMAT TO CONTROLLED PRODUCT

This is a division of application Ser. No. 06/847,404 filed Apr. 1, 1986, now U.S. Pat. No. 5,007,013.

CROSS REFERENCE TO RELATED APPLICATIONS

The invention disclosed herein relates to two-way communication and control systems. The following four commonly assigned United States patent were all filed in the United States Patent and Trademark Office on Jun. 28, 1984 and relate to such communication and control systems: U.S. Pat. No. 4,912,723 issued Mar 27, 1990 to William R. Verbanets and entitled Multipurpose Digital IC for Communication and Control Network U.S. Pat. No. 4,974,109 issued Nov. 27, 1990 to William R. Verbanets and Theodore H. York and entitle Improved Digital IC-Microcomputer Interface U.S. Pat. No. 4,653,072 issued Mar. 24, 1987 to Leonard C. Vercellotti and William R. Verbanets and entitled Low Error Rate Digital Demodulator and U.S. Pat. No. 4,644,547 issued Feb. 27, 1987 to Leonard C. Vercellotti, William R. Verbanets and Theodore H. York entitled Digital Message Format for Two-Way Communication and Control Network. Also, the Patent of James A. Stamatien, Gregory B. Fortune and James S. Gleba, U.S. Pat. No. 4,656,593 issued Apr. 7, 1987, and entitled Multi-Function Load Controller For Carrier Load Control Subsystem is directed generally to such communication and control systems.

BACKGROUND OF THE INVENTION

A. Field of the Invention

The present invention relates generally to two-way communication and control network systems, and, more particularly, to communication and control networks of the type disclosed in the above-identified related applications wherein a communication and control network provides communication between a variety of control devices such as circuit breakers, motor starters, protective relays, remote load controllers, lighting systems, and the like, to communicate with and be controlled by a central or master controller over a common network line. Specifically, the present invention is directed to certain aspects of a communication and control system which employs a multipurpose software based microcontroller which can be operated in a master mode in which the microcontroller interfaces an external host computer, or terminal, to the communication and control network through a hardware-based digital IC of the type disclosed in said above-identified related applications, said microcontroller also being operable in an expanded slave mode in which a controlled product connected to the microcontroller is interfaced to the common network line through the same or similar hardware-based digital IC.

B. Description of the Prior Art

In the communication and control system disclosed in the above-identified related applications control and monitoring is carried out over a network consisting of either the existing power lines or a dedicated twisted pair of lines. The hardware-based digital integrated circuit described in detail in the Verbanets application Ser. No. 625,747 identified above forms the basic building block for such a communication and control network. This digital IC is a twenty-eight pin semi-custom integrated circuit implemented by complementary metal oxide semiconductor (CMOS) technique which provides a simple, low cost interface to the communication and control network. This digital IC, which may also be referred to as an industrial communication (INCOM) integrated circuit, or chip, provides the network interface functions of address recognition, detection and storage of an on-off keyed carrier multi-bit message received from the network, carrier generation and transmission of an on-off keyed carrier message to the network in accordance with the information stored therein, generation and checking of a five bit BCH error checking code, and framing of the received and transmitted messages.

The digital IC, or INCOM chip, may be configured for one of three operating codes: stand alone slave, expanded-mode slave and expanded-mode master. Arbitration of the network is accomplished in a master-slave fashion. The stand alone slave mode is used by simple devices and provides control of a single output line and the return of two status bits from the slave device. The expanded-mode slave is used to interface microprocessor based equipment to the network and will support far more complex communications between the master and the expanded-mode slave. When the INCOM chip is operated in an expanded master mode, the INCOM device may be used as a direct interface to the master or central controller of the network. However, in many instances it is desirable that the network master use a conventional RS232C serial link or equivalent, to communicate with the stand alone slaves and enabled mode slaves on the network. The ASCII protocol normally used with such a serial link is, however, not compatible with the 33 bit message format employed by the INCOM network. Accordingly, this severely limits the types of computers or terminals which can be used as a master or central controller for the INCOM network.

When the INCOM chip is operated in the expanded slave mode it may be used as a direct interface to a microprocessor controlled product. However, in many instances the microprocessor associated with the controlled product may be quite busy and hence cannot be directly coupled to the network through the INCOM chip. This is particularly true of products such as motor starters and controllers in which many different variables, such as rotor winding temperature, bearing temperature, ground fault, overcurrent, locked rotor current, and underload and overload voltages may be monitored and/or controlled. Furthermore, even if the microprocessor associated with a controlled product is relatively inactive, it is in many instances desirable to provide an intermediate buffer interface between the INCOM chip and the controlled product so that a major design change or reprogramming of the microprocessor associated with the product is not required in order to utilize the INCOM network.

SUMMARY OF THE INVENTION

Briefly considered, the present invention is directed to certain aspects of a microcontroller based expanded mode interface (MEI) unit which can be readily adapted to act either as a master interface between an INCOM chip operating in the expanded master mode and a host computer or terminal, or to act as an intermediate interface between an INCOM chip operating in the expanded slave mode and a microprocessor based controlled product. This multipurpose microcontroller can then be used as a universal interface for the INCOM network chip operating in either the expanded master mode or the expanded slave mode.

In order to provide a low cost multipurpose unit, the universal interface preferably comprises a single microcomputer, such as an INTEL 8051, or equivalent, which is suitably programmed by selectable software programs to operate in either the expanded master mode or the expanded slave mode. Since this software is in a single device low cost can be achieved by mask programming this software. Preferably, the microcomputer is physically mounted with an INCOM chip and its coupling network on a suitable printed circuit board or card, this MEI card then being positionable in any desired location relative to either the controlled product or the host computer or terminal by simply connecting it to the existing power lines or a dedicated twisted pair.

When operating in the master interface mode this universal interface receives a message over an RS232C link which complies with all of the mechanical, electrical and protocol requirements of a standard RS232C serial port. This message is then stripped of the RS232C protocol and transferred in segments compatible with the INCOM chip requirements and the 33 bit message format used by the INCOM network. Similarly, messages from the network are in turn translated to ASCII format before being passed to the host computer or operator on a terminal, so that access to the INCOM network is provided through conventionally equipped RS232C equipment. This arrangement thus makes the INCOM network protocol transparent to the host computer or operator who is acting as a network master. When operated in the expanded master mode the MEI card is also capable of adapting to different BAUD rates over the RS232C's serial link, these BAUD rates being selectable in accordance with the particular requirements of the host computer or terminal which is acting as the master device for the INCOM network.

When the universal MEI card is operated in the expanded slave mode it provides information from and to a controlled product at the request of the master device on the INCOM network. The microcontroller in the MEI card processes requests from the network master and performs all exchange procedures with the controlled product. Information from the controlled product is taken continuously by the expanded slave mode MEI card and stored in the 8051's RAM. A parallel data interface to the controlled product is accomplished by using one of the microcontroller's 8 bit bidirectional ports. Segments of the other ports are used as control and status lines between the MEI card and the controlled product. The protocol between the MEI card and the controlled product is based on the MEI card initiating all interactions with the product. The MEI card may process any one of sixteen separate product buffers at any instant, as selected by the network master. The information obtained by the MEI card is passed to the master only upon request from the master. The MEI card may thus be used with different microprocessor controlled products and permits these products to utilize the INCOM network by buffering the data from the various control parameters of the product and adding the necessary protocol.

BRIEF DESCRIPTION OF THE DRAWINGS

The invention, both as to its organization and method of operation, together with further objects and advantages thereof, will best be understood by reference to the accompanying specification taken in connection with the accompanying drawings in which:

FIG. 3 is a block diagram of this interface when operating in the expanded slave mode and interfacing the controlled product in a parallel data format;

FIG. 4 is a block diagram of this interface when operating in the expanded slave mode and interfacing the controlled product in a serial data format;

FIG. 7 shows the pin connections of the interface-product connector;

FIG. 8 shows the pin connections of the interface card edge connector which is employed in the expanded master mode of the interface;

FIG. 9 is the message bit format of the control message sent by the INCOM master to any one of the stand alone slaves or expanded mode slaves on the INCOM network;

FIG. 10 is the message bit format of a data message sent over this network;

FIG. 22 shows the bit formation in a typical byte format shown in FIG. 21;

FIG. 23 shows the message byte format for a typical specific control message;

FIG. 24 is a table of the limited ASCII characters employed in the RS232C serial master arrangement of FIG. 20;

FIGS. 25-32 are event transmission tables illustrating typical byte formats utilized in message transmissions in the system of FIG. 20;

FIGS. 33 and 34, when placed in vertical alignment, and FIG. 35 comprise a flow chart of the logic flow during the initialization phase of the INCOM software program of the multi purpose interface;

FIGS. 50, 51, 52a, 52b, 52c, 52d, 52e, and 53-59 are generalized flow charts giving an overview or logic flow when the multipurpose interface is in a master/product configuration;

FIGS. 66-75 comprise a detailed flow chart of the POLL-RCV-MSG routine used in the master/product program;

FIG. 90 is a detailed flow chart of the INCOM-IN subroutine which is used in the master/INCOM program; and FIG. 91 is a detailed flow chart of the INCOM-OUT subroutine which is used in the master/INCOM program.

DESCRIPTION OF THE PREFERRED EMBODIMENT

Figure 1:
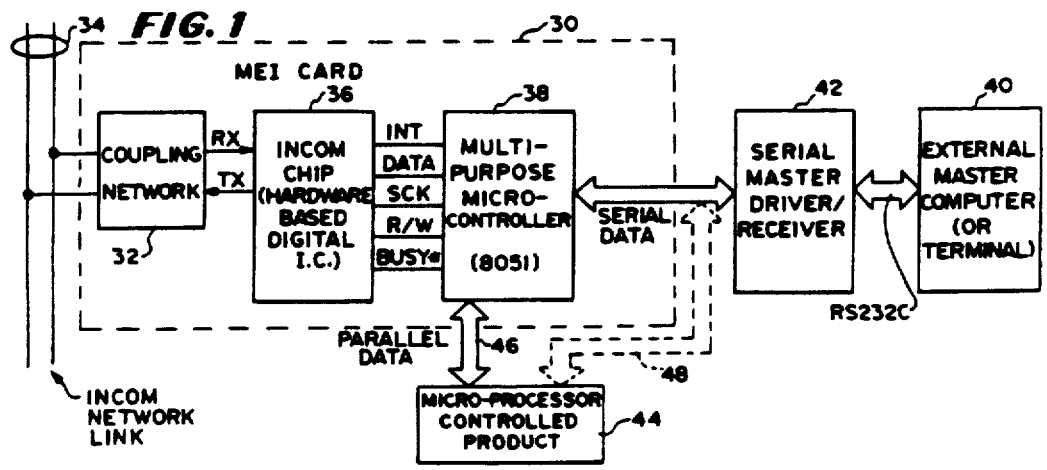
FIG. 1 is an overall block diagram of the universal microcontroller-based expanded-mode interface arrangement of the present invention.

Referring now to the drawings, and more particularly to the block diagram of FIG. 1, the microcontroller based expanded mode interface (MEI) card 30 is illustrated therein as comprising a coupling network 32 which is employed to couple the common INCOM network link lines 34 to an INCOM chip, or hardware based digital integrated circuit 36, which is preferably of the type described in detail in Verbanets application Ser. No. 625,747 referred to heretofore. The five interface lines of the INCOM chip 36 are connected to a multipurpose microcontroller 38 which preferably comprises an INTEL type 8051 8-bit microcontroller.

When the microcontroller 38 is programmed with the specific listing attached hereto it is capable of operating in either an expanded master mode or an expanded slave mode. In the expanded master mode the microcontroller 38 is arranged to receive serial data from the RS232C output port of an external master or host computer 40 through a serial master driver/receiver 42 which provides the required electrical isolation and level conversion for coupling the RS232C output of the computer 40 to the microcontroller 38.

When the microcontroller 38 is operated in the expanded slave mode it supplies data to and receives data from an external microprocessor controlled product 44. Data transmission between the microcontroller 38 and the controlled product 44 can take place either in a parallel data format over the parallel data bus 46 or in a serial data format using the full duplex serial channel of the microcontroller 38, as indicated in dotted lines by the serial data bus 48. However, the serial channel 48 is not used when the microcontroller 38 is operated in the expanded master mode.

In accordance with a further aspect of the present invention, when the MEI card 30 is operated in the expanded master mode it is also arranged to provide communication directly between one controlled product, such as the product 44, and a device compatible with RS232C standards such as the external master 40. Such direct communication may be provided independently of the INCOM network in which case the coupling circuit 12 (FIG. 5) is not connected to the common network line 34. The RS232C device may be a programmable controller which can monitor the status of the controlled product. However, the programmable controller must be capable of transmitting and receiving ASCII characters. In the alternative, the RS232C device may comprise an IBM personal computer, or equivalent, which can be used for maintenance or debugging of the MEI card, or a dumb terminal which can generate ASCII characters for this purpose. Preferably, the programs shown in the attached listing are all incorporated in one mask programmed ROM device which can be manufactured at low cost to provide all of the above-described functions of the multipurpose microcontroller 38.

The multipurpose microcontroller 38 is placed in the expanded master mode by means of a control signal supplied from the external master computer 40, or by means of a jumper on the MEI card 30, and interfaces the INCOM chip 36 to the external master or host computer 40 so that the computer 40 can act as the master for the INCOM network and supply command and data messages to any of the stand alone slaves or expanded mode slaves connected to the link 34. In the alternative, when the microcontroller 38 is operated in the expanded master mode, the external master computer 40 can communicate directly with the microprocessor controlled product 44 through the parallel data bus 46 without using the INCOM network link 34.

Preferably, the serial master driver/receiver 42 is not included on the MEI card 30 but instead is connected to a card edge connector on the MEI card 30 whenever it is desired to operate the multipurpose microcontroller 38 in the expanded master mode. With such an arrangement the MEI card 30 may be used in the expanded slave mode with various types of microprocessor controlled products, such as the product 44, without purchasing the serial master driver/receiver 42 which is required only for the expanded master type of operation of the microcontroller 38. To this end, the microcontroller 38 is normally operated in the expanded slave mode and a control signal is supplied from the external master computer 40 (or by means of a jumper on the MEI card 30) to cause the microcontroller 38 to operate in the expanded master mode. More particularly, as shown in the more detailed block diagram of FIG. 2 wherein the MEI card 30 is shown in greater detail, when operated in the expanded master mode, the card edge connector J2, which is provided on the edge of the card 30, includes a pin for the master configuration control line 50 which is supplied from the external master computer 40, the microcontroller 38 responding to this master configuration control signal by selecting the software required for its operation in the RS232C expanded master mode. The microcontroller 38 is also arranged to respond to control signals on the baud rate conductors 52, which signals may be supplied from the external master computer 40 through the serial master driver/receiver 42 to the card edge connector J2, or by means of jumpers on the serial master card 42, so that any one of a number of baud rates can be established at which data can be transmitted in either direction over the serial link between the master computer 40 and the microcontroller 38.

The MEI card 30 is also provided with a product connector J3, having the pin connections shown in FIG. 7, which is employed for the transmission of both control and data messages between the microcontroller 38 and the controlled product when either a parallel data format or a serial data format is employed. The use of either the parallel data format or the serial data format is controlled by the controlled product which supplies a control signal to the microcontroller 38 indicating which data format is to be used. However, in the expanded master mode shown in FIG. 2 the parallel data format must be used between the controlled product 44 and the microcontroller 38 since the serial data channel of the microcontroller 38 is employed for transmitting and receiving signals from the external master 40 over its RS232C port. Accordingly, in the expanded master mode of FIG. 2, the controlled product 44 supplies parallel configuration signal over the conductor 54 and the microcontroller 38 responds thereto by transmitting and receiving data over the parallel data bus 46 and transmitting and receiving control signals over the control lines 56. In the expanded mode master configuration of FIG. 2 the microcontroller 38 also forces the INCOM chip 36 to operate in its expanded master mode by supplying a control signal over the MASTER*/SLAVE control line 58. The microcontroller 38 also provides an INCOM reset signal over the control line 60 to reset the INCOM chip 36 under certain conditions, as will be described in more detail hereinafter.

In the expanded mode slave configuration the microcontroller 38 is adapted to function with the controlled product 44 in either a parallel data format or a serial data format. The parallel data format connections for the MEI card 30 when operated in the expanded slave mode configuration are shown in FIG. 3. Referring to this figure, the connections between the card edge connector J2 and the microcontroller 38 are omitted for simplification. When no signal is present on the master configuration control line 50 (FIG. 2), the microcontroller 38 pulls the MASTER*/SLAVE control line 58 high so that the INCOM chip 36 is also operated in its expanded slave mode. In this mode the INCOM chip 36 responds to INCOM network messages which include an address portion corresponding to the setting of the address select switches 62, as described in detail in said copending Verbanets application Ser. No. 623,747. In this connection it will be understood that the address select switches 62 are physically a part of the MEI card 30 in the expanded mode master configuration of FIG. 2 but the INCOM chip 36 is controlled by the signal on the control line 58 to receive all network messages on the common network line 34, regardless of the address portions thereof and does not respond to the setting of the address select switches 62. In the parallel data format configuration of FIG. 3 the microcontroller 38 responds to a parallel configuration signal on the line 54 from the controlled product 44 by enabling the parallel data bus 46 and parallel data control lines 56 for bidirectional transmission between the microcontroller 38 and the controlled product 44.

In some situations it may be desirable to operate the MEI card 30 in an expanded mode slave configuration and adapt the microcontroller 38 to a serial data format for transmission and reception of data from the controlled product 44. This configuration is shown in FIG. 4 in block diagram form wherein the conductors from the card edge connector J2 are omitted since no master controller is connected to the card edge connector J2 in the expanded mode slave configuration. In the serial data arrangement of FIG. 4 the product connector J3 is arranged to receive bidirectional serial data over the serial lines 64 from the controlled product. Specifically, the serial lines 64 are connected in parallel to the serial transmit and receive lines of the card edge connector J2 so that the serial data transmission channel of the microcontroller 38 is used by the controlled product in the arrangment of FIG. 4. Also, the controlled product supplies a serial configuration signal and baud rate signals over the lines 66 to the microcontroller 38. The microcontroller 38 responds to these signals by enabling its serial data transmission channel and responding to the baud rate signals by accepting the designated baud rate from the controlled product.

MEI CARD HARDWARE

Figure 2:
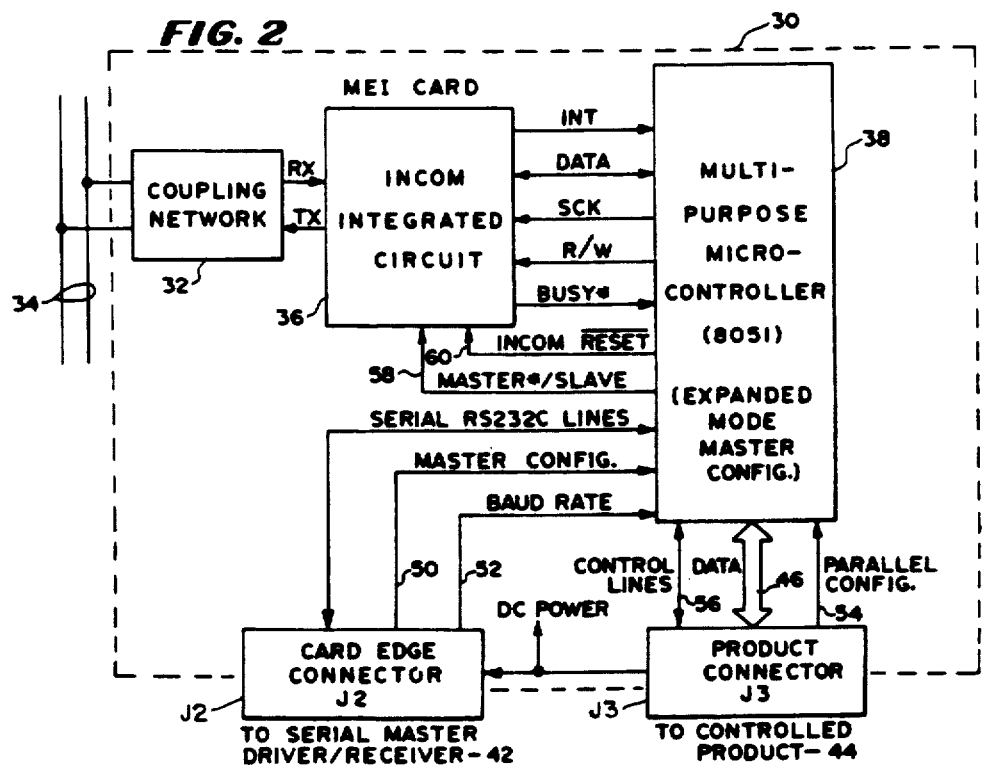
FIG. 2 is a more detailed block diagram of this interface when operating in the expanded master mode.
Figure 5:
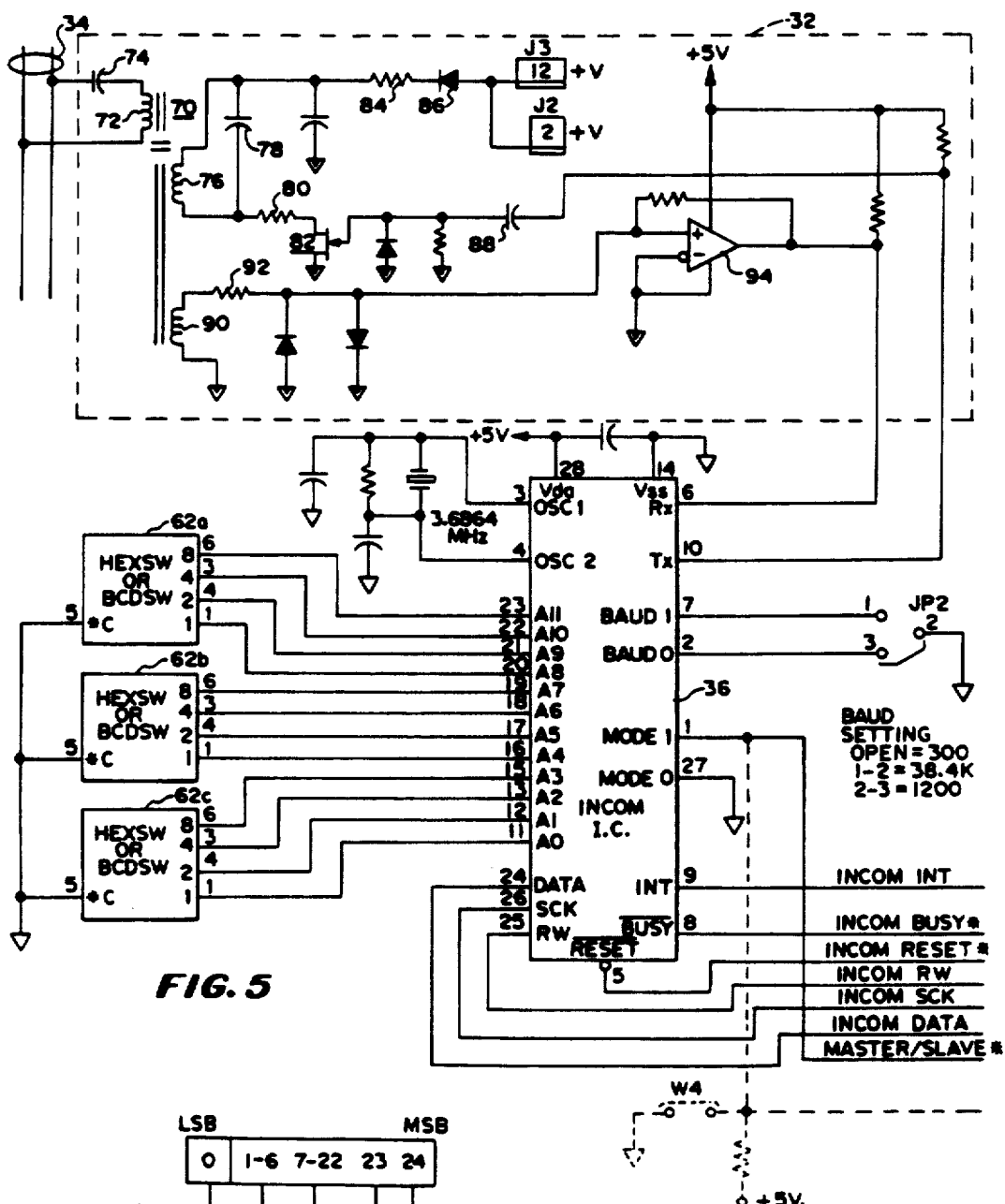
FIGS. 5 and 6 when placed side by side comprise a schematic diagram of the hardware components of this interface.
Figure 6:
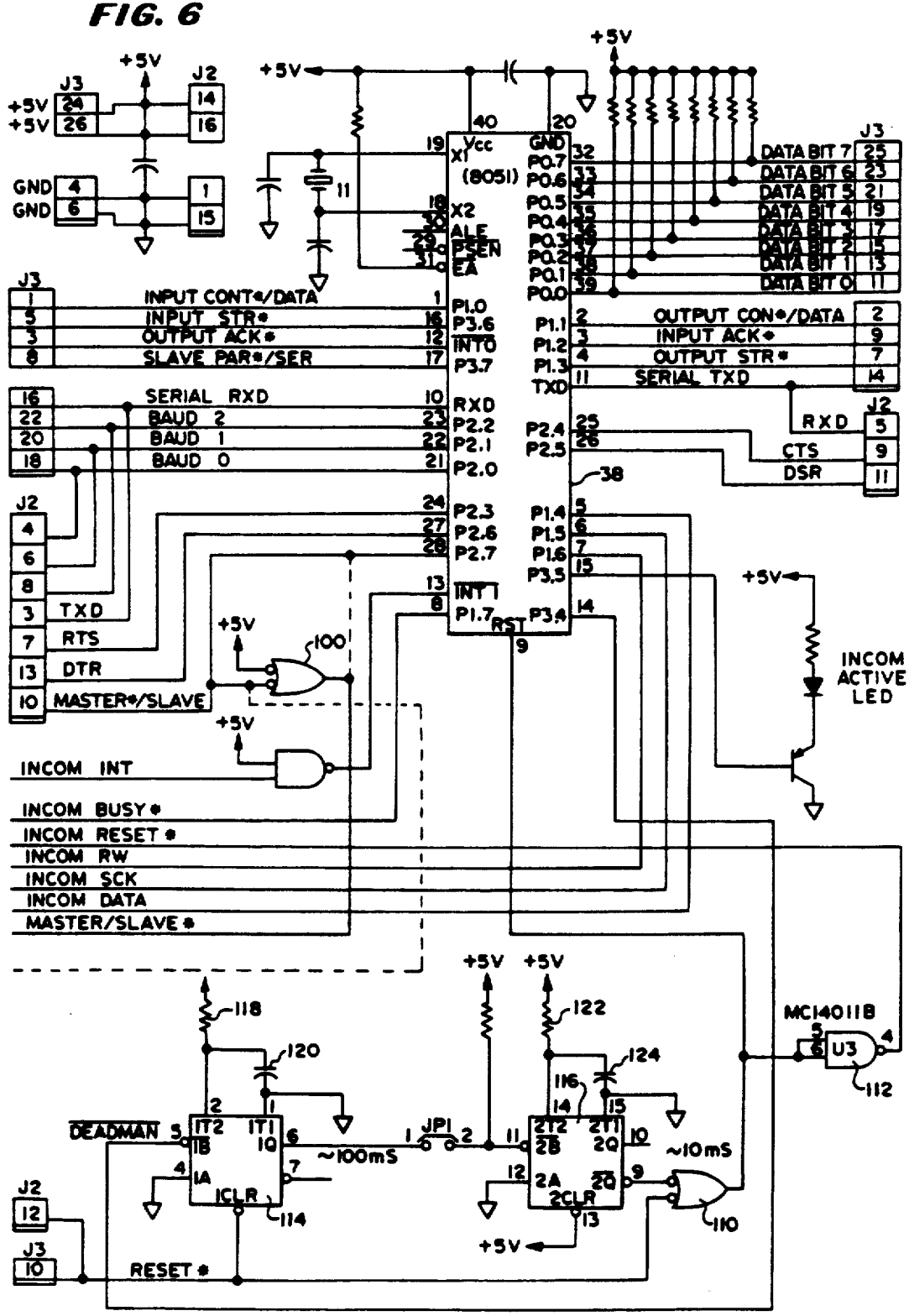

In FIGS. 5 and 6 of the drawings a circuit diagram of the hardware components of the MEI card 30, which is shown in block diagram form in FIGS. 2, 3 and 4, is provided. The following section will describe the hardware components of the MEI card with circuit references to FIGS. 5 and 6. All signal names will be capitalized and terminate with an asterisk if the signal is low-true.

INCOM Coupling Circuit 32

The INCOM coupling circuit 32 on the MEI card is shown in FIG. 5 of the drawings. Referring to this figure, it is first pointed out that a similar coupling circuit is disclosed in Engel application Ser. No. 706,079, filed Feb. 27, 1985 assigned to the same assignee as the present invention, and reference may be had to said Engel application for a detailed description thereof. However, for the purpose of the present invention it may be briefly stated that the INCOM coupling circuit 32 includes a coupling transformer 70 having a primary winding 72 which is connected to the common network line 34 through the capacitor 74, the primary winding 72 and the capacitor 74 being tuned to the carrier frequency of 115.2 kHz. A secondary winding 76 is also tuned to the carrier frequency by means of the capacitor 78, the bottom end of the winding 76 being connected through the 10 ohm resistor 80 to an FET 82 and the upper end of the winding 76 being connected through the resistor 84 and diode 86 to a positive voltage supply of approximately +24 volts which is supplied to either pin 12 of the product connector J3 or pin 2 of the card edge connector J2, as will be described in more detail hereinafter. The INCOM chip 36 develops an on-off keyed carrier signal on its Tx output line which is supplied through the capacitor 88 to the gate electrode of the FET 82 so as to control conduction thereof in connection with the carrier-on portions of the transmitted message. When the FET 82 is rendered conductive, approximately 24 volts is placed across the secondary winding 76 so that a carrier signal is coupled through the transformer 70 and appears on the network line 34 as an on-off keyed carrier signal of approximately 2.5 volts rms across a 10 ohm load which is sufficient to drive approximately 5000 stand alone slaves or expanded mode slaves connected to the line 34.

The transformer 70 is also provided with a tertiary winding 90 across which a message received from a network link 34 is developed and is supplied through a resistor 92 to a comparator 94 which acts as a high gain amplifier for the received signal so that a received on-off keyed carrier signal of approximately 5 volts amplitude is developed in the output of the comparator 94. This amplified and limited received carrier signal is supplied to the Rx input line (pin 6) of the INCOM chip 36.

INCOM Chip 36

The INCOM chip 36 is described in detail in Verbanets application Ser. No. 624,747, filed Jun. 28, 1984, and assigned to the same assignee as the present invention, and reference may be had to this application for a detailed description of the operation thereof. When the INCOM chip 36 is used on the MEI card 30 it may be operated in either the expanded master mode, in which pin 27 is grounded and pin 1 is high, or the expanded slave mode in which pin 27 is grounded and pin 1 is low. Control of the mode of operation of the INCOM chip 36 is provided by the MASTER/SLAVE* line connected to pin 1 of the chip 36, this line being high when the INCOM chip 36 is to be operated in the expanded master mode and is low when the chip 36 is operated in the expanded slave mode. More particularly, the MEI card 30 is designed so that the INCOM chip 36 is operated in the expanded slave mode unless a serial master driver/receiver 42 is connected to the card edge connector J2 of the MEI card 30. Insertion of the serial master unit 42 with pin 10 (FIG. 8) set at a logic 0 places the INCOM chip 36 in the network master configuration. Failing to insert a serial master card 42 or inserting one which does not drive pin 10 of the card edge connector J2 to a low logic level places the INCOM chip 36 in the expanded slave mode on the network line 34. More particularly, a logic 0 on pin 10 of the card edge connector J2 (MASTER*/SLAVE input) is supplied to the NAND gate 100 (FIG. 6) to the other input of which the +5 volt supply is connected. The resultant logic "1" output on the MASTER/SLAVE* line is supplied to pin 1 of the INCOM chip 36 so as to force this integrated circuit to operate in the expanded master mode. In the absence of a logic 0 signal on pin 10 of the connector J2, pin 1 is low and the INCOM chip 36 is operated in the expanded slave mode. If desired, the master/slave status of the microcontroller 38 and INCOM chip 36 may be controlled by means of a jumper W4 on the MEI card 30 rather than from the external master 40 through pin 10 on the J2 connector. This jumper, when closed, grounds pin 1 of the INCOM chip 36 and pin 28 on the microcontroller 38 to place these units in the slave configuration, as shown in dotted lines in FIGS. 5 and 6. With the jumper W4 removed, pin 28 of the microcontroller is pulled up internally and +5 v. is supplied to pin 1 of the chip 36 so that these units are operated in the master configuration.

When the INCOM chip 36 is operated in the expanded master mode its interface lines to the microcontroller 38 are continuously enabled and the interface to and from the microcontroller 38 is selected as the master controller of the INCOM chip 36. The microcontroller 38 can then, at any time, place information into the serial shift register of the INCOM chip 36 to be transmitted onto the INCOM network link 34. Messages are received from the network only when the microcontroller 38 allows the INCOM chip 36 access to the link 34.

Considered generally, the interface lines of the INCOM chip 36, which are continuously enabled in the master mode, include an interrupt line (INT) which is an active high output signal which is inserted at the end of a network message reception or at the end of a transmission operation by the INCOM chip 36. The INT line is reset and held low by a logic 1 on the serial clock (SCK) interface line of the INCOM chip 36.

The DATA interface line of the INCOM chip 36 is a bidirectional I/O pin whose direction is controlled by the signal on the read/write (R/W) interface line of the chip 36. When the R/W line is a logic high the data line is an output. When an interrupt is asserted on the INT line the DATA pin indicates the cause of the interrupt, the R/W line being held high at this time. A logic high on the DATA line when the INT line is asserted indicates that the interrupt was caused by the receipt of a network message by the INCOM chip 36. A logic 0 on the DATA line indicates the completion of a transmission to the network by the INCOM chip 36. The DATA interface line is also used as a bidirection data transfer line during a data transfer operation to and from the multipurpose microcontroller 38.

The SCK interface line is a serial clock line which is used to clock data into or out of the INCOM chip 36 through the DATA line. The quiescent state of the SCK line should be low. The direction of data flow is controlled by the R/W line. The R/W line is also used to transfer control of the internal shift register of the INCOM chip 36 from the microcontroller 38 to the INCOM network so that the chip U3 can initiate message transmission on this network. The BUSY/ line of the INCOM chip 36 is an active low output that indicates that the INCOM chip 36 is either busy demodulating a 33 bit network receive message or is busy transmitting a similar message onto the network.

When the INCOM chip 36 is operating in the expanded slave mode it is arranged to receive messages from the INCOM network master over the link 34 only when these messages include an address portion corresponding to the address established by the switches 62A-62C which are connected to the address terminals 11-23 of the chip 36. However, when the chip 36 is operated in the expanded master mode, its address decoder portion is bypassed and the chip is able to receive any message impressed upon the INCOM link line 34 regardless of the address portion thereof, the received message being stored in the internal shift register of the chip 36 so that it can be read out by the microcontroller 38 over the bidirectional DATA line of the chip 36.

As discussed generally in the above-identified Verbanets application Ser. No. 625,747, the INCOM chip 36 is designed to operate at several different baud rates so that different types of INCOM network links, such as power lines, twisted pair lines, or fiber optic cables may be employed as the common network link. In the MEI card 30 the jumper JP2 is employed to select a particular baud rate in accordance with a type of common network medium which is employed for the INCOM network. When the jumper JP2 is open the baud rate of the INCOM chip 36 is 300 baud. When the jumper is connected between pins 2 and 3 the baud rate is 1200 and when pins 1 and 2 are connected together the baud rate is 38.4K, this baud rate being normally employed when a low noise INCOM network link such as a fiber optics cable is used.

Multipurpose Microcontroller 38

The multipurpose microcontroller 38 employed on the MEI card 30 is preferably an INTEL type 8051 microcontroller. When the microcontroller 38 is programmed in accordance with the attached listing it can be operated in any one of three configurations, depending upon the logic signals applied to port P2.7 (pin 28) and port P3.7 (pin 17) of the microcontroller 38. P2.7 is the master*/slave choice and P3.7 is the parallel*/serial choice. These pins are pulled up internally in the microcontroller 38 unless grounded by an external signal. Thus, when no serial master card 42 is inserted into the card edge connector J2 and a parallel data controlled product 44 is connected to the J3 connector (as shown in FIG. 3), pin 28 is high and pin 17 is low and the microcontroller 38 is automatically operated in an INCOM slave-to-parallel-product configuration in which the software module on pages A-1 to A-31 of the attached listing is processed.

When the serial master card 42 is connected to the J2 connector and a parallel product 44 is connected to the J3 connector, pin 28 is low and pin 17 is low and the microcontroller 38 is automatically operated in a master RS232C-to-parallel-product configuration in which the software module identified as MEIRS232.SRC on pages A-32 to A-60 of the attached listing is processed. It should be noted that in this configuration the external master communicates directly with only one controlled parallel product independently of the INCOM network. Also, in this configuration portions of the INCOM slave-to-parallel-product module which involve communications between the MEI card 30 and the parallel product 44 are utilized, as will be described in more detail hereinafter.

When the serial master card 42 is connected to the J2 connector and no controlled product is connected to the J3 connector, pin 28 is low and pin 17 is high (because it is pulled up internally in the microcontroller 38) and the microcontroller 38 is automatically operated in a master RS232C-to-INCOM network configuration in which the software module identified as MEIINCOM on pages A-61 to A-71 is processed. In this configuration, portions of both of the preceding modules are also utilized, i.e., the INCOM network to MEI card portion of the INCOM slave-to-parallel product configuration and the RS232C to MEI card portion of the RS232C-to-parallel product configuration, as will be described in more detail hereinafter.

When the MEI card 30 is operated in the master RS232C-to-INCOM network configuration, information between the host computer 40 and the MEI card 30 is passed in an ASCII protocol over the RS232C link from the RS232C port of the host computer 40 through the serial master driver/receiver card 42 which provides a link compatible with RS232C standards both mechanically, electrically and protocolwise. In the microcontroller 38 the message is stripped of its RS232C protocol and transferred in segments compatible with the requirements of the INCOM chip 36 which in turn transmits a corresponding message to the INCOM network which includes the INCOM network protocol. Similarly, messages from the INCOM network are in turn translated to the ASCII format before being passed to the host computer 40. Accordingly, the MEI card 30 makes the INCOM network protocol transparent to the user at the external master computer or terminal 40.

When the microcontroller 38 is selectively operated in the INCOM slave-to-parallel product configuration (the expanded slave mode) the MEI card 30 provides information from and to a controlled product connected to the product connector J3 at the request of the master device on the INCOM network. The microcontroller 38 processes requests from the network master and performs all exchange procedures with the controlled product. Information from the controlled product is taken continuously by the microprocessor 38 when acting as an expanded mode slave and is stored with double buffering in the 8051's RAM.

Figure 18:
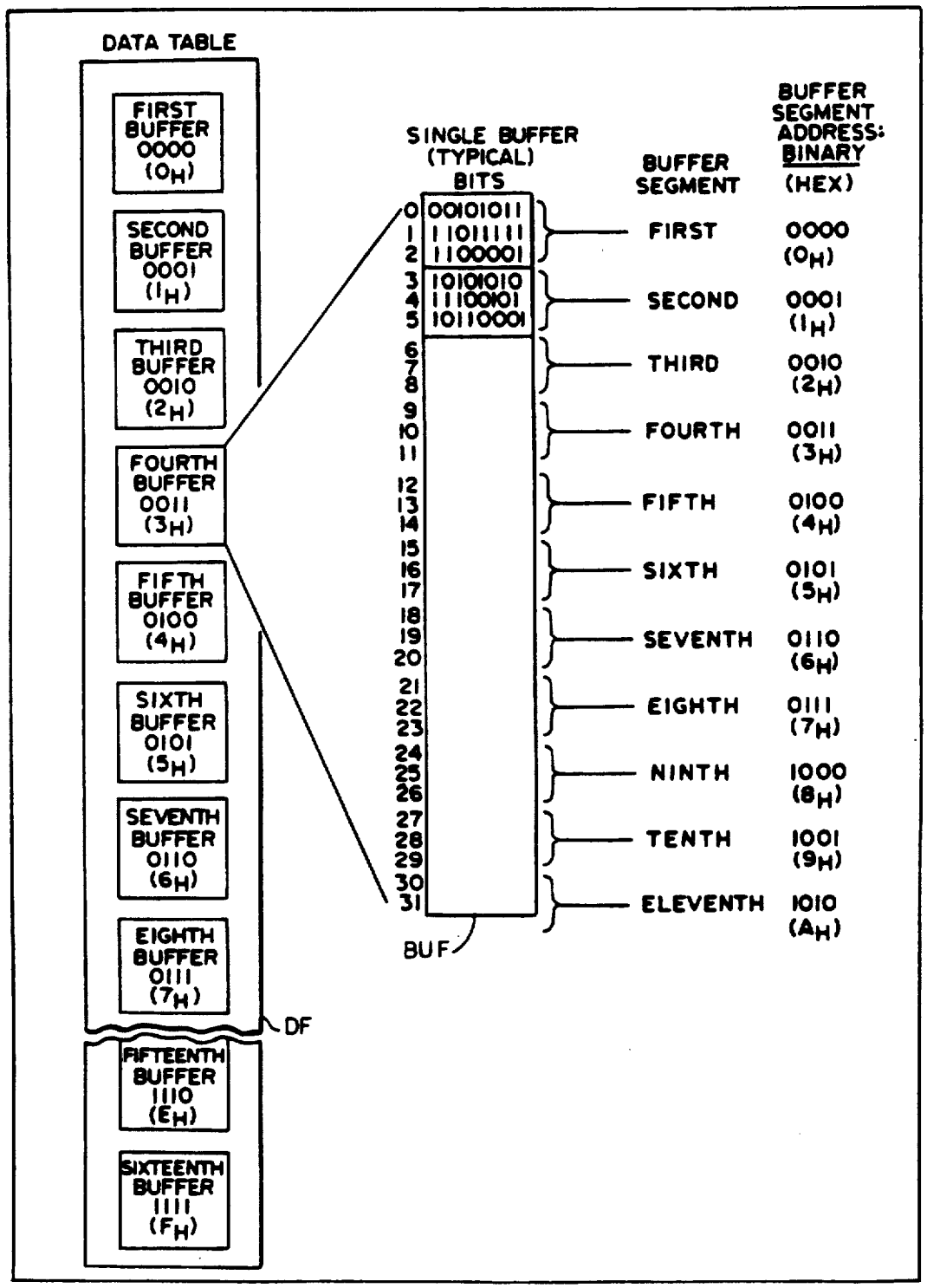
FIG. 18 is a diagram of the Data Table storage arrangement of a type IQ2000 controlled product.

As will be described in more detail hereinafter, the microcontroller 38 is specifically arranged to communicate with a type IQ2000 microprocessor-controlled motor starter and controller, such as shown and described, for example, in U.S. Pat. No. 4,456,867. Any data transmitted from the IQ2000 controlled product originates in this unit's Data Table which is an area in memory which contains the most current operating information and system status data of the controlled product. The IQ2000's Data Table may be considered at organized into sixteen separate buffers, such as shown in FIG. 18. Each of these buffers contains 32 bytes of data, these bytes being numbered 0-31. Three adjacent bytes in a particular buffer may be conveniently associated together in what is called a buffer segment. The purpose of such smaller groupings is to allow faster processing of specific data segments in the Data Table. Each of these buffer segments has a unique address which is programmed when the specific data in that area is accessed.

The microcontroller 38 is arranged to access data from only one of the sixteen Data Table buffers of the IQ2000 at a time. More specifically, when requested by the master, data from a single Data Table buffer designated by the master is alternately transferred to one or the other of two product buffers in the microcontroller 38. Each of these product buffers has the same capacity as a Data Table buffer (32 bytes) and is similarly addressed in 3 byte segments, as shown in FIG. 18.

Since the MEI 30 card is intended to operate with many different product lines, the protocol between the MEI card 30 and the controlled product 47 is made as general as possible. Accordingly, the microcontroller 38, when acting as an expanded mode slave, only needs to decipher the command type with minimal knowledge of the dat content of the message transferred.

Interface Power Supplies

Power required to drive the MEI card's circuitry is obtained from the product interface connector J3. If the MEI card 30 is configured as a master device to the INCOM network without a local controlled product 44 attached, a power module can be incorporated at this connector to supply power. The power supplies include a +5 V regulated supply for the integrated circuits 36 and 38 and an unregulated +24 V. supply for the coupling circuit 32. These power supplies are also connected to the serial master driver/receiver 42 interface (J2) and can be supplied from the controlled product 44 through the MEI card 30 to the unit 42. If, however, a product is not connected to the MEI card 30 while operating in the master mode, the power can then be supplied through the card edge connector J2 either from the unit 42 or a separate power supply connected to this connector. The responsibility for the power connections to the MEI card 30 from host or separate power supply is thus determined at the application level.

MEI Card Reset And Deadman Circuits

When the MEI card 30 is configured to function as an expanded mode master in conjunction with the external master computer or terminal 40, power up reset control is supplied to the MEI card 30 from the serial master card 42.

When the MEI card 30 is operated as an expanded mode slave, as shown in FIG. 3, the product device must supply power up reset control. More particularly, pin 10 of the product connector J3 and pin 12 of the card edge connector J2 are connected to the Reset* line of the MEI card 30 (FIG. 6). When an active low signal is supplied from either of these connectors, it passes through the NAND gate 110 to the reset pin 9 of the microcontroller 38. This reset signal is also supplied through the inverter 112 to the reset pin 5 of the INCOM chip 36 (FIG. 5).

The MEI card 30 also includes a deadman circuit comprising the two DC triggered multivibrators 114 and 116, which are preferably of the commercial type MC14538B, or equivalent. This deadman circuit allows the MEI card 30 to reset itself if the normal programming sequence of the microcontroller 38 is not followed, i.e. the microcontroller 38 has lost its intelligence. Specifically, the time constant circuit 118, 120 for the multivibrator 114 establishes a timing interval of approximately 100 milliseconds during which a DEADMAN/ signal should be developed by the microcontroller 38 at the port P3.4 which is supplied to pin 5 of the multivibrator 114 to reset this multivibrator and restart the timing interval. If this signal is not developed during the 100 millisecond timing interval the 10 output of the multivibrator 114 is employed as a reset signal to the multivibrator 116. The time constant circuit 122, 124 of the multivibrator 116 provides a 10 millisecond output signal which is supplied through the OR gate 110 to reset the microcontroller 38 and through the NAND gate 112 to reset the INCOM chip 36. This deadman circuit can be deactivated by removing the jumper JP1 (FIG. 6) on the MEI card 30.

MEI Card - Product Interface

The interface from the MEI card 30 to the controlled product is accomplished through a 26 conductor flat ribbon cable which is connected to the product connector J3, the pin connections of this connector being shown in FIG. 7. When the MEI card 30 is configured as an expanded mode slave the microcontroller 38 can communicate with the controlled product over this cable using either a parallel or serial data format. However, when the MEI card 30 is configured as the network master it can communicate with the controlled product 44 over this cable using only a parallel data format since the serial data channel of the microcontroller 38 is employed for the RS232C interconnection to the host computer 40 in the master configuration. The particular series or parallel format in which data is transferred between the controlled product and the microcontroller 38 is controlled by the product by selecting the polarity or logic level of a status bit defined within this interface. More particularly when pin 8 of the product connector J3 is a logic 0 the microcontroller 38 is conditioned for a parallel mode of operation while a logic level of 1 on pin 8 defines the serial data format. The parallel data interface to the controlled product is accomplished using the P0 8-bit bidirectional port of the microcontroller 38 while segments of the other ports are used as control and status lines. The serial data interface only requires the use of the serial data buffers of the microcontroller 38 and 4 status inputs. One of these status inputs defines the serial data mode of operation and the other three select the baud rate at which serial transfers are performed asynchronously. The baud rate is thus selected by the product device. The protocol between the microcontroller 38 and the controlled product is the same regardless of the parallel or series format mode of operation. This protocol is based on the microcontroller 38 initiating all interactions with the controlled product.

MEI Card - Parallel Format Interface

Considering now in more detail the specific signals transmitted between the microcontroller 38 and the controlled product when operating in the parallel data format, with a parallel data interface pins 14, 16, 18, 20 and 22 of the product connector J3 shown in FIG. 7 are unused. A brief functional explanation of each signal on the active pins of the connector J3 during parallel data transfer follows:

Slave Par*/Ser—An active low input from the product device informing the microcontroller 38 that the product interface is set up for parallel mode.

Output Cont*/Data—Provides a status indicator from the MEI card 30 informing the product device to interpret the P0 data bus as either control information (active low) or data (active high).

Input Cont*/Data—Provides a status indicator from the product device informing the MEI card 30 to interpret the data bus as either control information (active low) or data (active high).

Output Str*—An active low control line from the MEI card 30 informing the product device that the information on the Data Bus (whether control or data) is stable and valid. This signal can only be active when the MEI card 30 is driving the Data Bus.

Input Str*—An active low control line from the product device informing the MEI card 30 that the information on the Data Bus (whether control or data) is stable and valid. This signal can only be active when the product device is driving the Data Bus.

Output Ack*—An active low control line from the product device informing the MEI card 30 that the product device has received the information on the Data Bus, thus allowing the MEI card 30 to end this transaction. This signal should be driven only in response to the reception of an Output Str* signal.

Input Ack*—An active low control line from the MEI card 30 informing the product device that the MEI card is receiving information on the Data Bus, thus allowing the product device to end this transaction. This signal should be driven only in response to the reception of an Input Str* signal.

Data Bits 0-7—An 8 bit bidirectional bus transferring either control information or data (qualified by the appropriate Cont*/Data function) from the device driving the Str* control line to the device returning the Ack* control line.

Reset*—An active low input from the product device which provides a power up reset to the MEI card 30, as described previously.

MEI Card-Product Serial Format Interface

When the serial data channel of the microcontroller 38 is used for the transmission of data between the microcontroller 38 and the controlled product, as described generally heretofore in connection with FIG. 4, only the even numbered pins 4-26 of the product connector J3 are utilized, the other pins of this connector being blank. A brief functional explanation of each of the signals on the active pins of the connector J3 for the serial format interface is as follows:

Slave Par*/Ser—An active high input from the product device in forming the microcontroller 38 that the product interface is set up for serial mode.

Serial Out—An active high signal which outputs serial data from the microcontroller 38 to the controlled product.

Serial In—An active high signal which inputs serial data to the microcontroller 38 from the product.

Baud—A three bit field input from the product device which selects the baud rate for this serial link between the microcontroller 38 and the controlled product. The decode of this field is as follows:

| baud Bits | Baud Rate Selected |
|---|---|
| 000 | 100 |
| 001 | 300 |
| 010 | 600 |
| 011 | 1200 |
| 100 | 2400 |
| 101 | 4800 |
| 110 | 9600 |
| 111 | No Connection |

A baud rate setting of 111$b$ when the microcontroller 38 is configured in the slave serial mode will halt the microcontroller 38 since a connection to neither the master host computer nor a slave product device is assumed.

Reset*—An active low input from the product device which provides a power up reset to the microcontroller 38, as described previously.

INCOM NETWORK-MEI CARD INTERFACE PROTOCOL

Figure 11:
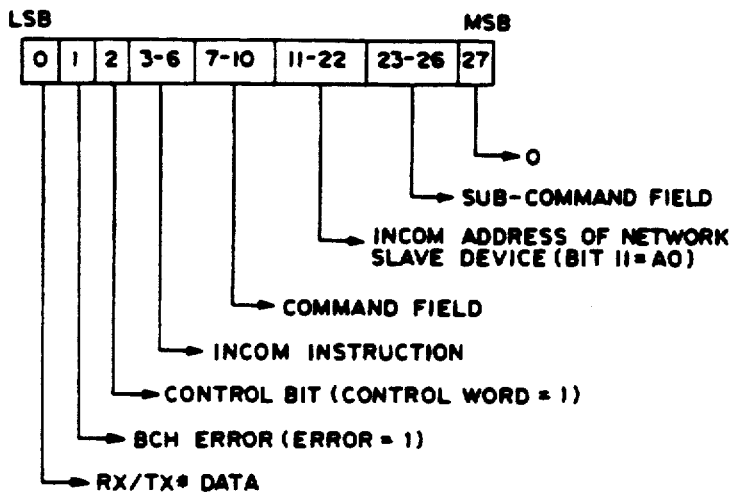
FIG. 11 is the message bit format of a control message from the INCOM master as read from the internal shift register of the INCOM chip.
Figure 12:
FIG. 12 is the message bit format of a data message as read from the internal shift register of the INCOM chip.

Since the MEI Card 50 acts as a common interface for the INCOM network, through the INCOM chip 36, the controlled product 47 and the ASCII II master computer 40, there are a number of different interface protocols which the microcontroller 38 must comply with. Considering first the INCOM network/MEI Card interface protocol, two types of messages exist in the INCOM network protocol, i.e. control and data messages. The format and structure of these messages on the INCOM link 34 are described fully in the above identified Verbanets application Ser. No. 625,747. These control and data messages are input to and extracted from the INCOM chip 36 regardless of whether the MEI card 30 is configured for the expanded master mode or the expanded slave mode. While reference may be had to said Verbanets applications for a detailed description of these control and data messages, the format for control and data messages inputted to the INCOM chip 36 is shown in FIGS. 9 and 10, respectively, while the control and data messages extracted from the INCOM chip 36 are shown in FIGS. 11 and 12, respectively. In FIGS. 9-12, inclusive, the two start bits, stop bit and the five bit BCH error code, which are required to make up the complete 33 bit INCOM control or data message, are eliminated for simplification.

Control Messages Initiated By The Network Master

When the MEI card is configured as the network master, control messages which are initiated by the external master computer 40 are stripped of their RS232C protocol and supplied to the INCOM chip 36 from the microcontroller 38 in the format shown in FIG. 9. If the MEI card 30 is configured as an expanded mode slave, however, these control messages are extracted from the INCOM chip 36 by the microcontroller 38 in the format shown in FIG. 11. Whether input or extracted, the information is handled in serial format, with the least significant bit (0) received first.

As a network master, the MEI card 30 can access both stand-alone mode slaves and expanded mode slaves. A stand-alone mode slave performs a simple one bit control output function and replies to the network master (when requested) with 2 status input bits. The four bit command field and the four bit subcommand field in the control messages of FIGS. 9 and 11 are not used when a control message is received by a stand alone mode slave. The four bit INCOM instruction field is decoded in the INCOM chip 36 to provide a number of instructions which pertain to either a stand alone mode slave or an expanded mode slave, as described in detail in said Verbanets applications Ser. No. 625,747. However, the only valid INCOM instruction received by the microcontroller 38 when operating as an expanded mode slave, is the enable interface instruction (0011B). All other instructions received by the microcontroller 38 will reject the control message from a network master by not accessing the command and returning the INCOM chip 36 interface to the INCOM network link 34.

The command definitions for control messages addressed to the MEI card 30 operating as an expanded mode slave, are given in Tables I and II below. In these tables the most significant bit in the command field indicates whether the microcontroller 38 will be transmitting data back to the INCOM network master (the most significant bit is "0"), or is receiving data from the master (the most significant bit is "1"). More particularly, when an enable interface instruction is received from the network master which is addressed to the INCOM chip 36, as established by the address switches 62A-62C, a transfer sequence is initiated between the master and this INCOM chip. Control of the INCOM chip is passed to the microcontroller 38 along with an interrupt on the INT line, thus allowing the microcontroller 38 to read the information stored in the serial shift register of the INCOM chip 36. The microcontroller 38 then decodes the command and subcommand fields and acts accordingly. Two actions may be taken. First, the microcontroller 38 may return information (either a single control message or a data message or messages followed by an acknowledge control message) to the network master by inputting the information to the INCOM chip 36 and commanding it to transmit the inputted information in the INCOM protocol over the INCOM link 34. Multiple messages may be transmitted because the microcontroller 38 is interrupted following each transmission. When all transmissions are complete, the microcontroller 38 returns control to the INCOM network interface. The network master will then provide the INCOM chip 36 with a disable interface instruction. In this first action the microcontroller 38 may send information stored in its buffer or information relating to its internal status, as shown by the commands in Table I.

The second action which can be taken by the microcontroller 38 is the reception of information from the network master with the intent of directly transferring data to the microcontroller in the controlled product 47, as shown by the commands in Table II. Here the microcontroller 38, when interrupted, first returns an acknowledgement control message to the master indicating acceptance of the command. Following this transmission the microcontroller returns control of the INCOM chip 36 to the network interface to receive the input data message. This continues until all data words are received, in which case the microcontroller 38 will then provide the network master with a positive or negative acknowledge control message. Control is again returned to the INCOM network interface to allow the network master to send the INCOM chip 36 a disable interface instruction.

TABLE I

| Command Field MSB-LSB | Sub Cmd. Field MSB-LSB | Command Name | Description |
|---|---|---|---|
| 0000 | | SSAT | Send status: |
| | 0000 | | Product's two bit status returned in control word (imitate stand-alone) |
| | 0001 | | Product's division code and product code/status |
| | 0100 | | Latest full holding buffer obtained from product device |
| | 1000 | | Interface card status |
| 0001 | xxxx | SSBS | Send buffer segment xxxx only |
| 0010 | xxxx | SUBS | Send buffer up to and including segment xxxx |
| 0011 | | | Reserved |
| 0100 | | | Reserved |
| 0101 | | | Reserved |
| 0110 | | | Reserved |
| 0111 | | | Reserved |

TABLE II

| | | | |
|---|---|---|---|
| 1000 | xxxx | RPBN | Receive xxxx as product buffer number to be accessed |
| 1001 | xxxx | RPFC | Receive xxxx as code passed to product in control to determine function |
| 1010 | xxxx | RPDM | Receive xxxx + 1 data messages to be passed to product (the first byte will provide the product with the function code) |
| 1011 | | | Reserved |
| 1100 | | | Reserved |
| 1101 | xxxx | RPFR | Receive xxxx as code passed to product in control to determine function. Response is requested informing the master of code acceptance and usage at the product level |
| 1110 | xxxx | RPDR | Receive xxxx + 1 data messages to be passed to product (the first byte will provide the product with the function code). Response is requested informing the master of data usage at the product level. |
| 1111 | | | Reserved |

Considering now the specific commands from the network master shown in Table I, the SSAT command requests various types of status information from the microprocessor 38 when operating as an expanded mode slave. The status groups requested are as follows:

SSAT:0000 Two status bits are returned in a control message which functions similarly to the status bits returned in a stand-alone mode slave. The bits, labeled ST2 and ST1, are returned in the two most significant bits of the subcommand field, i.e. bits 26 and 25, respectively, as described in Verbanets application Ser. No. 625,747.

Figure 17:
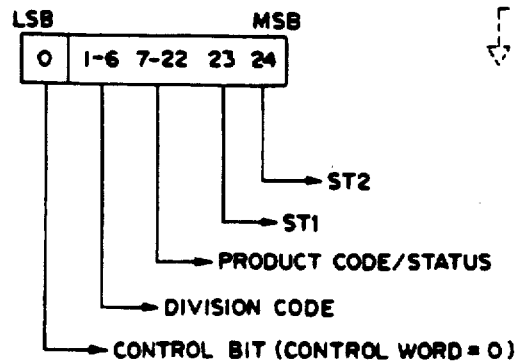
FIG. 17 is the message bit format for a status message returned to the interface by the controlled product.

SSAT:0001 Status indicating the product division code and the product code/status. This command may be employed in situations where a large number of products may be categorized based on the particular division in a large company which manufactures or uses the product. Each product within a product division may be assigned a product code identifying the specific product and further status bits are employed to indicate the operational status of this particular product. In response to this command one data message will be returned having the format shown in FIG. 17. This information is always stored in the first 3 bytes of the buffer supplied by the product, regardless of which buffer of the sixteen possible buffers is being accessed.

SSAT:0100 This command requests all information from that one of the sixteen product buffers which is presently under investigation i.e. the buffer which has been chosen by the latest RPBN command (Table II). Since the microcontroller 38 can store 32 bytes of information relative to a particular product buffer, eleven data messages of 3 bytes each will be successively supplied to the INCOM chip 36 by the microcontroller 38 and successively returned to the network master in the INCOM protocol over the link 34.

SSAT:1000 This command requests status information which is specific to the MEI card's processing functions and which does not reflect the product device's internal status. One data message will be returned by the microcontroller 38 in response to this command. The bit information of this response is defined as shown in Table IA below.

TABLE 1A

Expanded Mode Slave Internal Card Status Definitions

| Data Bit | Function |
|---|---|
| 23 | MEI master*/slave configuration |
| 22 | Product parallel*/serial configuration |
| 21 | Product setup procedure in error* (thus the MEI cannot interface the product) |
| 20* | Product interface link failure or an unexpected response received from product. |
| 19* | Product timeout error |
| 18* | INCOM interface setup was not in expected transmit/receive mode (hardware error) |
| 17* | INCOM interface link failure or an unexpected response received from master |
| 16* | INCOM reception had a BCH error |
| 15-8 | MEI firmware version (software revision) number, may differ for the slave and master configurations |
| 7-0 | MEI product (hardware revision) number = OAAH. |

*bit is reset after the MEI status is read

The send single buffer segment (SSBS) command (Table I) requests one data message to be returned to the network master. The information returned will be the 3 bytes of the designated buffer segment of the product buffer presently under investigation i.e. that one of the 16 product buffers chosen by the latest RPBN command (Table II). As discussed heretofore, each product buffer is divided into eleven segments, made up of consecutive 3 byte lengths. The particular segment requested is defined in the subcommand field of the SSBS command. For example, a subcommand field of 0000 will result in the first 3 bytes, or segment 0, being returned to the INCOM master. Segment 0 of any buffer (chosen by RPBN, Table II) will always contain the division code and product code/status, which is also the status returned in response to command SSAT:0001, described above.

The send up to and including buffer segment command (SUBS command is similar to the SSBS command except that the SUBS command requests one or more data messages to be returned to the master. The information returned may be multiple segments of the product buffer under investigation. All segments up to and including the segment defined in the subcommand field will be returned to the INCOM master in three byte data messages in the INCOM format shown in FIG. 10.

The receive product buffer number (RPBN) command (Table II) designates the particular product buffer which the MEI card 30 is to store and alternately update in its two holding buffers. The master selects a specific product buffer by the contents of the subcommand field. Any further commands initiated by the master will supply information from this particular buffer until another RPBN command is issued to modify the selected configuration.

The receive product function control code (RPFC) command provides the product a control message with sixteen possible functions as defined in the subcommand field. These functions are product dependent and thus are defined in the specifications of each product individually. When the MEI card 30 is functioning as an expanded mode slave, it does not attempt to interpret this subcommand field, nor will it require a response from the product device. Only an INCOM network level response (i.e. an acknowledgement) will be returned to the INCOM master in response to the RPFC command.

The receive product multiple data messages (RPDM) command is similar to the RPFC command in that it provides the product with information dependent on the specific needs of that particular product. The subcommand field in this command, however, specifies the number of data messages (+1) which are to be received by the MEI card 30 immediately following the reception of the RPDM command. For example, a subcommand field of 0000 in the RPDM command will be followed by one data message from the INCOM master. Accordingly, a total of 17 data messages from the INCOM master may follow the RPDM command. These data messages contain 3 bytes or 24 bits of information each. The first byte of the first data message received from the INCOM master will contain the function code of this message sequence. This code is product dependent and therefore is defined in the specifications of each product individually. When the MEI card 30 is functioning as an expanded mode slave, it only interprets the number of bytes to be passed to the product, without knowing the contents of the data to follow. The MEI card also will not require a response from the product device. Only an INCOM network level response (i.e., an acknowledgement) will be returned to the INCOM master.

The receive product functions control code with response (RPFR) command is the same as the RPFC command described above but indicates that the INCOM master is requesting a response from the product indicating the acceptance and usage of this control code function from the level of the product and not simply an acknowledgement at the INCOM network level. The reply returned by the product through the microcontroller 38 and the INCOM chip 26 to the network master should be the PRSP command, shown in Table III and described hereinafter, with the subcommand field contents of this reply being product dependent. This command will usually require a longer time for the product to respond.

The receive product data messages with response (RPDR) command is similar to the RPDM command described above but the master is requesting a response from the product indicating the acceptance and usage of this data message function from the level of the product, and not simply an acknowledgement at the INCOM network level. The reply returned from the product should be the PRSP command (Table III) with the subcommand contents being product dependent.

Data Messages Initiated By the Network Master

When the MEI card 30 is configured as the network master, data messages transmitted by the external master computer 40 to the microcontroller 38 are stripped of the RS232C protocol and are inputted to the INCOM chip in 3 byte segments in accordance with the format shown in FIG. 10. If the MEI card 30 is configured to operate as an expanded mode slave, however, these data messages are extracted from the INCOM chip 36 by the microcontroller 38, as shown in FIG. 12. Whether inputted or extracted, the information is handled in serial format, with the least significant bit (0) received first. The number of data bits actually transmitted/received per message transfer is 24, or 3 bytes. Information passed which has more than 24 bits will require multiple data messages to be transferred.

Initially, a control message must be sent by the network master before it can transfer any data messages. This control message is employed to enable the expanded mode interface between the INCOM chip 36 and the microcontroller 38 if this interface is not already enabled. Also, this control message is employed to provide the microcontroller 38 with a command which defines the type of data message or messages which will be sent. Before the network master begins sending the data, however, it must wait for an acknowledge control message returned from the MEI card 30 operating as an expanded mode slave to inform the network master that the command has been accepted. If the MEI card 30 does not accept command, an error control message (or no reply, if the INCOM chip 36 does not receive the enable interface instruction correctly due to a transmission error) will inform the network master to retry the command. After the microcontroller 38 receives the corresponding number of data messages, as defined in the previous command sent, a control status message is returned to the network master indicating the correctness of the information received.

Control Messages Returned To The Network Master

When the MEI Card 30 is configured to operate in the expanded master mode, control messages intended for the external master computer 40 are extracted from the INCOM chip by the microcontroller 38 in the format shown in FIG. 11 and supplied over the RS232C channel to the external master computer 40. If the MEI card 30 is configured to operate as an expanded mode slave, however, these control messages are supplied to the INCOM chip 36 by the microcontroller 38 in the format shown in FIG. 9. Whether extracted or inputted, the information is handled in serial format, with the least significant bit (0) received first. These control messages have the slave's own address in the address field of the message. The INCOM instruction field is returned with the same information which was received by the slave from the master's most recent control message. The command definitions returned to the network master differ from the commands sent by the network master, and are shown in Table III below.

TABLE III

| Command Field MSB-LSB | Sub Cmd. Field MSB-LSB | Command Name | Description |
|---|---|---|---|
| 0000 | 00ss | SMSS | Stand-alone Mode Slave Status Image ss is the two status bits defined |
| 0001 | | CAEF | Command Acknowledge and Error Functions: |
| | 0000 | | Acknowledge command |
| | 0001 | | Non-acknowledgement command |
| | 0010 | | Repeat request |
| | 0011 | | BCH error in transfer sequence |
| | 0100 | | MEI card requires buffer segment number |
| | 0101 | | Hardware failure |
| | 0110 | | Product device not responding |
| 0010 | xxxx | PRFC | Product Device Direct Response |
| 0011 to 1111 | | | Reserved |

Referring to Table III, the stand-alone mode slave status image (SMSS) command is returned to the network master in response to an SSAT:0000 command described in detail heretofore. The subcommand field returns 00ss, where ss are the two status bits, ST2 and ST1, described heretofore. These two bits are always stored in the two least significant bits of the products division code and product code/status word (or 3 byte field), as shown in FIG. 9A.

The command acknowledge and error functions (CAEF) command returns positive or negative status information to the network master concerning the expanded mode slave's attempt to process the master's most recent request, as follows:

CAEF:0000 Positive acknowledge status is returned to the master device indicating the MEI card 30 has accepted the present command or a transfer sequence between the MEI card 30 and the controlled product was completed successfully.

CAEF:0001 Negative acknowledge status is returned to the master device indicating that the MEI card 30 has not accepted the command or transfer sequence.

CAEF:0010 The MEI card 30 wishes the master to transmit its request again.

CAEF:0011 The MEI card 30 has received a BCH error in one or more of the data messages transmitted from the master in a transfer sequence CAEF:0100 If the master is requesting buffer information from the product device and the MEI card 30 has not received the RPPN command (which initializes the product buffer number), an error is returned to the master requesting this information.

CAEF:0101 The MEI card 30 detects an error condition internal to the controlled product's hardware.

CAEF 0110 The MEI card 30 does not receive a response from the controlled product it is monitoring.

The product device direct response (PRFC) command (Table III) returns xxxx from the controlled product in response to an RPFR command or an RPDR command received from the network master. The subcommand field returns xxxx which is passed from the controlled product informing the network master of the acceptance and usage of the received information at the product level, i.e. not just at the INCOM network level. Since this reply is from the product level, the contents of this subcommand field is application dependent.

Data Messages Transmitted To The Network Master

When the MEI card is operated in the expanded master mode, data messages received by the INCOM chip 36 are extracted from this chip by the microcontroller 38, as shown in FIG. 12. If the MEI card 30 is configured to operate as an expanded mode slave, however, these data messages are input to the INCOM chip 36 by the microcontroller 38, as shown in FIG. 10. Whether extracted or inputted, the information is handled in serial format, with the least significant bit (0) received first. The number of data bits actually transmitted/received per message transfer is 24, or 3 bytes. Information passed which has more than 24 bits will require multiple data messages to be transferred. When the microcontroller 30 is operating as an expanded mode slave, it will fill the unused data portion of messages not containing an exact multiple of 24 bits with zeros. Also, the data bytes are extracted from the memory of the microcontroller 38 and delivered to the network master as shown in Table IV below.

TABLE IV

| Network Data Field Setup | |
|---|---|
| Data stored as: | |
| RAM Storage Address | Data Bit 7------0 |
| yyyy | hgfedcba |
| yyyy + 1 | ponmlkji |
| yyyy + 2 | xwvutsrq |
| Transferred on network as: | |
| Network Data Message Bit 3----------------------26 | |
| abcdefghijklmnopqrstuvwx | |

If data is requested by the network master and the MEI card 30 does not need to return an error message, then the required number of data messages are returned to the network master with an acknowledge control message (CAEF:0000) immediately following the data. The MEI card 30 then controls the R/W line to the INCOM chip 36 to set up the INCOM chip 36 to receive another instruction from the INCOM network.

MEI CARD-PRODUCT INTERFACE PROTOCOL

The control commands and their definitions for transfers from the MEI card 30 to the controlled product 44 and for transfers from the product device 44 to the MEI card 30, are given in Tables V and VI, respectively, below. In these tables the command and subcommand fields are given in hexadecimal notation.

TABLE V

| Control Commands To The Product Device | | |
|---|---|---|
| Control Code (In HEX) | Command Name | Description |
| 00H | NOREQ | No request |
| 0EH | MPRES | MEI Card has been Reset |
| 1xH | WPCOD | Receive x as code to determine function from the network master |
| 2xH | WPDAT | Receive x + 1 (times 3) bytes of information from the network mas- |

TABLE V-continued

| Control Commands To The Product Device | | |
|---|---|---|
| Control Code (In HEX) | Command Name | Description |
| | | ter, with the first byte providing the function code |
| 9xH* | WPCDR | Receive x as code to determine function from the network master, then pass back a response |
| AxH* | WPDTR | Receive x + 1 (times 3) bytes of information from the network master with the first byte providing the function code, then pass back a response |
| B0H* | WPSTA | Pass the division code and product code/ status (i.e., bytes 1, 2 and 3 of all product buffers) |
| CxH 8 | WPBUF | Pass all bytes of information for buffer x |

TABLE VI

| Control Commands From The Product Device | | |
|---|---|---|
| 80H* | WPRET | Return mastership back to MEI interface card |
| 9xH* | WPPLR | Return mastership back to MEI interface card while providing a nibble x as status requested from the MEI command |

Since the MEI card 30 is to be used with a wide variety of controlled products, these exchange definitions are not for specific purposes but are kept general in form. A maximum of 256 control commands are available in each direction using this transfer protocol. For programming ease, all commands which require a change of mastership between the MEI card 30 and the controlled product 44 have their most significant bit (bit 7) set.

Considering first the control commands which are sent from the MEI card 30 and received by the controlled product 44, shown in Table V, it should be pointed out that the control code shown therein is given in hexadecimal notation. Also, those control commands to the product device which imply a transfer of mastership are denoted by an asterisk following the control code (the msb is set). An explanation of each command in Table V is as follows:

NOREQ

The MEI card 30 is not requesting information from the product nor does it want to receive information from the product. This command simply informs the product device that the MEI card 30 is alive, although the interface to the product is presently idle.

MPRES

By this command the MEI card 30 is informing the product that it has just initialized itself from a reset function. Although transmitted to a parallel formatted product, this command is mainly intended for use when the MEI card is interface to a product with a serial configuration. Three consecutive MPRES commands will be sent to the product (the serial link operates in the full duplex mode) informing the product to halt all previous interactions with the MEI card. This command is intended to initialize the interface in the event of a deadman time out on the MEI card 30 which will cause a reset condition. The product device shall stop all transmissions to the MEI card when this command is received.

WPCOD

The MEI card 30 is passing the function control code received from the master device's RPFC command (described previously) to the product. It is passed to the product in the lower nibble of the WPCOD command, and provides one of 16 possible functions. The function definitions are not decoded by the MEI card 30, thus allowing each product to interpret the code individually.

WPDAT

Following the WPDAT command, the MEI card 30 will pass 3 times the number of bits (+1) specified in the lower nibble of this command to the product. These bytes were received from the master device's RPDM command (discussed previously). The data is product dependent and therefore the MEI card 30 does not interpret the information. The first data byte passed to the product will be the function code to be decoded by the product.

WPCDR

This command is the same as the WPCOD command above, except the MEI card 30 is requesting the product to return a response following the command. This response is product dependent and is not interpreted by the MEI card 30, but rather is transferred to the INCOM master (or the host computer 40 if this MEI card is functioning as the INCOM master and is conversing with the control product 44).

WPDTR

This command is the same as the WPDAT command above, except the MEI card 30 is requesting the product to return a response following the command and data provides to the product device. This response is product dependent and is not interpreted by the MEI card 30, but rather is transferred to the INCOM master (or host computer 40 if this MEI card functions as the INCOM master and is conversing with the local product 44).

WPSTA

By this command the MEI card 30 is requesting the division code and product code/status from the product. This information is 3 bytes in length and will always be the first 3 bytes of all of the 16 product buffers. After transmission of this control word mastership of the link is given to the product.

WPBUF

By this command the MEI card 30 is requesting all the bytes of the product buffer specified in the lower nibbl of this command. A product command may have up to 16 possible buffer configurations. The MEI card 30 will interrogate that buffer pertaining to the master device's latest RPBN command received from the master. After transmission of this control word mastership of the link is given to the product.

Considering now the control commands sent by the product and received by the MEI card 30, shown in Table VI above, an explanation of each command follows:

WPRET

The product device is returning mastership of the product/MEI card interface back to the MEI card 30. This occurs when the product has completed transferring all the data requested by the MEI card 30 or if no information is presently available for transfer.

WPPLR

By this control command the product device is returning mastership of the product/MEI card interface back to the MEI card 30 and is similar to the WPRET command above with the exception that the lower nibble of this command contains status information from the product. This information was requested by the previous command from the MEI card 30, as for example the WPCDR or WPDTR commands discussed above, and is product dependent.

MEI Card-Product Parallel Format Operating Discipline

Figure 13:
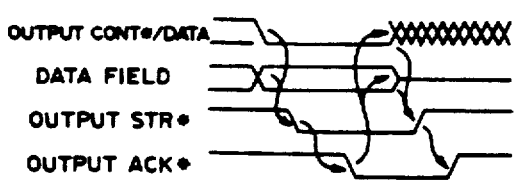
FIG. 13 is a timing diagram for a typical transfer from the multi-purpose interface to a controlled product.

Considering now the operating discipline or structure of the protocol between the MEI card 30 and the controlled product 44 when using the parallel data format, at initialization (or start up) the MEI card 30 will be the master device for exchanges between itself and the product. The timing sequence for a typical transfer from the MEI card 30 to the product device is shown in FIG. 13, wherein the waveforms on the four control lines Output Cont*/Data, Data Field, Output Str*, and Output Ack* and the respective timing therebetween, is shown. Initially the MEI card 30 places correct information on the Data Field and Output Cont*/Data lines. When these lines are stable the MEI card 30 activates the Output Str* line to the product device. The product device reads this information and then activates the Output Ack* line to the MEI card 30 to acknowledge reception. This acknowledgement indicates to the MEI card 30 that the transfer is complete. At this time one of two approaches may be used. If the MEI card 30 has not passed mastership to the product device (i.e., is not requiring information to be returned) the MEI card 30 keeps control of the Data Field and Output Cont*/Data lines while deactivating the Output Str* line. This status change then signals the product device to deactivate the Output Ack* line. Another transaction cannot occur until the MEI card 30 witnesses this change.

If, however, the MEI card 30 is expecting a response from the product, it passes a control byte to the product device, i.e. one of the control commands shown in Table V with the msb set. The product decodes this control command, which indicates that the product should become the master of the MEI cardproduct interface. The timing for the passage of this control byte is shown in the FIG. 14. As shown in this figure, at the completion of the transfer from the MEI card, the MEI card first tristates the Data Field lines prior to deactivating the Output Str* line. This status change then signals the product device to deactivate the Output Ack* line. Deactivation of the Output Ack* line indicates to the MEI card 30 that the product has taken mastership. The MEI card 30 will then look for the Input Str* line to become active to begin accepting data. Failing to see this change of status (or any transfer thereafter) within approximately one second will return control back to the MEI card 30.

Figures 14, 15:
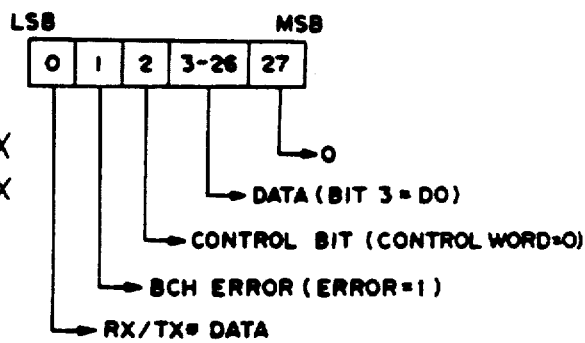
FIG. 14 is a timing diagram for the passage of a control byte from the interface to the controlled product when a response is expected from the product.
FIG. 15 is a timing diagram of a typical transfer from the controlled product to the interface.

Considering now an exchange between the controlled product 44 and the MEI card 30, a timing sequence for a typical transfer in this direction is shown in FIG. 15. Here the product device is the interface master and thus places correct information on a Data Field and Input Cont*/Data lines. When these lines are stable the product device activates the Input Str* line to the MEI card 30. The MEI card 30 reads this information and then activates Input Ack* line to the product device to acknowledge reception. This acknowledgement indicates to the product device that the transfer to the MEI card 30 is complete. Again two approaches may be used. If the product device is not returning mastership to the MEI card 30 (i e., has not completed transferring all the requested information), the product device keeps control of the Data Field lines while deactivating Input Str*. This status change then signals the MEI card 30 to deactivate the Input Ack* line. Another transaction cannot occur until the product device witnesses this change.

Figure 16:
FIG. 16 is a timing diagram of a control byte which is passed from the controlled product to the interface indicating that the controlled product is returning mastership to the interface.

When the product device has returned all requested information to the MEI card 30 (or has none to give), it passes a control byte to the MEI card 30 indicating that it is returning mastership of the interface to the MEI card 30, these control commands being described heretofore in connection with Table VI. The timing for the passage of this control byte is shown in FIG. 16 wherein it will be seen that at completion of the transfer, the product device must first tri-state the Data Field lines prior to deactivating the Input Str* line. This status change then signals the MEI card 30 to deactivate the Input Ack* line which indicates to the product that the MEI card has reestablished mastership. The product will then look for the Output Str* line to become active to begin accepting transfers from the MEI card 30. A time out by the product device is not needed in this situation since the interface, if not receiving a transfer completion within approximately one second, will resume control of the interface anyway. Also, if this control message goes undetected by the MEI card 30 (due to transmission errors) the interface will recover since the MEI card 30 will time out and resume control.

MEI CARD-EXTERNAL MASTER SERIAL INTERFACE

MEI Card/Serial Master Driver/Receiver Connections

The interface between the MEI Card 30 and the serial master card 42 is provided by an 8 position, two sided card edge connector J2 the pin connections of which are shown in FIG. 8. The MEI card 30 functions as an RS232C data communication equipment interface while the host computer 40 functions as an RS232C data terminal equipment interface. Full duplex operation employing a serial format consisting of one start bit, 8 data bits and 2 stop bits is supported. The signal description of this interface is as follows:

Master* Slave

An active low input from the serial master card 42 which informs the microcontroller 38 and the INCOM chip 36 that the MEI card 30 is to function as a master device on the INCOM network. If this signal is not driven low, the MEI card 30 will function as an expanded mode slave.

T×D

Transmit Data line. An active high signal which inputs serial data to the MEI card from the host computer 40 through the serial master card 42.

R×D

Receive Data line. An active high signal which outputs serial data from the MEI card 30 to the host computer 40.

RTS*

Request To Send line. An active low input control signal which is used to condition the local MEI card 30 for data transmission. The active state maintains the MEI card 30 in the transmit mode, while an inactive state maintains a non-transmit mode. A transition to the active state allows the MEI 30 card to enter the transmit mode, thus activating Clear To Send (CTS*) and Transferring Data across the interface on transmit data (T×D line). A transition to the inactive state forces the MEI card 30 to complete the transmission of all data which was previously transferred across the interface on the T×D line and then assume a nontransmit mode. The MEI card 30 must then respond by placing the CTS* line in the inactive state. The RTS* line cannot be turned active again until CTS* becomes inactive.

CTS*

Clear To Send line. An active low output control signal which is used to indicate whether the MEI card 30 is ready to transmit data. The active state of the CTS* line is a response to the occurrence of a simultaneous active condition of Request To Send (RTS*) and Data Set Ready (DSR*).

DSR*

Data Set Ready line. An active low output control signal used to indicate the status of the MEI card-external master interface. The active state of this signal indicates that the MEI card 30 has completed its initialization procedures, is set up in the master configuration mode and receives Data Terminal Ready (DTR*) in the active state. The inactive state is an indication to the host device 40 to disregard signals appearing on the other lines from the MEI card 30.

DTR*

Data Terminal Ready line. An active low input control signal used to control switching of the MEI card to the RS232C serial channel interface. The active state prepares the MEI card 30 for connection to the serial interface and maintains this connection established. The inactive state causes the MEI card to be removed from the serial channel following the completion of any transmission in progress. When DTR* is set inactive, it cannot be turned active again until Data Set Ready (DSR*) becomes inactive.

Baud 0, 1, 2

A three bit field input from the serial master card 42 which selects the baud rate for this serial link between the MEI card 30 and the external master computer 40. The decode of this field is the same as described previously in connection with the MEI card product serial format interface. A baud rate setting of 111b while the MEI card 30 is configured as the master device, will halt the microcontroller 38 since this configuration is undefined.

Reset*

An active low input from the serial master card 42 which provides a power up reset to the MEI card 30.

Serial Master Driver/Receiver Card 42

Figure 19:
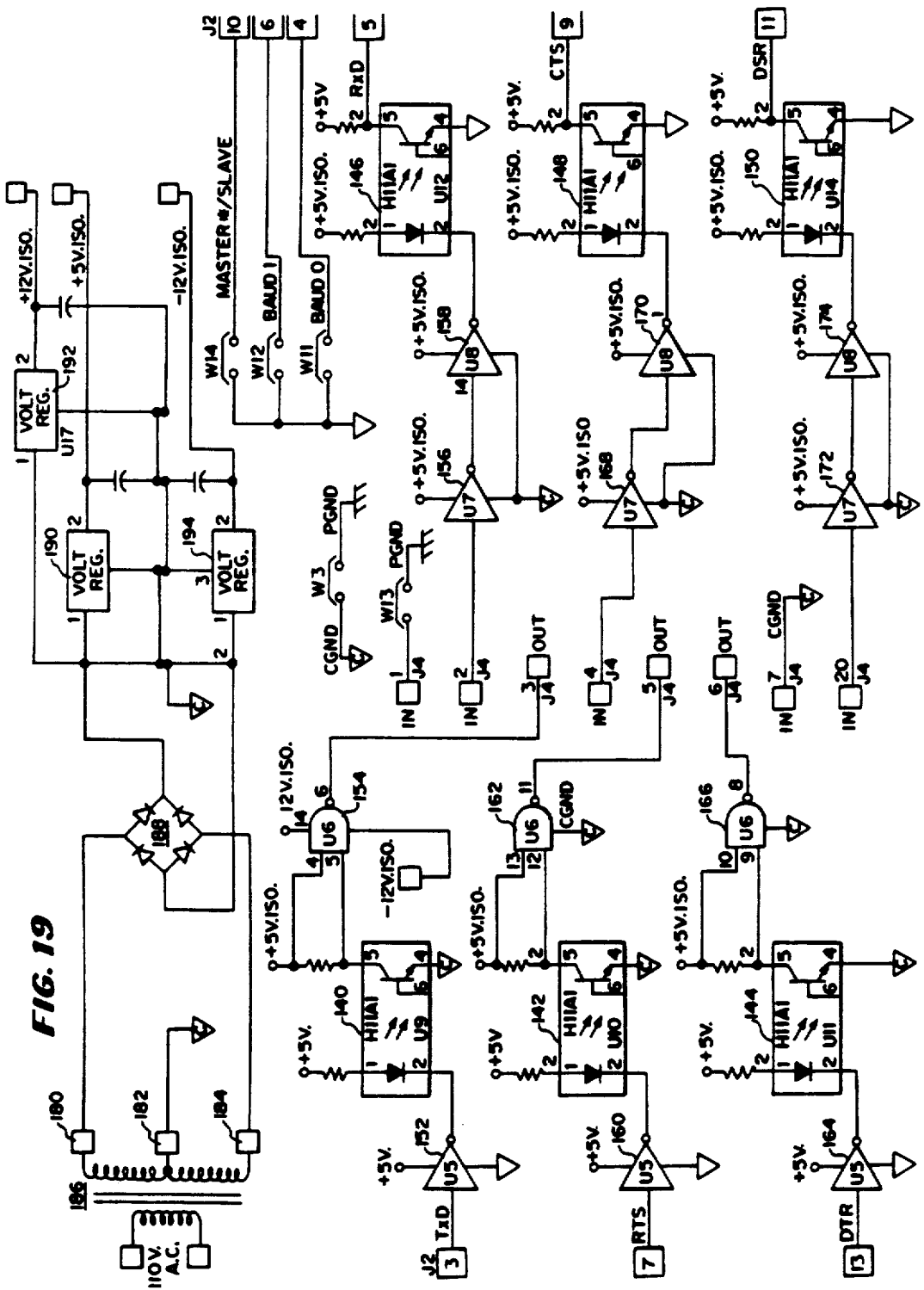
FIG. 19 is a schematic diagram of the RS232C serial master driver/receiver card of FIG. 1.

The serial master driver/receiver card 42 is shown in FIG. 19 and comprises a series of six type H11A1 opto-isolators 140-150 which are employed to electrically isolate the MEI card 30 from the RS232C connector J4 which may comprise a standard 25 pin subminiature connector. More particularly, transmissions from the MEI card 30 are supplied from the TxD line to a type 75492 inverter 152 to the diode portion of the opto-isolator 140. The output of the isolator is supplied to a type 1488 level setting driver 154 the output of which is supplied through pin 3 of the J4 connector to the master computer 40. Transmissions from this external master are supplied from pin 2 of the J4 connector through the type 1489 inverter 156 and a type 75492 inverter 158 to the diode portion of the opto-isolator 146. The output of this isolator is then supplied over the RxD line to the MEI card 30. The handshake line RTS is likewise supplied through the inverter 160 to the opto-isolator 142 the output of which is connected through the driver 162 through pin 5 of the J4 connector. The other handshake line of the MEI card 30, i.e., the DTR line is likewise supplied through the inverter 64 to the opto-isolator 144 the output of which is supplied through the driver 166 through pin 6 of the J4 connector. The CTS handshake signal from the external master is supplied from pin 4 of the J4 connector through the inverters 168 and 170 to the isolating diode portion of the opto-isolator 148, the output of which is connected to the CTS line and supplied to the MEI card 30. The DSR handshake signal is supplied from pin 20 of the J4 connector through the inverters 172 and 174 to the diode portion of the opto-isolator 150, the output of which is supplied to the DSR line of the MEI card 30. If desired, one of the handshaking lines in each direction, i.e., the DTR and the DSR lines, may be eliminated in order to reduce the cost and size of the serial master card 42. The software program listed in the Appendix a vailable in application file is based on the use of a single handshake line in each direction, i.e., the lines RTS and CTS.

The serial master card 42 is also provided with the AC voltage input terminals 180, 182 and 184 to which a suitable AC voltage is supplied from the illustrated power transformer 186, this voltage being supplied through the full wave rectifier 188 to the voltage regulators 190, 192 and 194. The voltage regulator 190 is preferably a type LM7805CT and supplies an isolated +5 volts to the indicated portions of the serial master card 43. The voltage regulator 192 is preferably a type LM78M12CP and supplies +12 volts isolated and the voltage regulator 194 is a type LM7912CT and supplies −12 volts isolated to the indicated portions of the serial master card 42.

In the embodiment of the serial master card 42 shown in FIG. 19 (and in the attached listing) only two baud rate conductors, i.e., baud 0 and baud 1 may be selected by means of the jumpers W11 and W12 which are connected to the pins 4 and 6, respectively, of the J2 connector. Accordingly, selective closure of these jumpers allows a selection of baud rates of either 300, 600, 1200 or 2400. Also, in the embodiment of FIG. 19 control of the master-slave configurations is not made from the external master 40 so that pin 10 of the J2 connector is left blank. In this embodiment, control of the master-slave configuration is provided by a master-slave jumper W4 on the MEI card 30, the connections for which are shown in dotted lines in FIGS. 5 and 6. When the jumper W4 is used the master*/slave connections shown in dotted lines in FIGS. 5 and 6 are used instead of the connections shown in full lines in these figures. In the alternative, the master/slave jumper W14 in the serial master card 42 may be connected to pin 10 of J2, in which case the connections shown in full lines in FIGS. 5 and 6 are used.

External Serial Master Format and Operation

Figure 20:
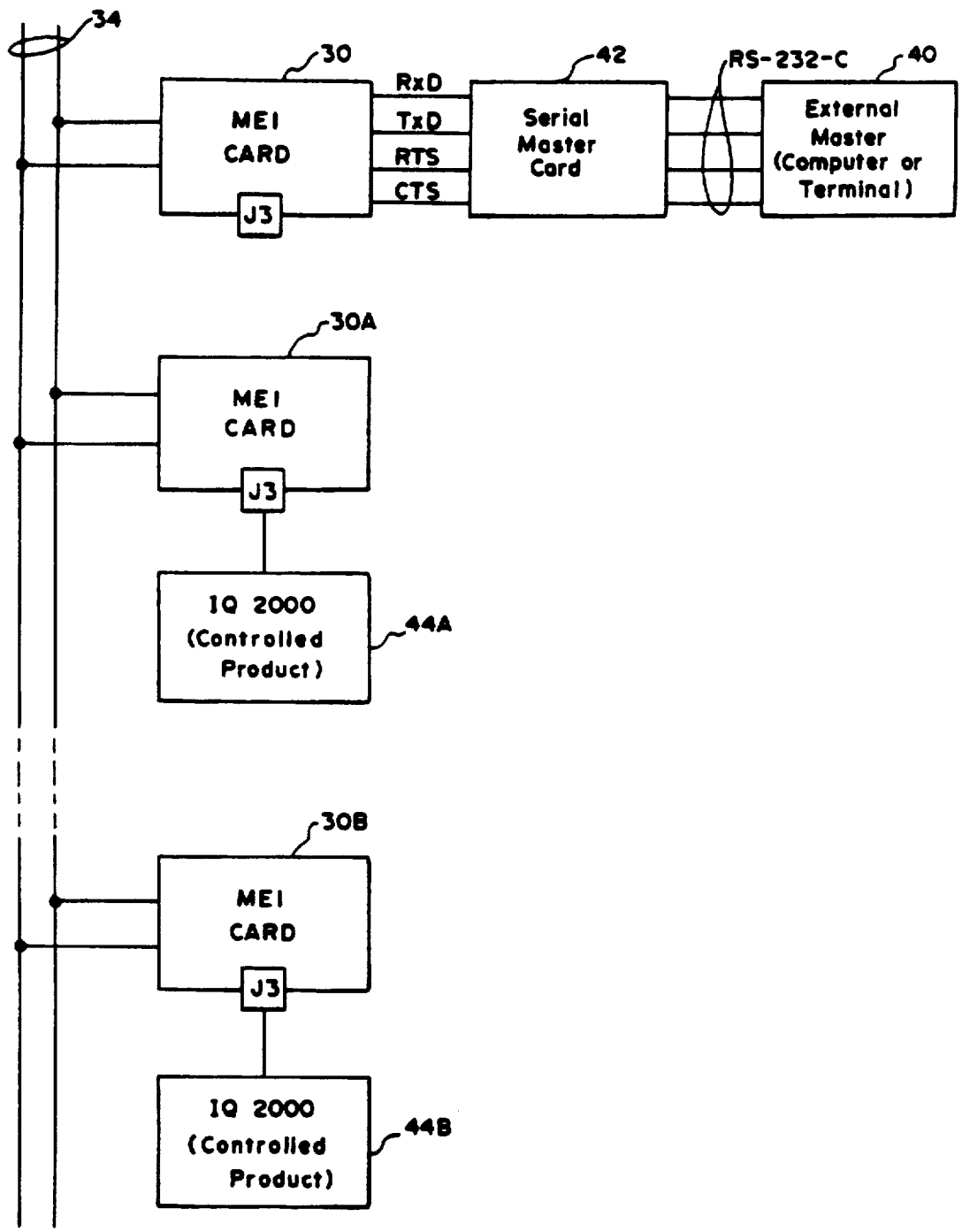
FIG. 20 is a block diagram of a typical IQ2000 control system using an external master-to-INCOM interface and INCOM slave-to-parallel-product interfaces.

In discussing the format and operation of the serial interface between the MEI card 30 and an external master 40, a system such as shown in FIG. 20 will be considered. In this system, the MEI card 30 has no controlled product connected to its J3 connector and receives ASCII encoded serial data from the external master computer or terminal 40 through the serial master card 42. The MEI card 30 strips off the ASCII card protocol and formats the message received from the external master 40 into the INCOM protocol shown in FIGS. 9 and 10 and loads the control or data message into the serial shift register of the INCOM chip 36 on this MEI card 30. After this message has been stored in the INCOM chip 36 of the MEI card 30 a message is transmitted over the INCOM network line 34 to a number of MEI cards 30A, 30B each of which is associated with an IQ2000 motor controller (controlled product) which is connected to the J3 connector of each of these MEI cards 30A, 30B. In the system of FIG. 20, the microcontroller 38 of the MEI card 30 is operated in the master RS232C-to-INCOM network configuration by closure of the jumper W4 on the MEI card 30. On the other hand, the MEI cards 30A and 30B which provide communication with the IQ2000 products 44A and 44B, respectively, are operated in the INCOM slave-to-parallel product configuration by opening the jumper W4 and supplying a low signal to pin 8 of the J3 connector from the associated IQ2000 microprocessor. The MEI cards 30A and 30B thus operate in accordance with the INCOM network-MEI card interface protocol discussed in detail heretofore in connection with the controlled product 44.

As discussed generally heretofore, any data transmitted from an IQ2000 controlled product originates in that unit's Data Table. This Data Table is an area in memory which contains the most current operating information and system status data. As shown in FIG. 18, the IQ2000's Data Table is considered as being organized into 16 separate areas, called buffers, each of which contains 32 bytes of data numbered 0 through 31. Groupings of three adjacent bytes are conveniently associated together into what are called buffer segments, each of which has a unique address which is programmed when the specific data in that area is accessed.

The external master 40 in the system of FIG. 20 may access data from a selected one of the IQ2000's, either as a single buffer segment or as a group made up of from 2 through 11 buffer segments which are numerically adjacent. The external master may also access a complete 32 byte buffer which is composed of eleven buffer segments. The MEI cards 30A and 30B act as interfaces between the IQ2000's Data Table and the external master device, it being realized that the Data Table is never directly accessed by the master device but instead requests are sent to the MEI card 30A or 30B which transfers data out of the associated IQ2000 Data Table and makes it available for transmission, one buffer at a time. The function of the MEI cards 30A and 30B are thus to control the transfer of specific data out of the associated IQ2000 Data Table to the MEI card, to transmit that data to the external master 40, to accept transmissions of data from the master 40 intended for the microprocessor of the associated IQ2000, to reset the IQ2000 from a tripped condition when signalled to do so by the external master 40, and to generate various communication control characters related to the exchange of information, as will be discussed in more detail hereinafter. As discussed generally heretofore, the MEI cards 30A and 30B are provided with two product buffers which are organized identically to the Data Table buffer, as shown in FIG. 18, each of these product buffers being alternately updated in accordance with the data in the corresponding buffer of the Data Table of the associated IQ 2000.

As discussed generally heretofore, the external master 40 may be a host computer, a personal computer, or any RS232C device capable of sending and receiving ASCII characters. The IQ2000's 44A and 44B are always considered to be slave devices. Considering very generally the various types of communication requests which the external master 40 may send to an IQ2000, these communication requests may either be (1) request for operating information, (2) request for system status data, or (3) request for miscellaneous data. In requesting current operating information, the external master 40 requests that the current operating data in a specific Data Table buffer be transferred into the product buffers of the associated MEI card 30A or 30B, this buffer being one of the 16 buffers available in the Data Table of the IQ2000. The external master can also send requests for the current system status of the IQ2000. These system status requests can include (1) motor command system, i.e., IQ2000, status; ready, run, trip or alarm condition, (2) motor contactors status; slow, fast or reverse, or (3) specific product and division codes related to the individual IQ2000 being addressed.

Figure 21:
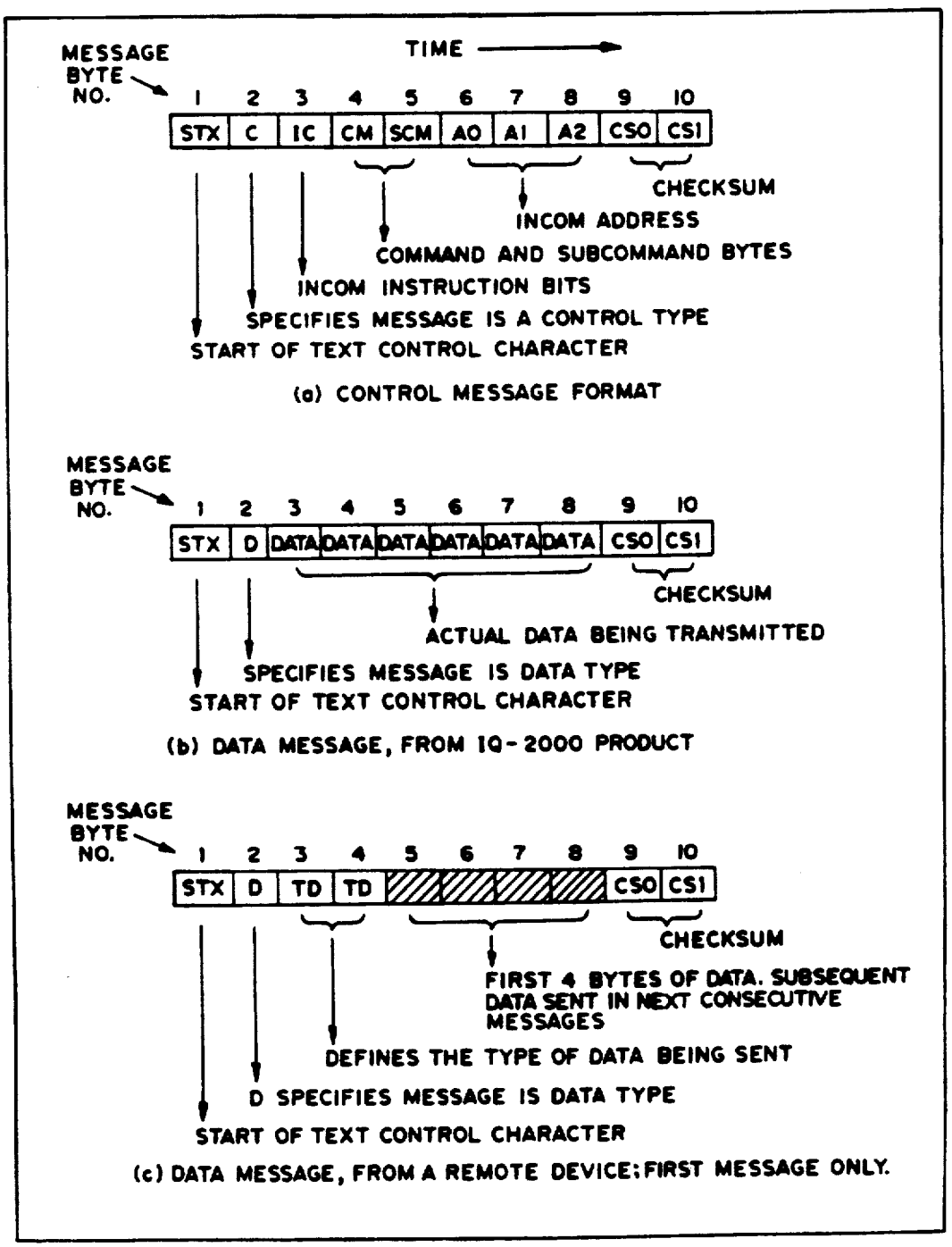
FIG. 21 shows several message byte formats in a limited ASCII protocol, these formats being utilized in the RS232C serial master arrangment of FIG. 20.

In accordance with an important aspect of the disclosed system, transmission of serial data over the RS232C conductors from the external master 40 to the MEI card 30 employs only a limited number of ASCII standard code characters to minimize errors in transmission. Using this limited ASCII protocol, data, information and command characters are transmitted within "messages". Thus, as shown in FIG. 21, each ASCII message is made up of 10 bytes. If the transmitted intelligence requires fewer than 10 bytes, zeros are used to fill out the unused bytes. Also, as discussed generally heretofore, a maximum of eleven messages can be sent to or from a single buffer at a given time. In conformity with the INCOM network protocol shown generally in FIGS. 9 and 10 and described in detail in the above-identified copending Verbanets application Ser. No. 625,747, these messages are of two basic types. The first type is a control message, such as shown in FIG. 21(a), which contains the command characters that initiate functions such as accessing and returning specific Data Table information from an IQ2000. These control messages are sent by the external master 40, although in one instance the MEI card 30A or 30B associated with an IQ2000 generates a command acknowledge message, which may be considered a control message. The second type of message is a data message, such as shown in FIG. 21(b), which generally contains the current operating information or system status data. These data messages are generated by the MEI cards 30A or 30B associated with an IQ2000.

As shown in FIGS. 21A and B, the first byte of each message type is dedicated to the common ASCII communication control character STX. Certain of the remaining nine bytes of each message may contain either the requested operating information and/or system status data or, alternately, they may define the type of control message being transmitted. As shown in FIG. 22(c), each of the ten bytes of a single message contains one start bit, seven ASCII encoded bits, one parity bit, and two stop bits. As shown in FIG. 22(a), the lower nibble (bits 0 through 3) of the ASCII encoded bits contains either the transmitted data from the IQ2000, or the command characters from the external master 40. Bits 4 through 6 of the upper nibble are added to encode the actual binary states of bits 0 through 3 into the ASCII 8 bit code. Thus the data which is intended to be transmitted as shown in FIG. 22(a), which is the equivalent of 5H, is encoded into ASCII with a parity bit add-on, as shown in FIG. 22(b) which is the equivalent of 35H.

TABLE VII

| ASCII ENCODING CHART | | | |
|---|---|---|---|
| Data Nibble (Bits 0 thru 3) | | ASCII Encoded Data (Bits 0 thru 7) | |
| Hex | Binary | Hex | Binary |
| 00 | 0000 | 30 | 0011 0000 |
| 01 | 0001 | 31 | 0011 0001 |
| 02 | 0010 | 32 | 0011 0010 |
| 03 | 0011 | 33 | 0011 0011 |
| 04 | 0100 | 34 | 0011 0100 |
| 05 | 0101 | 35 | 0011 0101 |
| 06 | 0110 | 36 | 0011 0110 |
| 07 | 0111 | 37 | 0011 0111 |
| 08 | 1000 | 38 | 0011 1000 |
| 09 | 1001 | 39 | 0011 1001 |
| 0A | 1010 | 41 | 0100 1010 |
| 0B | 1011 | 42 | 0100 1011 |
| 0C | 1100 | 43 | 0100 1100 |
| 0D | 1101 | 44 | 0100 1101 |
| 0E | 1110 | 45 | 0100 1110 |
| 0F | 1111 | 46 | 0100 1111 |

Table VII shows a complete ASCII conversion chart for the 4 available data or control bits employed in each byte of the 10 byte message. In this Table, the columns headed Hex are included only to identify the bit patterns more easily and in the columns headed Binary, the least significant bit is on the right. From Table VII it can be seen that the lower 4 bits of the encoded ASCII are identical to the unencoded bits. For example, 0001 is encoded as 0011 0001. The single exception to the ASCII encoding chart of Table VII is the byte format for the STX control character. As stated heretofore, the first byte of each 10 byte message must contain the ASCII control communication character STX and this byte uses the ASCII encoded bits 0000 0010 the hexadecimal equivalent of which is 02H.

Before transmissions can be correctly sent from the master device 40, they must have been encoded by a program to accomplish this ASCII encoding conversion. Master devices, such as the master device 40 capable of generating ASCII characters obviously transmit correctly encoded characters. In the following description any given character or part of a message will be noted in a single hexadecimal alpha-numeric if it is either data or command characters, as in bits 0 through 3, for example, 5H in FIG. 22(a) or will be noted in a 2 digit hexadecimal alpha-numeric when involving an actual transmission. This is the equivalent of the ASCII coded simple binary data, for example 35H in FIG.

22(b). While hexadecimal notation is used in the present description, the actual transmissions are in binary 1's and 0's as shown in FIG. 22(d), hexadecimal being used only as a convenience for reference to long binary groups in the present description. Thus, in FIG. 22(c) the external master 40 encodes binary 0101 (5H) into the equivalent ASCII 35H. It also adds a start bit, a parity bit (always zero), and two stop bits to complete the message byte. At this time, transmission of 35H can occur. In this connection, it will be noted that the least significant bit and/or the lower nibble are always transmitted first, as shown in FIGS. 22(c) and (d).

Regardless of whether a message is a control message or a data message, all messages are structured in 10 byte units. Byte 1 always contains the STX character and each message always ends with two check sum bytes CS0 and CS1 as shown in FIG. 21. Referring first to the typical and simplified control message format shown in FIG. 21(a), it should be pointed out that the letters used in the individual bytes of this message, such as C, IC, CM, and so forth, are mnemonics only and are not programmed or received. Byte 1 of this control message is always the ASCII communication control character STX (02H). If the STX character is received by the MEI card 30 at any time after the first byte of a message, the reception of that message is aborted and the new STX begins a new message.

With regard to byte 2 of the control message shown in FIG. 21(a) one of two distinct coded characters is contained in this byte of a control message depending upon whether it originates in the master device 40 or the addressed IQ2000. When the control message originates in a master device, this byte is always ASCII 1 (31H). If the control message originates in the IQ2000, this byte will be ASCII 2 (32H) if no BCH error is detected, or ASCII 3 (33H) if a BCH error is detected. Byte 3 of the control message shown in FIG. 21(a) must always be ASCII 3 (33H) when communicating with an IQ2000 over the INCOM network line 34. This ASCII encoded character corresponds to the INCOM network instruction to set up an expanded mode interface between the INCOM chip 36 in one of the MEI cards 30A, 30B and the associated multi-purpose microcontroller 38 of this MEI card. Even when communicating directly between an RS232C compatible device and a single IQ2000 connected to an MEI card, this byte 3 must be programmed 3H. If any code other an ASCII 3 is contained in this byte the MEI card ignores the message.

Bytes 4 and 5 of the control message are the command and subcommand bytes, respectively, which together define the specific content of the control message. Tables I, II and III describe the various types of commands and subcommands used in a control message.

Bytes 6, 7 and 8 of each control message list the unique INCOM address of each MEI card associated with one of the IQ2000s. More particularly, the address select switches 62 on this MEI card are set to correspond to a specific INCOM address. The range of addresses may be from 001H to FFEH. 001H and FFFH are not assigned to an IQ2000 MEI card. An address of 21AH would be transmitted as AH, 1H, 2H, for bytes 6, 7 and 8, respectively. When encoded the actual ASCII II characters would be 41H, 31H and 32H. When an RS232 device is communicating directly with an IQ2000 independently of the INCOM network, the address FFFH is used by the master.

Bytes 9 and 10 of the control message are the low and high check sum "nibbles". Bits 0 through 3 of these bytes contain the nibbles which together form the check sum. This check sum is the two's complement of the sum of bits 0 through 3 of the first eight bytes of the message. For example, in the specific control message shown in FIG. 23, wherein the command and subcommand bytes are 38H and 33H, respectively and the INCOM address is 30H, 30H, 36H, the binary equivalents of bits 0 through 3 of the first eights bytes of the control message shown in FIG. 23 are added together for a total of 10111b or 17H. The check sum is the two's complement of 10111, which when added to 10111, equals 0 and a carry. The actual transmission of the check sum is 39H and 45H for bytes 9 and 10, respectively, where 39H is the low byte; bits 0 through 3 equal 1001 (9H), transmitted as ASCII II 9 (39H) and 45H is the high byte; 0 through 3 equals 1110 (EH) transmitted as ASCII II E (45H).

As discussed generally heretofore, a data message usually originates in one of the MEI cards 40A, 40B associated with an IQ2000. A typical simplified data message format is shown in FIG. 21(b), the letter D and the word "data" used in this figure being mnemonic and are not the characters programmed or received. Thus, the mnemonic D in byte 2 indicates that this is a data type message. In actual programming, when a data message originates in an MEI card associated with an IQ2000, byte 2 contains ASCII 2 (32H) if no BCH error is detected in transmission over the INCOM network. If a BCH error is detected, byte 2 contains an ASCII 3 (33H).

Bytes 3 to 8 of the data message shown in FIG. 21(b) contain the transmitted data. Thus, each message contains six nibbles (3 bytes) of data which may be loaded into the serial shift register of the INCOM chip 36 on the MEI card 30, for example. In this connection, it will be recalled that only bits 0 through 3 of each byte are data, bits 4 through 7 being the add-on ASCII II encoding and parity bits, as shown in FIG. 22(b). Bytes 9 and 10 of the data message are check sum bytes and are derived as described in detail heretofore in connection with FIG. 21(a).

Although most data messages are generated by the IQ2000 communication's hardware, a data message may, if desired, originate at the external master 40. FIG. 21(c) shows a data message of this type. In this figure, the letters D and TD are mnemonics only. When a data message originates in a master device, byte 2 contains ASCII II 0 (30H). Bytes 3 and 4 of the first message only define the type of data being transmitted. Subsequent bytes, shown shaded in FIG. 21(c), may contain any desired data. Messages after the first data message from the external master 40, follow the byte format shown in FIG. 21(b).

An acknowledge character indicates whether or not the syntax of the last message received from the external master 40 was correct. This character is only generated by the IQ2000 communication hardware. If the syntax of the message received is incorrect, a negative acknowledge character is returned to the master device. The characters transmitted are standard ASCII II coded characters, i.e., acknowledge-ASCII II ACK (06H) or negative acknowledge-ASCII II NAK (15H).

In accordance with a further aspect of the disclosed system, an echoing function is enabled and disabled by the external master 40 the purpose of which is to assure that a character transmitted from the external master 40 is correctly received by the MEI card 30. This assurance comes about by causing the MEI card 30 to retransmit or echo to the external master 40 identical or similar characters to those received from the master. Single characters can be sent directly from an ASCII II coded keyboard device as the external master 40, but these must be included within the message formats shown in FIG. 21. In such a case, when an illegal message format is sent to the MEI card 30, this card would also generate a NAK character. Enabling and disabling of the echo function is accomplished by the ASCII II control characters DC2 (12H) and DC4 (14H), respectively. After the function is enabled or disabled, the alpha character A (41H) or N (4EH) is generated by the MEI card 32 to indicate that the control character was or was not properly received. Thus, in using the echo function, the master device transmits a DC2 control character to enable the echo function. The MEI card 30 generates the alpha character A to indicate an acknowledgement of the command. Had the command not been accepted, the alpha character N would be sent back to the master device.

In accordance with a further aspect of the disclosed system, the ASCII II characters CR (carriage return) and LF (line feed) are echoed back to the external master 40. This echoing may cause double spacing on the master device's display. Lower case alpha characters a through f are echoed back as corresponding upper case characters. Illegal ASCII II characters are echoed back although they cause a syntax error. This in turn causes the control character NAK to be generated by the MEI card 30. The DEL (7FH) control character, sometimes called RUB, and BS (08H) character both perform the same function, i.e., to erase the last character received. DEL/RUB is, however, echoed back to the master device 40 as BS. This control character frequently moves the cursor one space to the left on terminals. These two control characters are included primarily for debugging of communications when a dumb terminal is being used as the external master 40.

In accordance with a further aspect of the disclosed system, the MEI card 30 generates XOF (transmit off) and XON (transmit on) characters to signal that this unit is busy processing a previously received message or that it is free to accept a new message. The ASCII control character DC3 (13H) is used for XOF and the character DC1 (11H) is used for XON If the master device 40 begins to transmit a new message, the MEI card 30, when busy with a previously received message, generates an XOF character after two characters of the new message are received. The MEI card 30 completes the in-progress processing and then generates an XON character. The master can then retransmit the new message. It should be noted that DC1 (XON) is generated only if a DC3 (XOF) character had been sent earlier. Also, the MEI card 30, if it receives these characters from a master, interprets them as bad characters.

Although the DEL/RUB (7FH) and BS (08H) control characters are not usually included in messages sent from the master device, they may, at times be so included. These characters are considered by the MEI card 30 as being legal, and will cause a BACK UP/ERASE function even when the echo function is disabled.

Certain of the control and format effecter characters need to be qualified with respect to the effect they have on the byte count of each ten-byte message. Illegal or bad characters will be counted in the total message's byte count and will cause a syntax error to be detected and a NAK to be generated. However, the format effecter or control characters CR (ODH), LF (OAH), DC2 (12H) and DC4 (14H) are not counted in the message's byte count or check sum calculations. The control characters DEL/RUB (7FH) and BS (08H) are not counted in the messages byte count. Also, when these characters are used, they subtract the last byte from the count.

A listing of the limited ASCII II protocol which can be transmitted to or generated by the MEI card 30 is shown in FIG. 24. In this figure an X located in the column heading VALID TRANS. means that the associated character is valid for transmission from the MEI card 30 to the master device 40. An X located in the column heading VALID RECV. means that the associated ASCII II character is valid for reception by the MEI card 30 from the master device 40. In the column heading KEYBOARD GENER. a description is given of how to manually generate the various ASCII II characters from a dumb terminal or ASCII II coded keyboard. To generate a control character from a keyboard, the control (Ctrl) key is pressed and held and then the desired alpha character is pressed before releasing both keys.

FIGS. 25-32, inclusive, are tables showing a number of specific examples of transmissions which take place between the MEI card 30 and the external master 40 in accordance with the limited ASCII II protocol of the disclosed system. In these examples the sequential events of each transmission are given in table form wherein each message is divided into its ten-byte components. Each transmission "event" is made up of two lines where the first line contains the STX control character, the message type specifier, the data being transmitted (in the case of a data message) or the command and subcommands and address (in the case of a control message) and two check sum characters. The second line contains the actual transmission. In the case of the STX or ACK characters, this is simply the hexadecimal equivalent of the binary control character. In the case of other characters, the second line shows the hexadecimal form of the encoded ASCII II characters which will be transmitted, although the suffix H is not shown for simplicity. The acknowledge character (ACK) is a single character transmission shown in the far left column in these figures.

In FIG. 25 an example of the transfer of the complete fourth buffer (address 3H) of an IQ2000's Data Table to the external master 40 is given. Thus, referring to this figure, event number 1 is the request by the external master 40 that the fourth buffer (address 3H) of the IQ2000 associated with the MEI card set to address 023H be transmitted to the holding buffers of this MEI card. Event number 2 is the acknowledge character sent by the MEI card 30 to the master device 40 indicating that the syntax of the last message was correct. Event number 3 is the command acknowledge message sent to the master device 40 from the MEI card of the IQ2000 polled, 023H in this example. Event number 4 is a request by the master device 40 that the latest complete buffer in the MEI card set to address 023H be sent from this MEI card over the INCOM network and through the MEI card 30 to the master device 40. Event number 5 is the acknowledge character sent by the MEI card 30 to the master device 40 indicating that the syntax of the last message was correct. Event number 6 is the first data message corresponding to the first buffer segment of the fourth buffer of the IQ2000's data table after it has been stored in the active holding buffer of the associated MEI card. Data nibbles are shown with the byte number, L designating the low nibble and H the high nibble. Thus in this first of the eleven data messages, byte 0, 1 and 2 are listed above the data nibbles. Events 7 through 16 are the second through eleventh data messages needed to transmit the entire fourth buffer requested. Event 17 is the command acknowledge message sent to the master device 40 from the MEI card associated with the IQ2000 polled, indicating that transmission of data is complete.

In FIG. 26 an example of the transfer of a single buffer segment having buffer segment address 6H from the fourth buffer (address 3H) of the IQ-2000's Data Table to the master device 40 is given. Referring to this figure, event number 1 is a request by the master device 40 that the fourth buffer (address 3H) be transmitted to the MEI card associated with an IQ2000 having address 009H. Events 2 and 3 are similar to that described in detail heretofore in connection with FIG. 25. In event number 4, the master device requests buffer segment 6H from the MEI card with address 009H. This segment may, for example, contain ground current and one byte of the winding temperature data. Event number 5 is similar to that described heretofore in connection with FIG. 25. Event number 6 is the data message containing buffer segment 6H. In this example the data byte numbers 18, 19 and 20 are listed above the typical data. Event number 7 is similar to that described in detail heretofore in connection with FIG. 25.

In FIG. 27 an example of the transfer of more than one buffer segment of the IQ2000's Data Table to the master device 40 is given. Referring to this figure, event number 1 is a request by the master device 40 that the fifth buffer (4H) be transferred to the holding buffer of the MEI card set to address 124H. Events 2 and 3 are similar to that described in detail heretofore in connection with FIG. 25. Event number 4 is a request by the master device 40 that buffer segments of the fifth buffer (4H) up to and including buffer segment 1 (these are segments 0 and 1) be sent from the MEI card set to address 124H over the INCOM network and through the MEI card 30 to the master device 40. Event number 5 is similar to that described heretofore. Event number 6 is the first message of the two messages sent and contains buffer byte number 0, 1 and 2. Event number 7 is the second data message and contains buffer bytes 3, 4 and 5 whereupon buffer segments 0 and 1 have been transferred. Event 8 is similar to that described heretofore.

In FIG. 28 an example of the request by the master 40 for the run/trip/alarm status of the addressed IQ2000 which is transmitted within a control message. Referring to this figure, event number 1 is a request by the master device 40 for the status of the IQ2000 associated with the MEI card set to address 4A2H. Event number 2 is the acknowledge character sent to the master device 40 by the MEI card 30 to indicate the syntax of the last message is correct. Event number 3 is the status bit message sent from the MEI card having address 4A2H over the INCOM network and through the MEI card 30 to the master device vice 40 where the status bits ST may be as follows:

00=motor ready, not running
01=motor running
10=trip condition
11=alarm condition.

The 2H(10b) shown in the example in event 3 indicates a trip condition.

In FIG. 29 an example is given of the transmission events when the master requests the status of the MEI card associated with the polled IQ2000. Thus, referring to this figure, event number 1 is a request by the master device 40 for the status of the MEI card set to address 354H. Event number 2 is the acknowledge character sent by the MEI card 30 indicating the syntax of the last message was correct. Event number 3 is the MEI card status message sent by the MEI card set to address 354. This message will have command and subcommand bytes (C and SC) as set forth in Table 1A described in detail heretofore. Event number 4 is the command acknowledge message sent by the MEI card at address 354 indicating that the transmission of the MEI card status is complete.

In FIG. 30 an example of a request from the master device 40 to reset a particular MEI card associated with one of the IQ2000s on the INCOM line 34 is given. Referring to this figure, event number 1 is a request by the master device 40 to reset the MEI card which is set to address 026H. Event number 2 is the acknowledge character sent by the MEI card 30 to indicate the syntax of the last message was correct. Event number 3 is the command acknowledge message sent by the MEI card having address 026H indicating that the reset command has been accepted.

In FIG. 31 an example is given of a request by the master device 40 to reset a particular IQ2000 with direct product acknowledgement. Referring to this figure, event number 1 is a command by the external master 40 to reset the IQ2000 and initiate a response from the MEI card after this MEI card (30A or 30B) has received a response from the IQ2000 polled, address A12H in this example. Event number 2 is the acknowledge character sent by the MEI card 30 to indicate the syntax of the last message was correct. Event number 3 is the direct response message from the IQ2000 associated with the MEI card set to address A12H which indicates that the IQ2000 has been reset.

In FIG. 32 an example is given of a request by the master 40 to reset an IQ2000 with response only from the MEI card 30A or 30B acknowledging that this MEI card has passed the message on to the product. Referring to this figure, event number 1 is a request by the master 40 to reset the IQ2000 associated with the MEI card having the address 124H and to initiate an immediate response from this MEI card. Event number 2 is the acknowledge character sent by the MEI card 30 indicating the syntax of the last message was correct. Event 3 is the command acknowledge message sent from the MEI card polled by way of the MEI card 30 to the master device 40 indicating that the reset command was received.

MEI CARD SOFTWARE PROGRAMS

As discussed generally heretofore, the microcontroller 38 in the MEI card 30 is programmed in accordance with the software programs given in the Appendix, available in U.S. Pat. No. 5,007,013. Considering very generally, the INCOM slave-to-parallel product (INCOM/product, or slave/product) software module on pages A-1 to A-31 of the attached listing includes testing of the status of the master*/slave port P2.7 and the slave PAR*/serial port P3.7 during the initialization phase thereof to determine in which configuration the MEI card 30 is to operate. Furthermore, this software module has the proper jumps for going to the other modules i.e., the master RS232C-to-parallel product module (master/product, or M/P) on pages A-32 to A-60, of the Appendix, available in U.S. Pat. No. 5,007,013 and the master RS232C-to-INCOM network module (master/INCOM, or master/serial, M/S) on pages A-61 to A-71 of the Appendix available in U.S. Pat. No. 5,007.013. In general, these last two modules put data in the registers of the INCOM/product module rather than calling up routines from this module.

INCOM/Product Configuration

Considering first the INCOM/product configuration, FIGS. 33-49 are flow charts illustrating the logic flow in the portion of the INCOM/product configuration on pages A-11 to A-31 of the Appendix, available in U.S. Pat. No. 5,007,013. Pages A-1 A-10 of the Appendix available in U.S. Pat. No. 5,007,013 give the external jumps for other configuration code, external flag, register and RAM definitions, and MEI status definitions, port locations, product protocol definitions and INCOM bus protocol definitions.

Referring to FIGS. 33-49, all interrupts are disabled during logic flow from the point labelled "!D" to the point labelled "!E". Also, since there are two product buffers in the microcontroller 38 which are alternately updated from the selected buffer of the controlled product 44, an asterisk is used in these figures to indicate the same flow using different buffer number flags. Also of importance in these figures is the correlation of various points in each flow chart with the label terminology used in the listing of the attached Appendix. For example, the label INIT-MASTER-SERIAL-SET UP shown in FIG. 33 corresponds to the instruction given on page A-11 of the Appendix, available in U.S. Pat. No. 5,007,013 and permits a correlation of the comments given in the listing with the flow of logic at this point in the initialization flow chart shown in FIG. 33. In FIGS. 33-49 the following abbreviations are used:

| | |
|---|---|
| SRUN- | Slave Run Loop |
| SPAR- | Slave Parallel Interface to Product |
| SPIN- | Slave Parallel Input from Product |
| SPOT- | Slave Parallel Output to Product |
| PCMD- | Product Command |
| PROD- | Product |
| CMD- | Command |
| CONT- | Control |
| DAT- | Data |
| PTR- | Pointer |
| INCR- | Increment |
| STR- | Strobe |
| INT- | Interrupt |
| CNT- | Counter |
| ADR- | Address |
| REC- | Receive |
| MESS- | Message |
| ICMD- | Command from INCOM master |
| DECR- | Decrement |
| ANO- | Another |
| IC- | INCOM |

As discussed generally heretofore, the two product buffers are used by two configurations, the INCOM/product configuration and the master/product configuration. In the INCOM/product configuration, each buffer is 48 bytes long, and is capable of holding 16 INCOM formatted messages. For the master/product configuration, each buffer is reduced to 36 bytes (12 messages). Only data messages are stored in these buffers. Normally these product buffers are both dedicated to use by the product to fill them with the particular product buffer number. Three status flags for each buffer designate which buffer has valid information and who has control of it. When a command designates it is sending data messages to a product, one of the buffers is relinquished from control by the product. Either the INCOM or the RS232C port then fills this buffer for later transmittal to the product. After the message block has been sent on to the product, control is again passed back to the product. At no time can either the INCOM or RS232C port software have control of more than one of the product buffers. Pointers define where valid information is located within the product buffer, combined with the status flags. Each buffer is contiguous except for its first byte. The two buffers are stored end-to-end and occupy the high value memory locations of internal RAM of the microcontroller 38.

Figure 34:
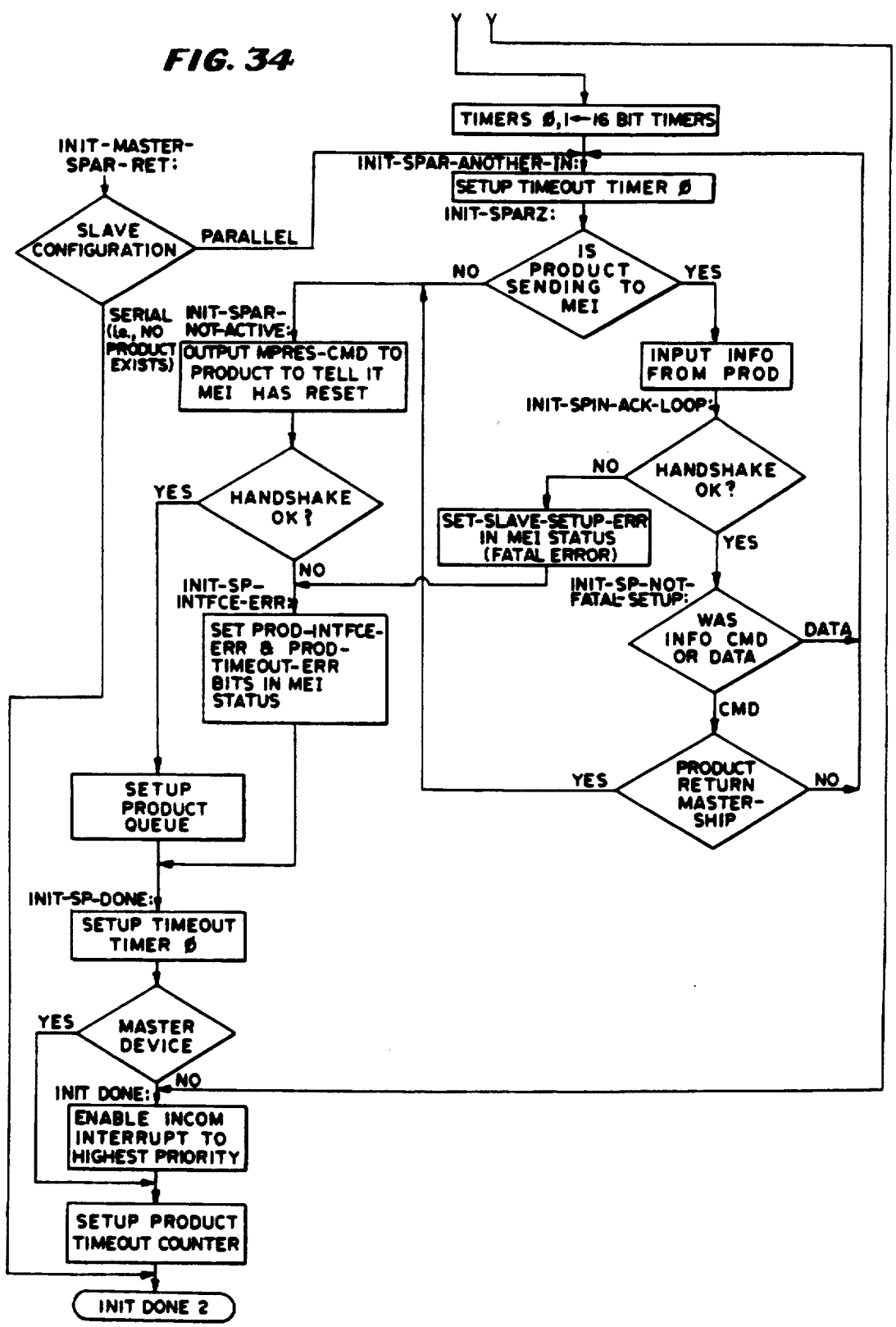
Figure 35:
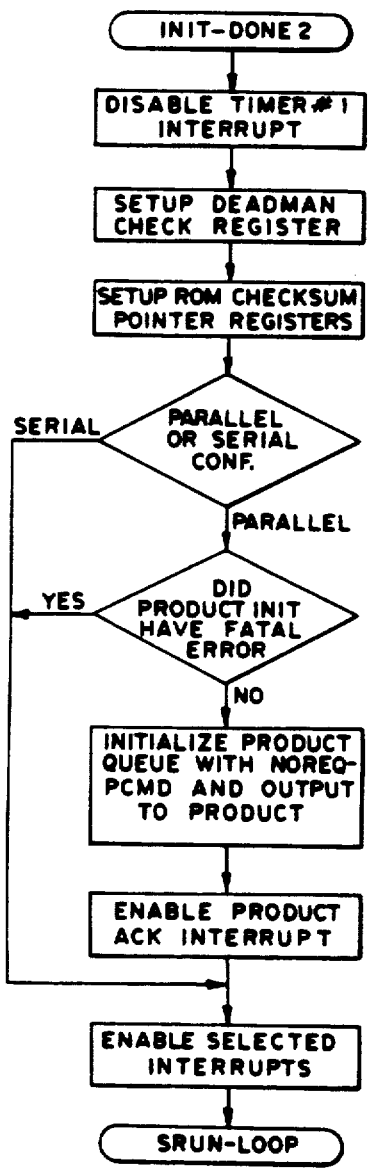

The initialization routines shown in FIGS. 33-35 are used for all three configurations of the MEI card 30. FIG. 33 INIT-START is the initialization routine used for setting the hardware, serial ports, initializing the INCOM chip 36, and checking the master/slave and parallel/serial setting of the ports P2.7 and P3.7. These initialization routines are used at start-up or when the deadman circuit times out. The initialization routine also jumps at INIT-MASTER-LJMP (FIG. 33) to the initialization routines used during master configurations of the MEI card 30 and returns at INIT-MASTER-SPAR-RET on FIG. 34.

Figure 36:
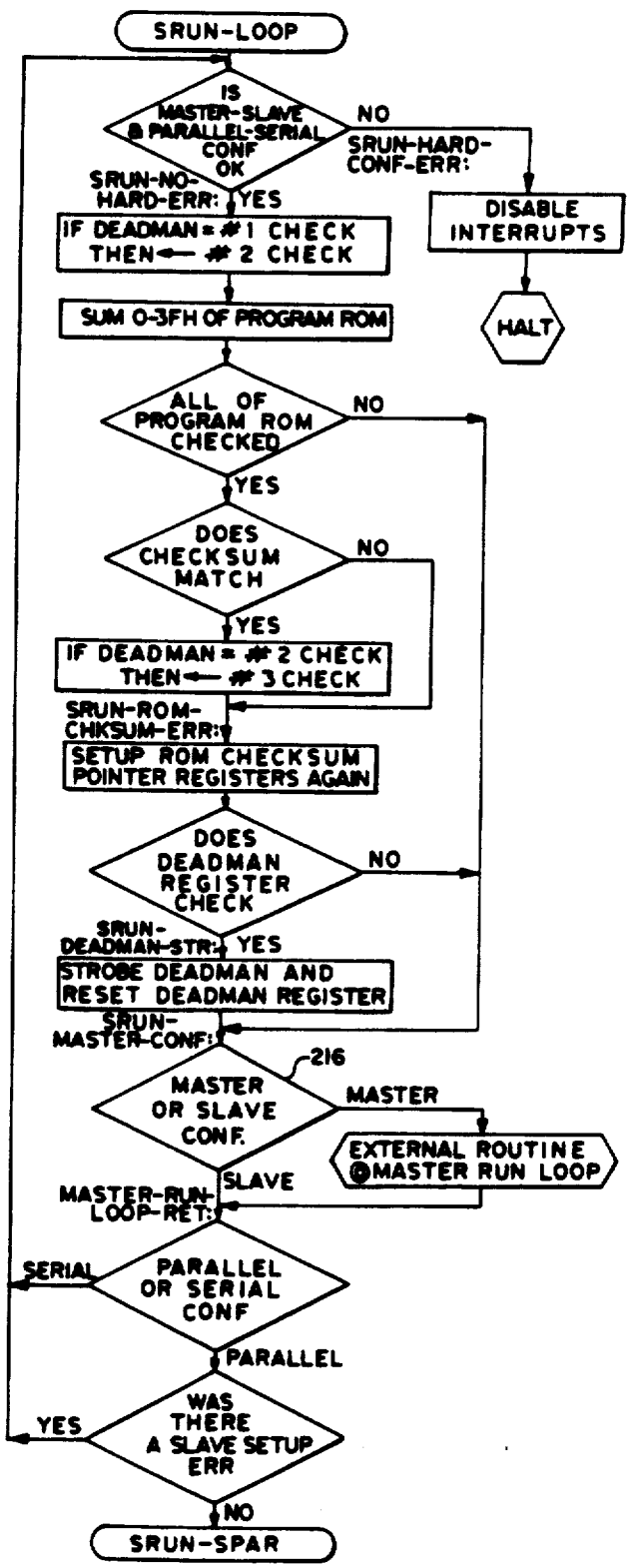
FIG. 36 is a flow chart of the logic flow during a portion of the multi purpose interface program which is used by all three configurations of this interface.

FIG. 36 is a flow chart of the SRUN-LOOP routine which is used for all configurations. Before the microcontroller 36 strobes the deadman, the program checks the registers in ROM and adds the numbers stored therein. The sum of these numbers should equal the number in the last ROM location. If it does not, the microcontroller 38 shuts off and resets the MEI card. If the deadman times out in the middle of a sequence, the MEI card 30 starts a new sequence with initialization. FIG. 36 includes the point at which the MASTER-RUN-LOOP of the master configurations is selected and goes to the external master routines, as will be described in more detail hereinafter.

Figure 37:
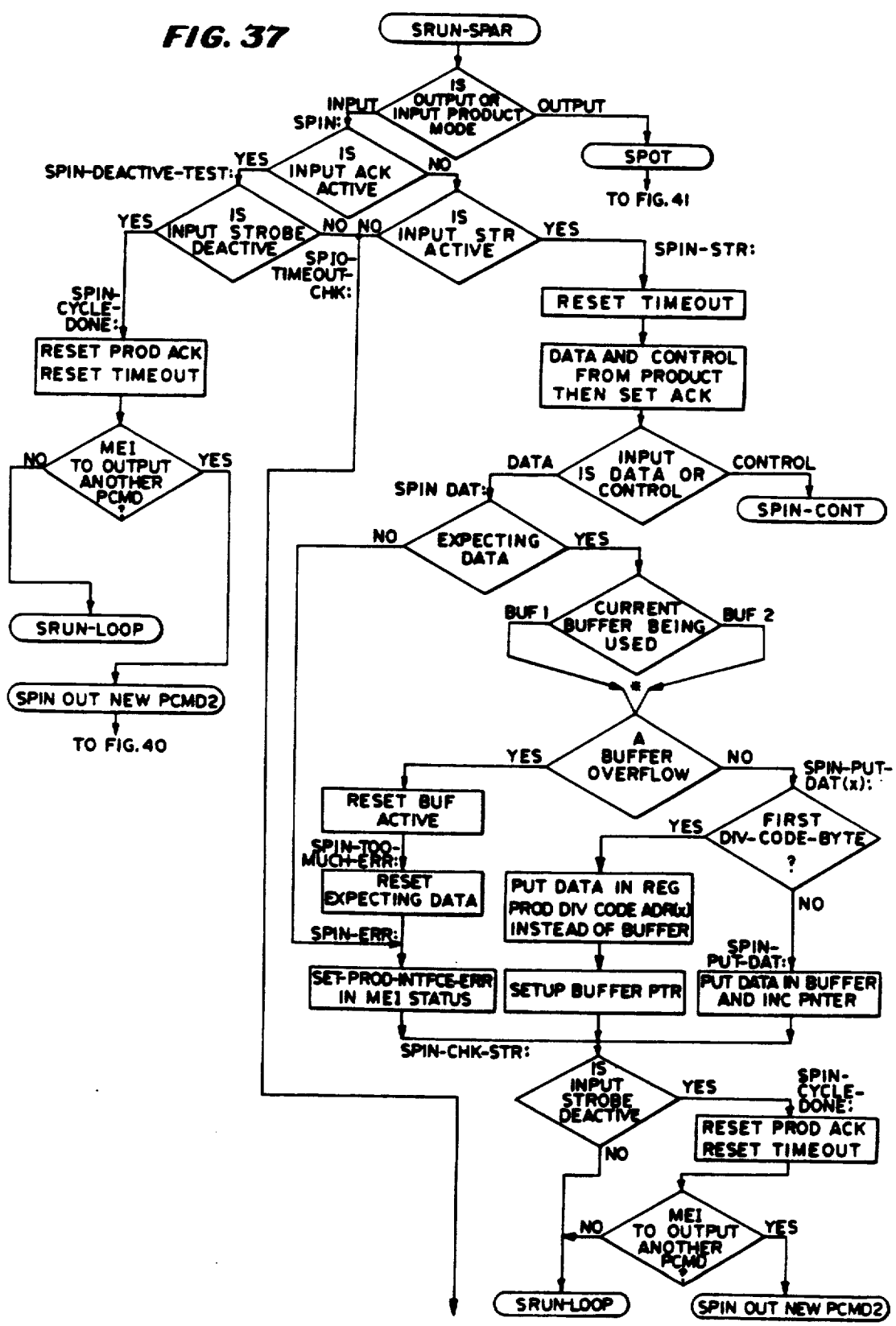
FIGS. 37 and 38, when placed in vertical alignment, FIGS. 39 and 40, when placed sidewise in vertical alignment, and FIG. 41 comprise flow charts of the logic flow during the INCOM slave-to-parallel-product configuration software program of the multi purpose interface.
Figure 38:
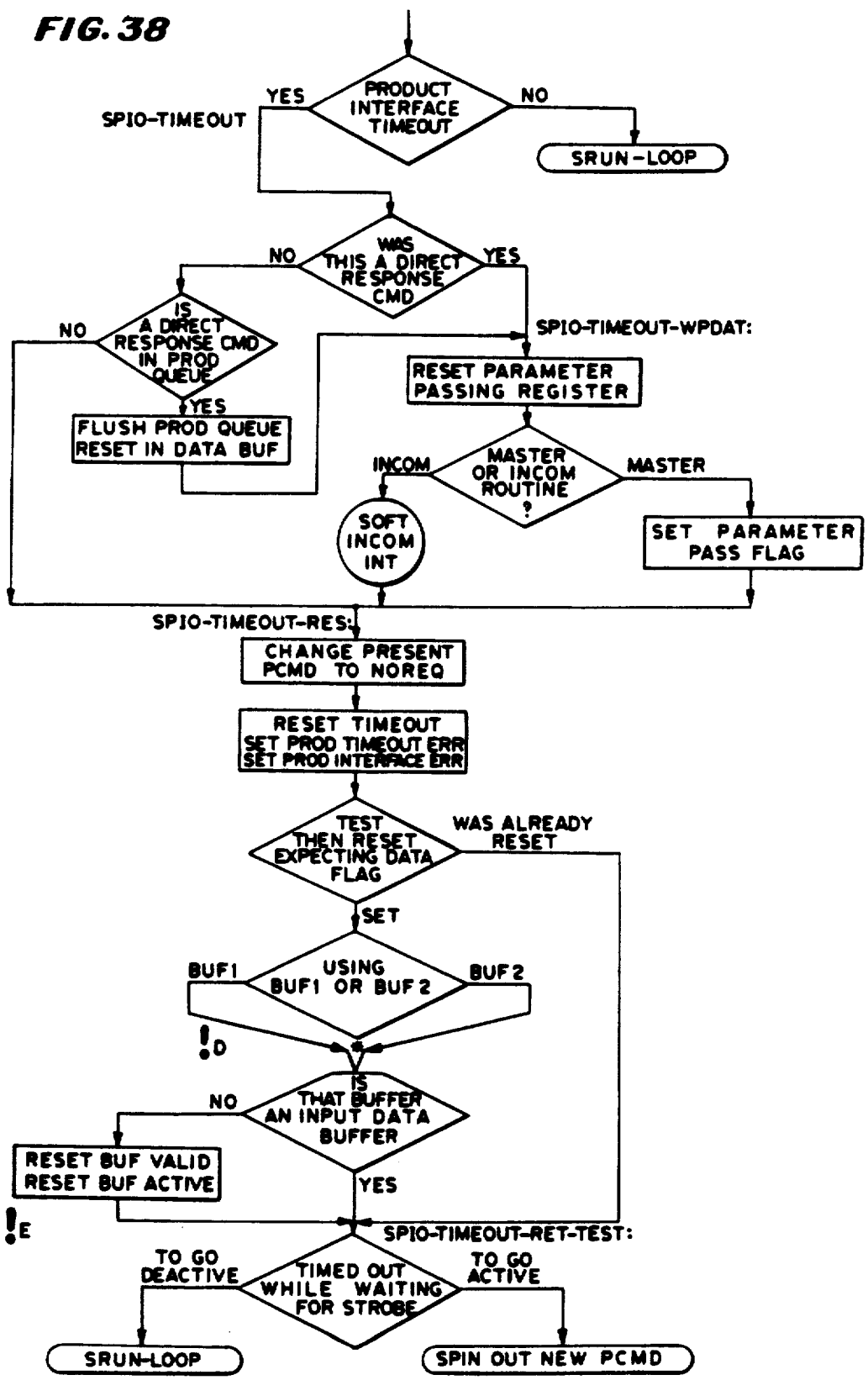

FIGS. 37-40 comprise flow charts of that portion of the slave run loop in which an input from the product to the MEI card is being received, as described heretofore in connection with FIGS. 15 and 16. Specifically, FIGS. 37 and 38 show the handling of data messages from the controlled product 44 to the MEI card 30. This routine, SRUN-SPAR, includes the soft INCOM interrupt routine IC-INT-SLAVE shown in FIGS. 44-46, at the point SOFT-INCOM-INT of FIG. 38, if a direct response command is received.

Figure 39:
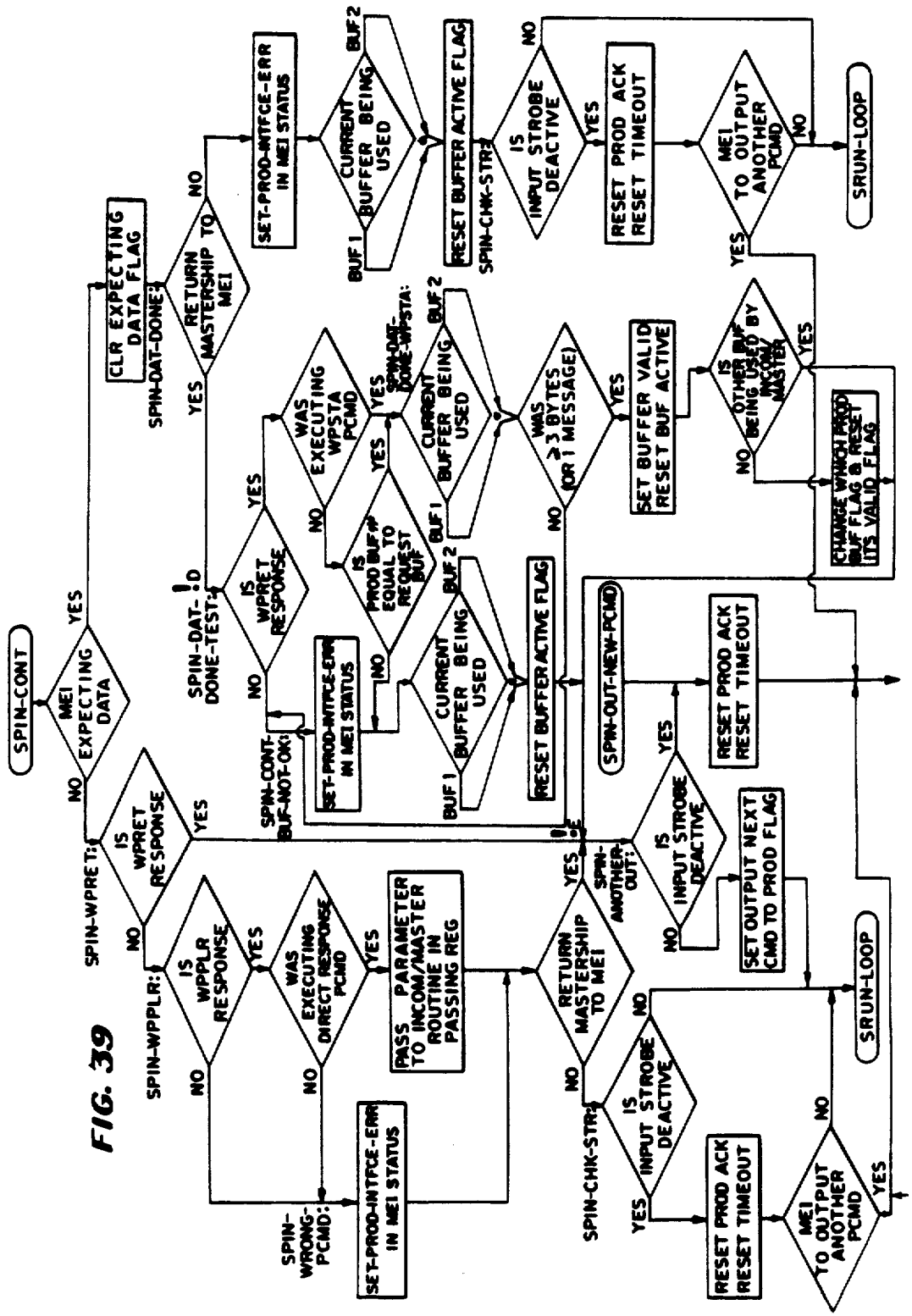
Figure 40:
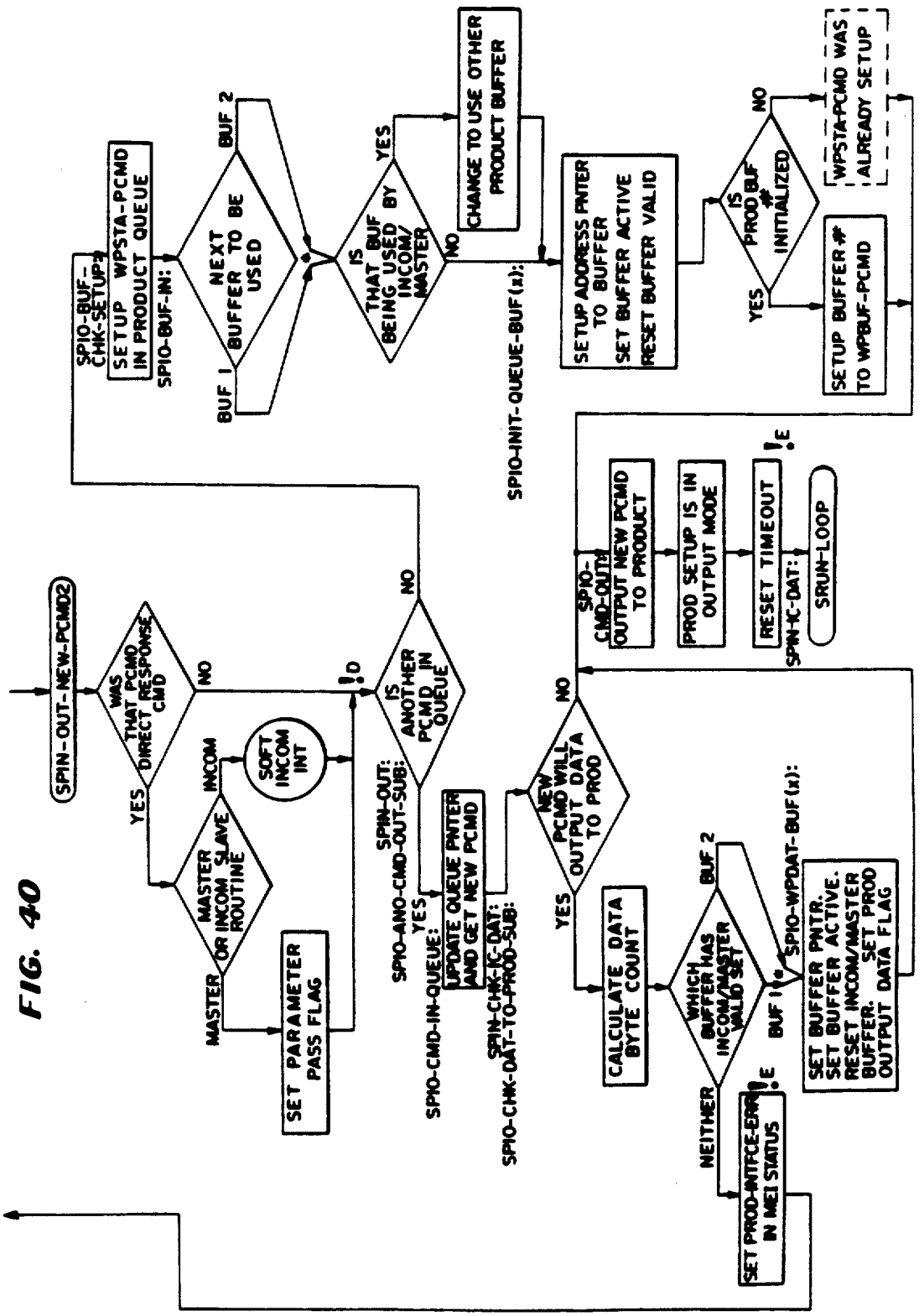

FIGS. 39 and 40 show the handling of a control message from the product 44 to the MEI card 30. This routine, SPIN-CONT, includes the INCOM interrupt routine IC-INT-SLAVE shown in FIGS. 44-46, at the point SOFT-INCOM-INT of FIG. 40, if a direct response command, such as the RPFR and RPDR commands discussed in detail heretofore, is received from the INCOM master.

Figure 41:
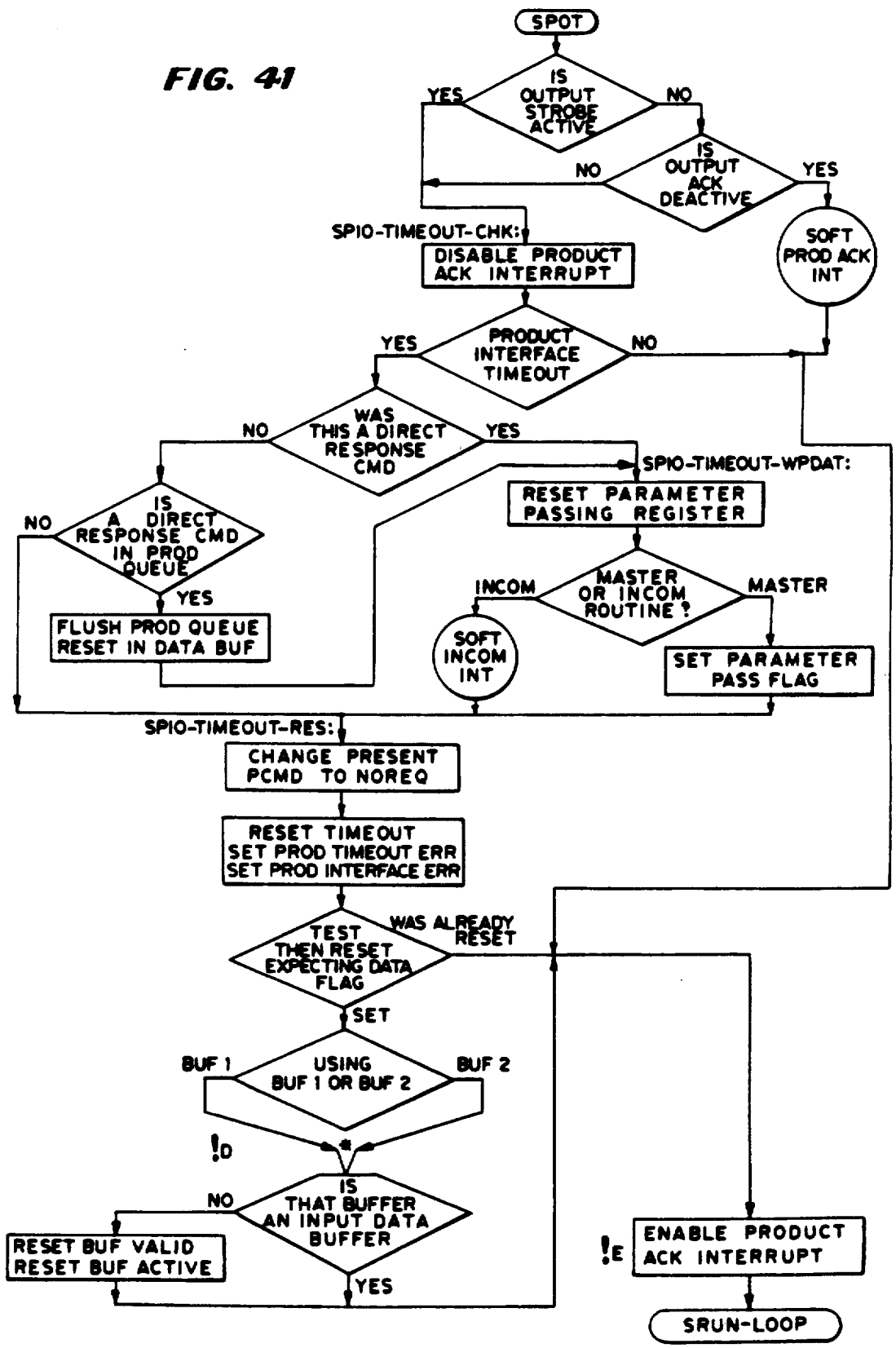

FIG. 41 is a flow chart (SPOT) of that portion of the slave run loop in which an output to the product (either a command or a data message) is being sent by the MEI card 30. This routine includes the PROD-ACK-SLAVE interrupt routine shown on FIGS. 42 and 43 if the output strobe and output ACK of the MEI card are both inactive, as shown by the SOFT-PROD-ACK-INT point in the flow chart of FIG. 41. The SPOT routine also includes the INCOM interrupt routine, IC-INT-SLAVE shown in FIGS. 44-46 as shown by the SOFT-INCOM-INT point in the flow chart of FIG. 41, if a direct response command is received.

Figure 42:
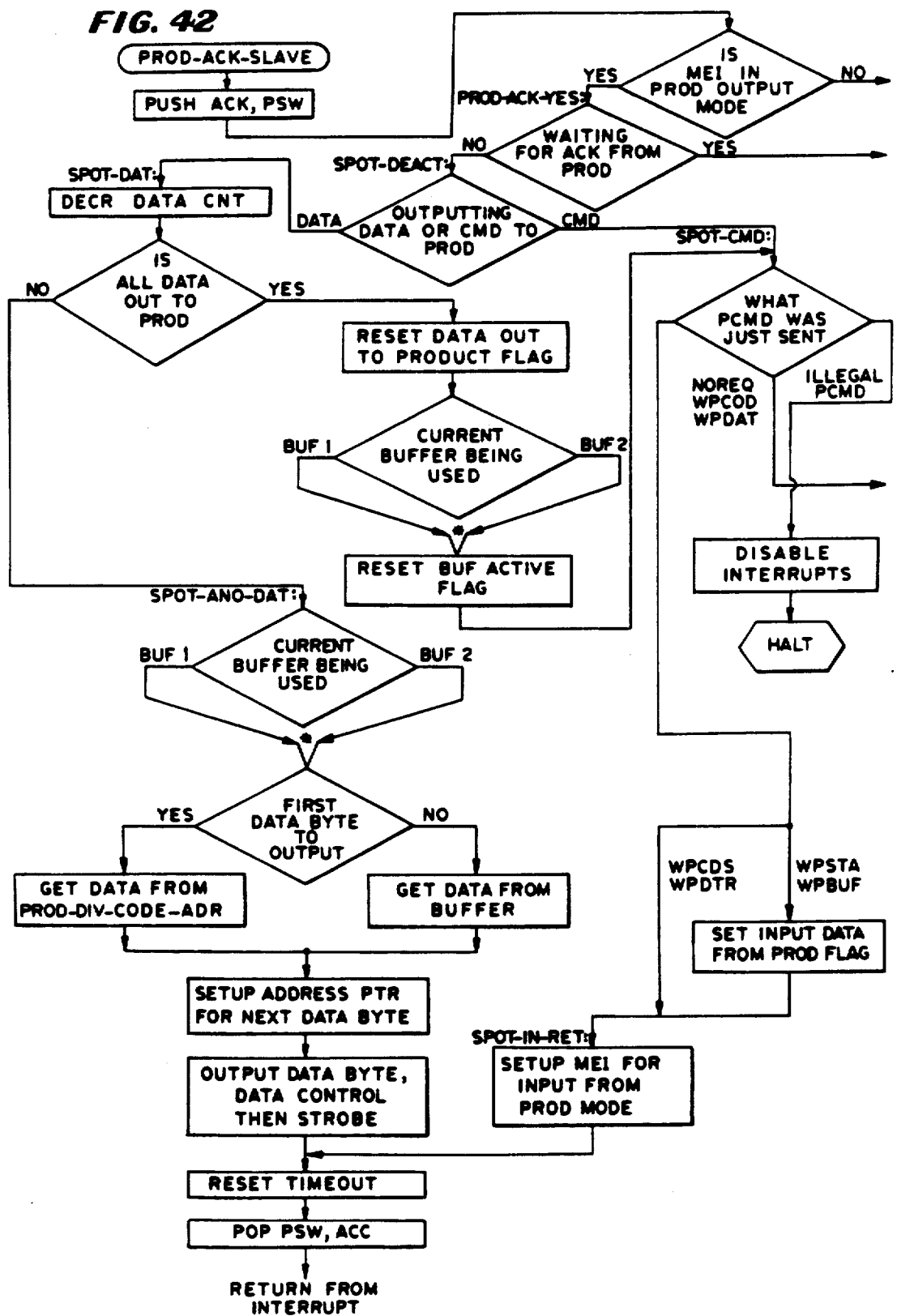
FIGS. 42 and 43, when placed side by side, comprise a flow chart of the logic flow during a product acknowledge interrupt routine employed during output from the interface to a controlled product in this program.
Figure 43:
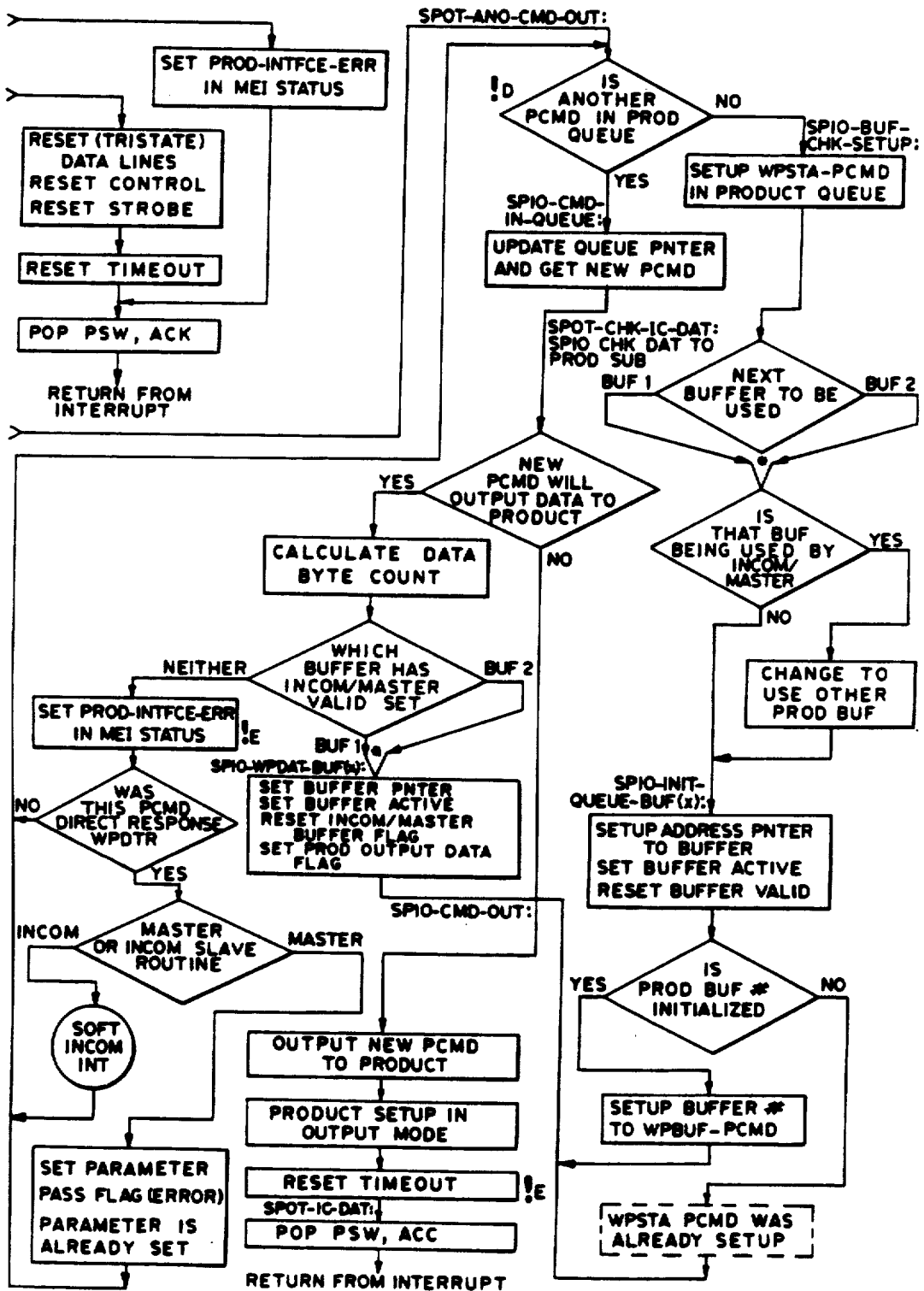

The PROD-ACK-SLAVE interrupt routine of FIGS. 42 and 43 is the routine by means of which all processing is done to give to the product the information the MEI card 30 is passing on to it from the INCOM network. This routine also includes the INCOM interrupt routine IC-INT-SLAVE, as shown by the SOFT-INCOM-INT point in FIG. 43, if a direct response command is received.

Figure 44:
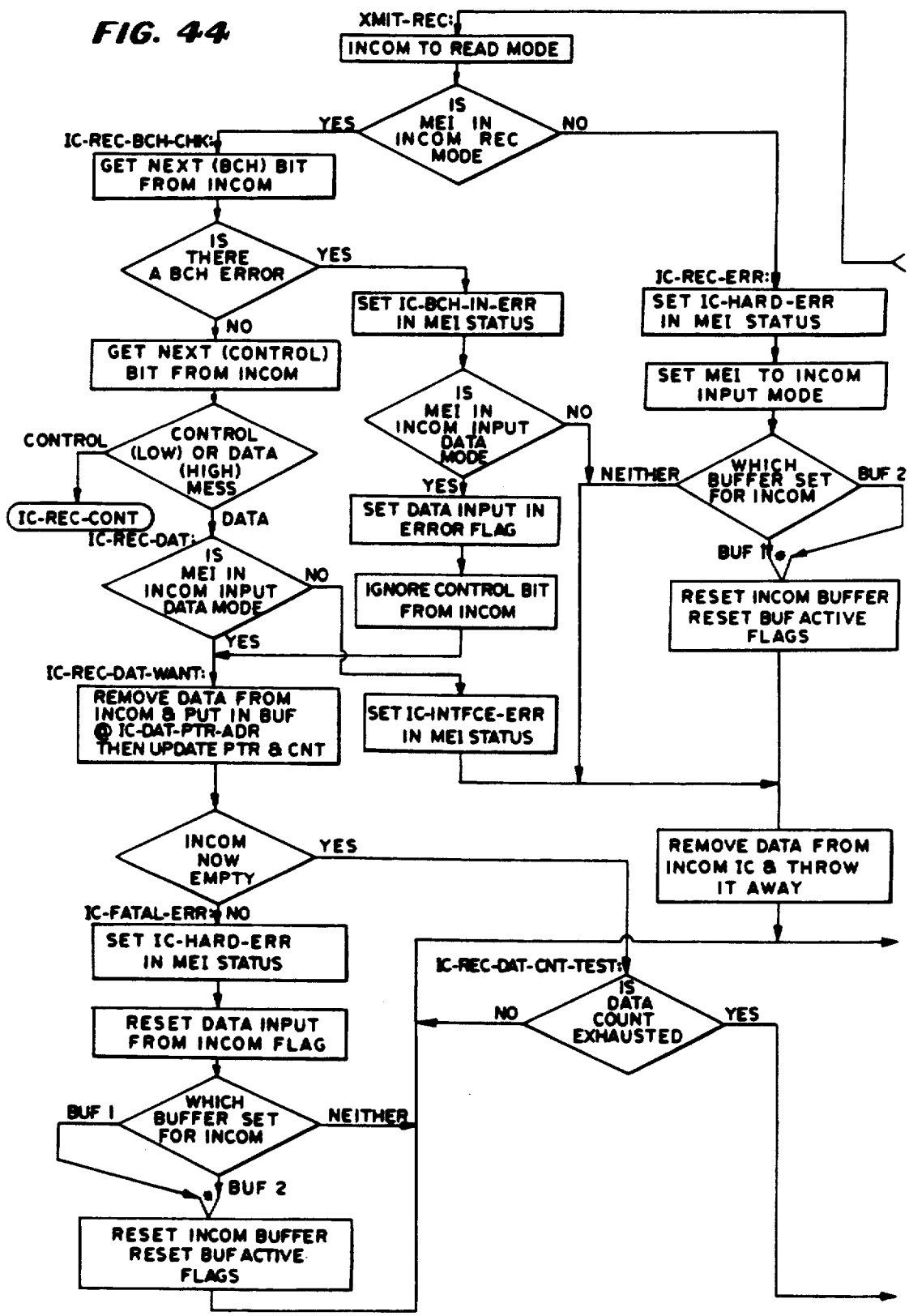
FIGS. 44, 45 and 46, when placed side by side, comprise a flow chart of the logic flow during an INCOM interrupt routine employed in the software program of the multipurpose interface.
Figure 45:
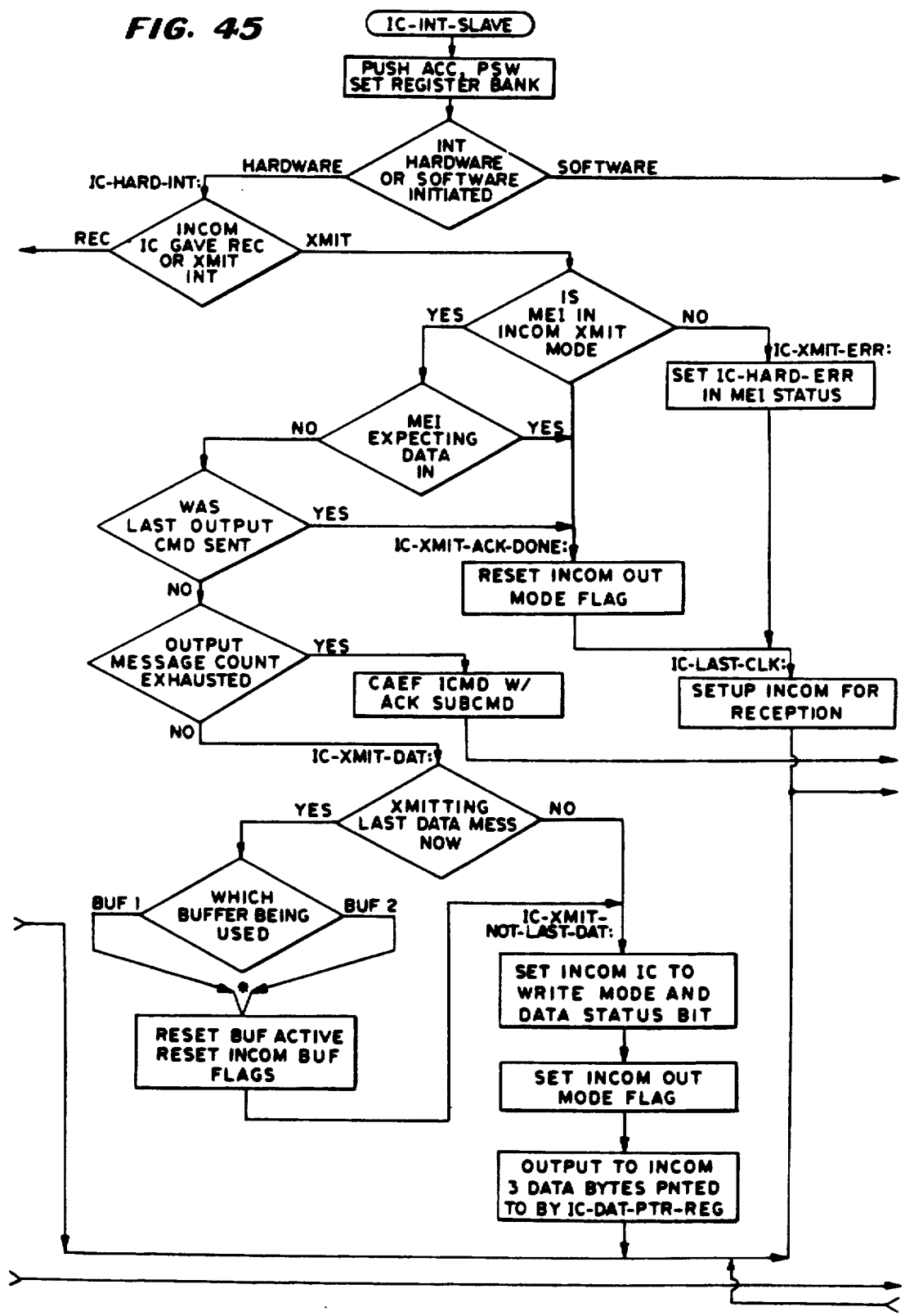
Figure 46:
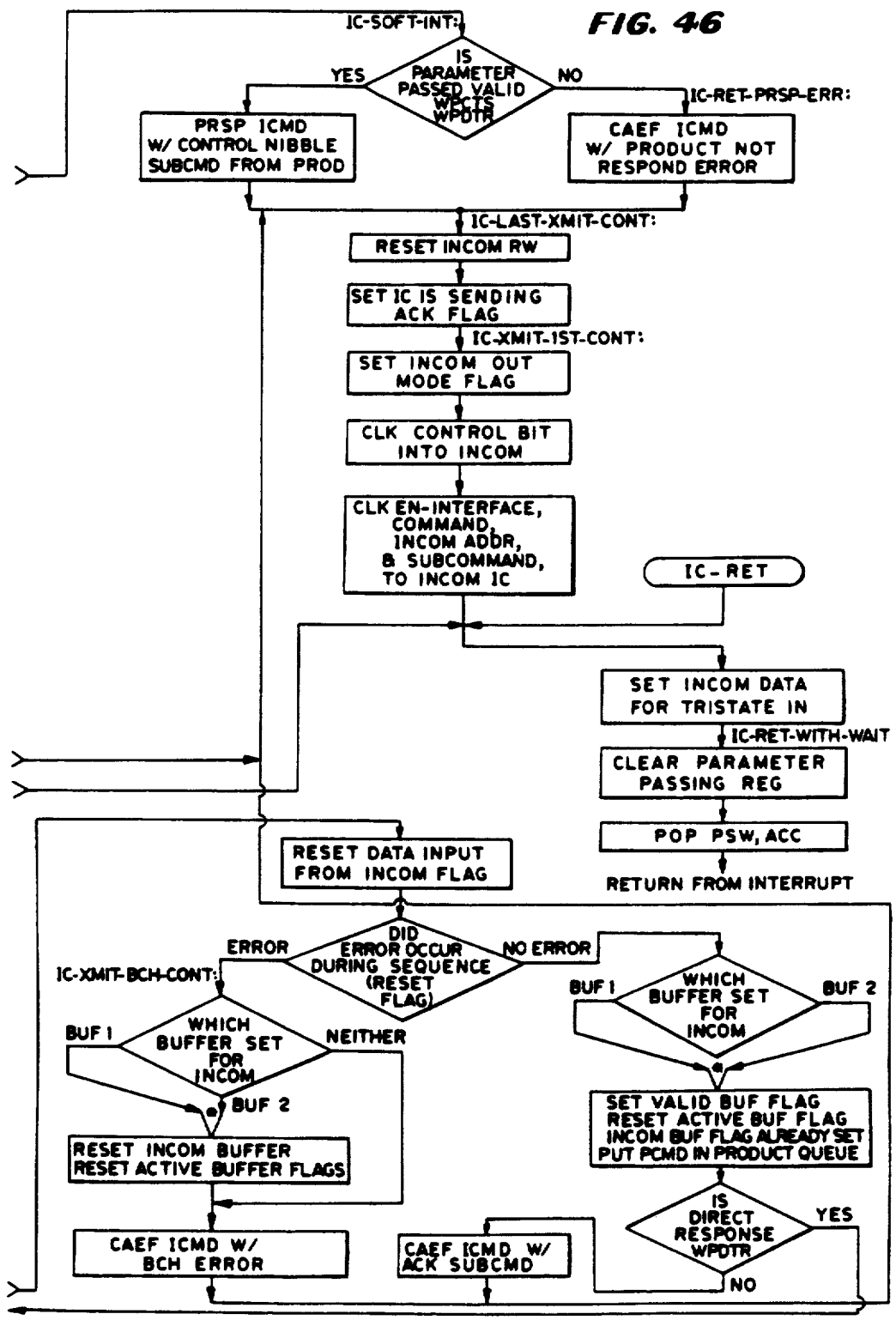

The INCOM interrupt routine shown in FIGS. 44-46 may be either hardware initiated by the INCOM chip 36, or software initiated in response to a direct response command from the INCOM master. If the hardware interrupt is a receive interrupt from the INCOM chip 36 on its INT line, the message stored in the serial shift register of the chip 36 is read out and put in the INCOM buffer of the MEI card, as shown in FIG. 44. If the hardware interrupt is a transmit interrupt from the chip 36, i.e., a logic 0 on the DATA line of the chip 36 indicating completion of a transmission to the network by the chip 36, the next message intended for the INCOM chip 36 is stored in its serial shift register, as shown in FIG. 45. If the interrupt is software initiated, the required direct response is sent to the INCOM chip 36, as shown in FIG. 46.

Figure 47:
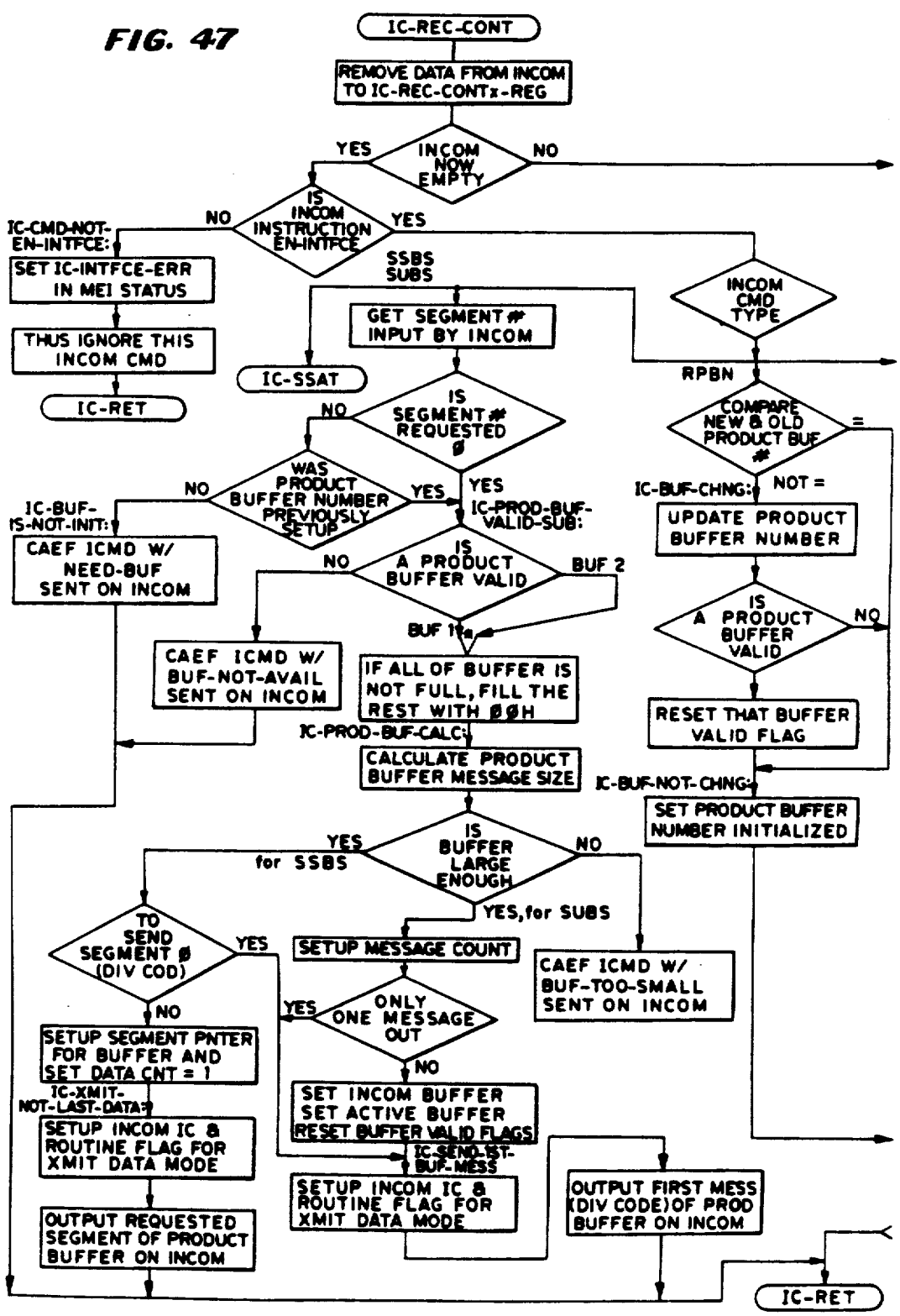
FIGS. 47 and 48, when placed side by side, and FIG. 49, comprise flow charts of the logic flow during the INCOM receive control portion of the INCOM interrupt routine in decoding a command message from the INCOM network.
Figure 48:
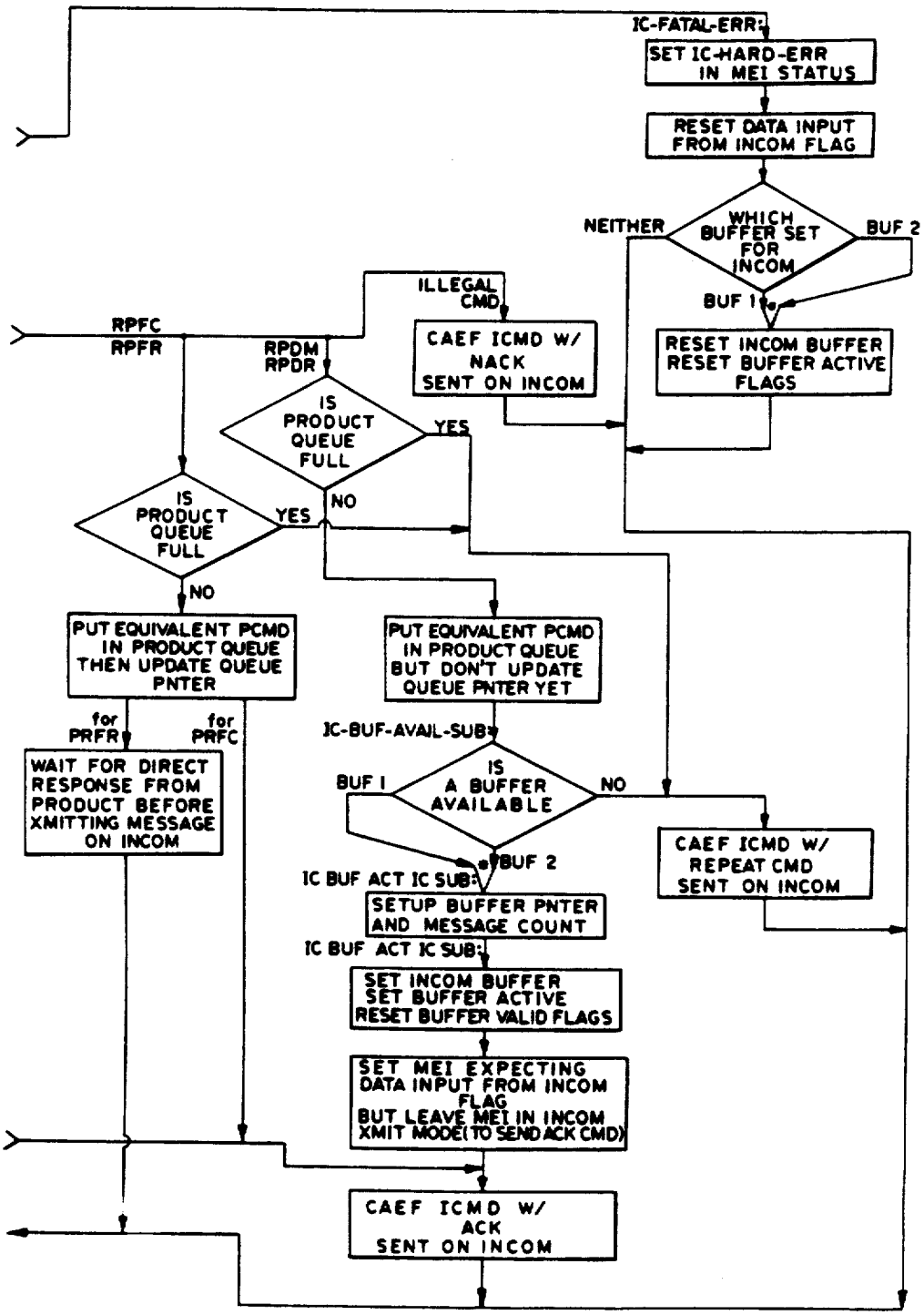
Figure 49:
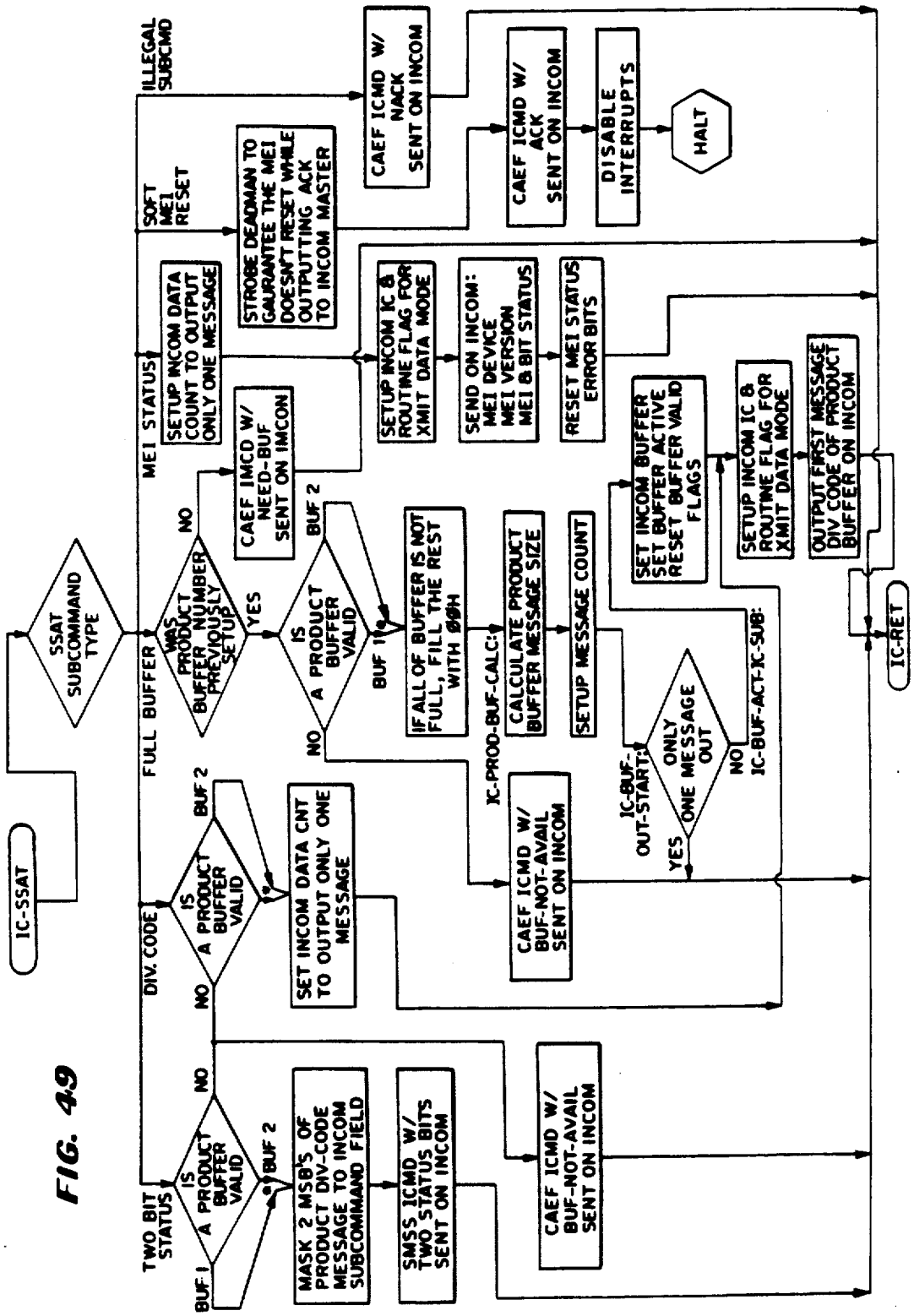

The flow charts of FIGS. 47-49 are an extension of the INCOM receive interrupt routine of FIG. 44 and show the logic flow in decoding a control (command) message from the INCOM master. Specifically, FIGS. 47 and 48 decode the SSBS, SUBS, RPBN, RPFC, RPFR, RPDM, and RPDR commands discussed in detail heretofore in connection with Tables I and II. FIG. 49 decodes the SSAT command discussed in detail heretofore in connection with Table I.

Master/Product Configuration

As discussed generally heretofore, when the master/slave* jumper W4 is open, the serial master card 42 is connected to the J2 connector, and a parallel product 44 is connected to the J3 connector, the MEI card is configured to operate in a master/product mode in which the external master 40 communicates directly with only one controlled parallel product independently of the INCOM network. It should be noted that in this configuration the hardware components including the coupling circuit 32 and the INCOM chip 36 are not required for the unused INCOM port of the MEI card 30 and hence may be eliminated from the MEI card if it is to be used solely for this configuration.

In the master/product configuration, a command message from the external master 40 is fully processed before commencing a new message. Ten byte messages are received and converted into an INCOM format and processed. Once the INCOM message has been interpreted, the buffer containing the message is released, allowing additional data to be received. If more than two bytes of data are received by the MEI card via the RS232C serial port before this INCOM buffer is released, a CTRL-S [XOFF] is sent back to the external master 40. If an XOFF had been sent, when the INCOM buffer is released, a CTRL-Q [XON] is sent by the MEI card signifying that it can accept another ten byte message. If the external master 40 had sent more than one byte of this new message after receiving an XOFF, these additional bytes will have been lost, and a complete ten byte message should be restarted.

In the case where the external master 40 is sending messages to the MEI card 30, some verification is performed on the incoming data stream. Format verification begins after the start or restart character, CTRL-B or [STX]. Items checked for formatting include (a) the correct check sum computed by bytes 9 and 10, (b) proper message type, i.e., byte No. 2 must contain a "0" (data) or a "1" (command), and (c) no unexpected ASCII II characters are received within a message stream.

The master/product configuration of the MEI card 30 can be broken into two parts, i.e., the master RS232C port and the product port. This configuration has incorporated the product port interface of the INCOM slave/product configuration shown in FIGS. 33 to 49 and in the listing pages A-1-A-31 of the Appendix, available in U.S. Pat. NO. 5,007,013. Hooks are identified and used to tie this master/product configuration into the product port software of the INCOM slave/product configuration.

Within the master port software are: (a) an initialization routine, (b) seven functional blocks that are polled, (c) two subroutines, and (d) the RS232C receive/transmit interrupt routine. Flags within the seven functional blocks control the order in which information is transferred and processed inside the MEI card 30. The seven functions developed perform all necessary tasks to process a ten byte incoming message, decipher it, and pass it out to the product interface software if necessary. These routines include two receive and five transmit functions, as follows:

1. POLL-RCV-INT: This routine polls the receive interrupt buffer for information and passes/decodes it into a three byte INCOM formatted message. Formatting checks of the incoming data are also performed.

2. POLL-RCV-MSG: This routine interprets the message in the INCOM formatted buffer and processes the command directly or passes it on to the product interface software as necessary, setting appropriate flags and conditions.

3. POLL-TX-DAT: This routine passes data messages as requested, from an MEI product buffer (there are two) to the output INCOM buffer for transmission to the external master 40. Only one data message is sent per poll and only if the INCOM buffer is available.

4. POLL-TX-INT: If the output INCOM buffer has a message to send, this routine will reformat and move the message to the transmit interrupt buffer and request its transmission.

5. POLL-TX-PROD: This routine processes a direct product response that product software has generated. This information in the product response is formatted into the output INCOM buffer for transmission to the external master 40.

6. TX-FMT-MSG: The .first response (in addition to echoing) that the MEI card 30 sends to the master 40 after receipt of a complete ten byte message is the format response. This routine performs this task, sending either an (ACK) or (NAK) in addition to other information if echoing is enabled. The criteria for correct format includes data/command byte correct, no unexpected ASCII II characters, and proper checks on receipt.

7. TX-CAEF-MSG: This routine supplies the external master 40 with the additional validity information that has been accumulated during the processing of a message. It also supplies various conditions within the MEI card 30 and the product interface. Additionally, it may represent the end of a request or sequence of events to the master (a high level handshake response).

The INITIALIZE: routine reads/sets the baud rate and also sets the appropriate configuration parameters for the master RS232/product software to work correctly. Two subroutines are used in multiple places in the master/product module. These are:

1. CHK-QUEUE: This subroutine checks the product queue for an INCOM formatted message to be entered and passes it on to the product interface software for processing.

2. GET-BUFF: This subroutine checks the two product buffers for access. If it can, this subroutine takes control of a valid buffer for use by the master RS232 software. Note that the master can only control one buffer at any given time.

The interrupt routine, %RITI:, processes both receiver and transmitter interrupts. Control of receiver buffer overflow is controlled by hardware via the RTS/CTS and by software via (XOFF/XON).

Considering first the master/product configuration from a very general standpoint, as an interface between the ports of the MEI card 30 and the different MEI card configurations, a neutral format almost identical to an INCOM message on the network 34 has been developed and is used internally in the MEI software. This format is used in both the master/INCOM and master/product configurations and is the main interface to pass information bidirectionally to/from the RS232C port and its software. There is a separate 3 byte buffer for each direction of data flow (RCV-MSG-BUF for received messages, and TX-MSG-BUF for transmissions). Additionally, each buffer has a message type bit flag (RCV-MSG-FLG and TX-MSG-FLG) to designate the information as a data ($=0$) or command ($=1$) message. The TX-MSG-BUF has one additional bit flag, the BCH-FLG. This flag represents a bit calculated by the INCOM chip 36 for a message received from the INCOM network. In the master/product configuration, this bit is always cleared ($=0$).

The RCV-MSG-BUF is filled by the POLL-RCV-MSG routine discussed above. This routine obtains its data from the RS232C receive interrupt buffer. Three different polling routines extract and process information from this buffer.

The TX-MSG-BUF is emptied by the POLL-TX-INT routine discussed above. This routine reformats and moves the message in the buffer to the RS232C transmit interrupt buffer where it is later sent out on the RS232C port. Many routines place INCOM formatted messages into this buffer for transmission to the RS232C master 40.

RS232C Transmit Interrupt Buffer

Most of the data sent to the RS232 master port is stored temporarily in the transmit interrupt buffer, TX-INT-BUF, before it is processed by the interrupt routine %RITI-INT. The transmit interrupt buffer is 8 bytes in length and has two parts with distinctively different characteristics. The first part of this buffer is 5 bytes in length and holds only hexadecimal nibble information. Data stored in this area represents a compressed code version of the 10 byte message format sent to the master 40. Each nibble of such a message has a hexadecimal value which when transmitted, is converted into an ASCII II character representing the digit. The second part of the buffer (3 bytes) contains any ASCII II character desired to be sent to the master 40. This part of the buffer is used for sending the format responses. If the format verification discussed above shows a good message from the master 40, the format response message is [ACK] if echoing is off, or [ACK]'A'[CR][LF] if echoing is on. If the format verification indicates a bad message from the master 40, the format response message if [NAK] if echoing is off or [NAK]'N'[CR][LF] if echoing is on.

Two pieces of information control the status of the transmit interrupt buffer, TX-PTR, a byte variable, and NIB-FLG, a bit variable. TX-PTR contains two pointers, each stored as nibbles, PTR-END and PTR-NXT. PTR-NXT is in the upper nibble and PTR-END occupies the lower nibble. The transmit interrupt buffer does not operate as a ring buffer.

PTR-END designates the ending position where data is located within the buffer pending transmission. It is updated as data is loaded into the TX-INT-BUF by the routine POLL-TX-INT. PTR-NXT points to the location where data is being removed for transmission to the RS232C port. It is updated as data is removed and sometimes when data is loaded into the second part of this buffer.

The NIB-FLG is a bit that determines the nibble to be processed for the byte pointed to by PTR-NXT. When NIB-FLG$=0$, the lower nibble is being pointed to, whereas when it is 1, it points to the upper nibble. The NIB-FLG is only used with the first part of the transmit interrupt buffer.

Data exists in the transmit interrupt buffer when the two pointers are unequal. When equal, all data has been sent, and they are reset to 0 designating an empty buffer.

Data can be entered into the second part of the transmit interrupt buffer when there is information in the first part. When this happens, only PTR-END is updated. If no data is in the first part of the buffer, PTR-END is updated, and so is PTR-NXT (to a value of 5). No data can be put into the first buffer unless TX-PTR$=0$.

The conditions when information which is not in the transmit interrupt buffer is sent include two cases, (a) transmittal of XON/XOFF characters, and (b) the transmittal of a [CR] [LF] for any [CR] in the buffer.

RS232C Receive Interrupt Buffer

The RS232C input interrupt buffer, RCV-INT-BUF is a 4 byte ring buffer. This buffer stores characters as received under control of the buffer status variable, RCV-PTR. Because of the coding, a maximum of three bytes can be in the receive interrupt buffer at any given point in time. This eliminates the ambiguous condition of a full or empty buffer when the points PTR-IN and PTR-OUT, are equal.

RCV-PTR contains two pointers as nibble quantities; PTR-IN in the lower nibble, and PTR-OUT in the high nibble. PTR-IN points to the last character received from the RS232C port. PTR-OUT points to the last character removed by the POLL-RCV-INT routine. When these two nibble quantities are equal, there is no data in the receive interrupt buffer to process.

To prevent buffer overflow, both hardware and software start-stop control is employed. Hardware control pulls the MEI card RTS line high whenever there is a single character in this buffer and the RCV-MSG-BUF is full. This should stop transmission if the RS232 master 40 interprets this line. If not, software control sends an

[XOFF] when there are two characters in the buffer. If neither method is incorporated for control by the master, overflow occurs whenever more than 3 bytes are attempted to be stored in this buffer and the RCV-MSG-BUF is full. Even if neither method is incorporated, such overflow should not normally occur, unless the RS232 baud rate is higher than that of the INCOM network 34 and multiple messages are sent by the master 40 without pauses. To alleviate such overflow, the master should pause a sufficient time between transmission of messages, allowing them to be processed by the MEI card 30.

Figure 50:
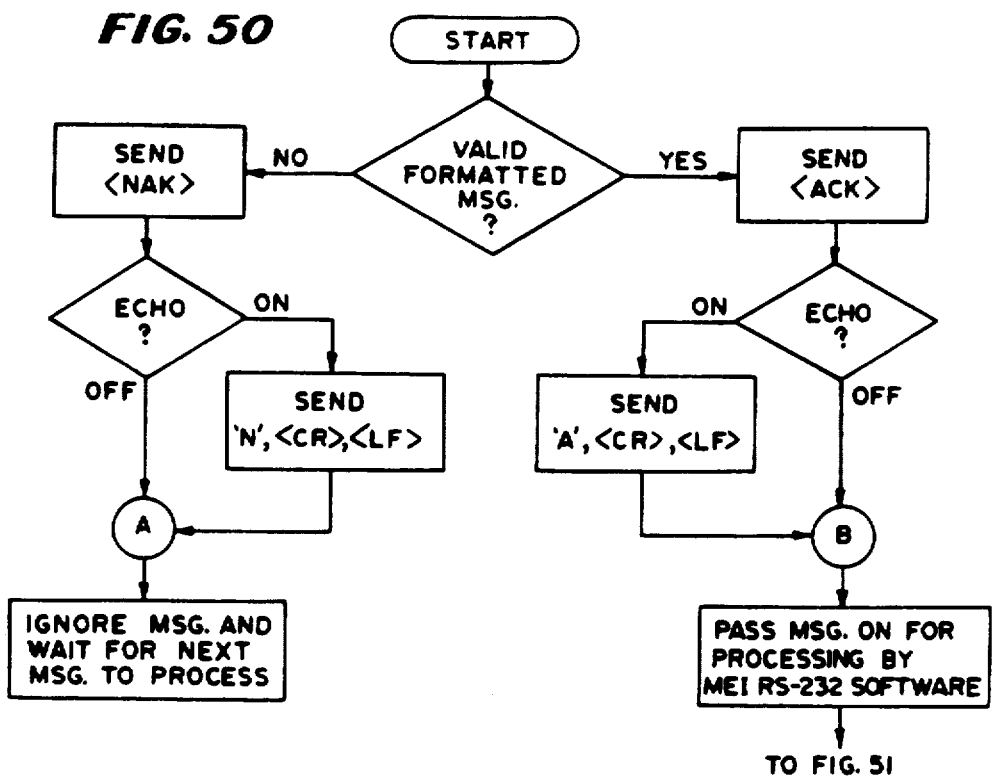

The block diagrams shown in FIGS. 50 to 59, inclusive, are employed as a general overview to describe the interaction of the external master 40 and the MEI card 30 over the RS232C link. FIG. 50 is an overview showing how a message received by the MEI card 30 is processed before it is separated into a command or data message. It is assumed that a ten byte message has been received starting with an (STX). In this figure, the decision block "valid formatted message "includes the format verification discussed in detail heretofore.

Once a command message is received, a complete sequence of events to process it to its conclusion is performed before another command will be interpreted. Reception of a command message before the last data message of a stream is expected will clear out event information and that previous command will be ignored along with the data messages.

Figure 51:
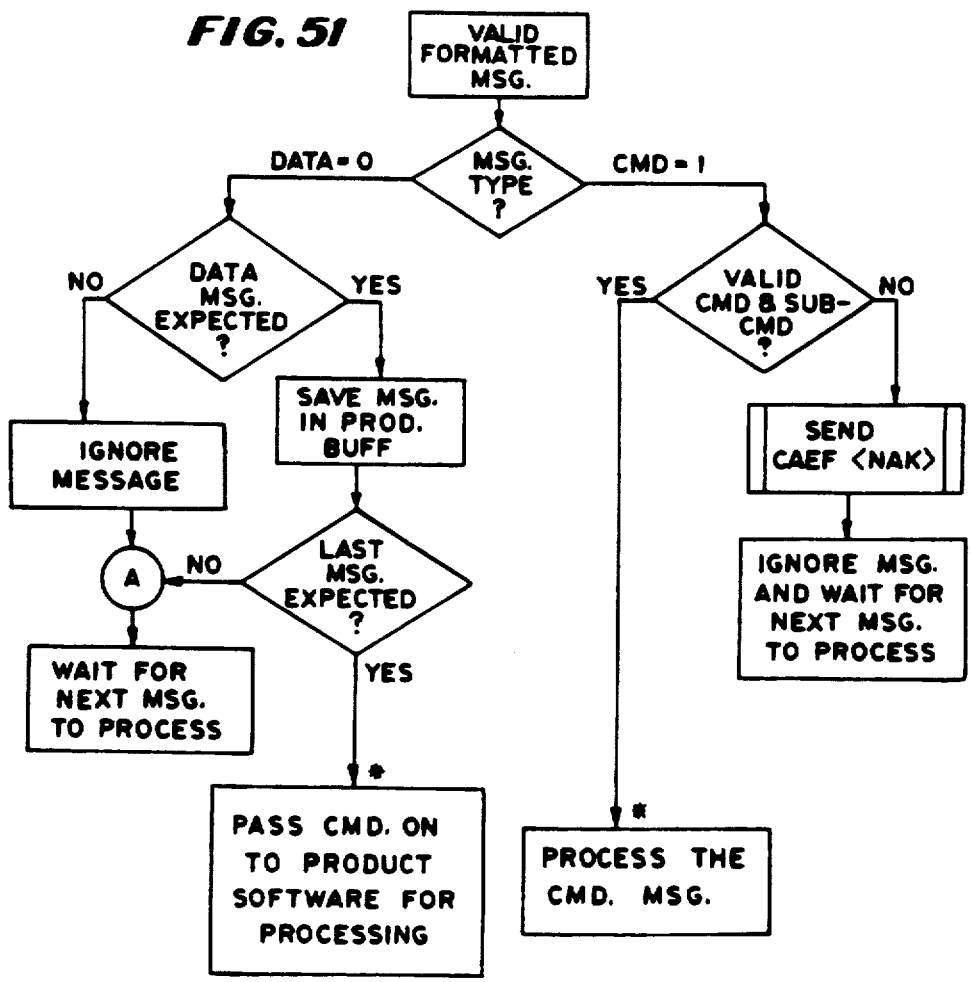

Once a validly formatted message has been received it is passed on for further processing as shown generally in FIG. 51. In this figure the commands processed by the left branch include RPDM and RPDR. The commands processed by the right branch of this figure include SSAT, SSBS, SUBS, RPBN, RPFC and RPFR. Only the processing of the respective command is necessary after FIG. 51 has been traversed, i.e., those blocks specified by an asterisk. Various operations are performed for a given command and each response is different.

FIGS. 52 to 59, inclusive, show generally the sequence of events associated with the previously described set of valid commands. In these figures the command field bits are given within parentheses and the subcommand field bits are given within brackets. More particularly, in FIG. 52(a) the response to an SSAT [2 bit status] command is given. In FIG. 52(b) the response to the SSAT [division code/status] command is given. In FIG. 52(c) the response to an SSAT [full buffer] command is given. In FIG. 52(d) the response to an SSAT [processor status] command is given. In the response to this command three bytes of data are sent; i.e., hardware revision number, software revision number, and status. Some status information is cleared and not available after this command, i.e., the bits designated by an asterisk in Table IA and in the following description of the master/INCOM configuration. The hardware and software revision numbers do not change, although the status byte obviously will. FIG. 52(e) gives the response to an SSAT [reset] command. During the time out for MEI card to reset, the MEI card 30 will not accept any new information from any port. Reset also clears the status/error information that is associated with an SSAT [processor status] command. Byte three of the data message sent back to the external master 40 represents different information depending upon which configuration is being used.

In FIG. 53 the response to an SSBS [send data segment # n] command is given. In FIG. 54 the events performed in response to a SUBS [send data segments 0-#n command] are given. In FIG. 55 the sequence of events in response to an RPBN [receive product buffer #] command are given. In FIG. 56 the sequence of events in response to an RPFC [pass code #n to product] command are given.

Figure 57:
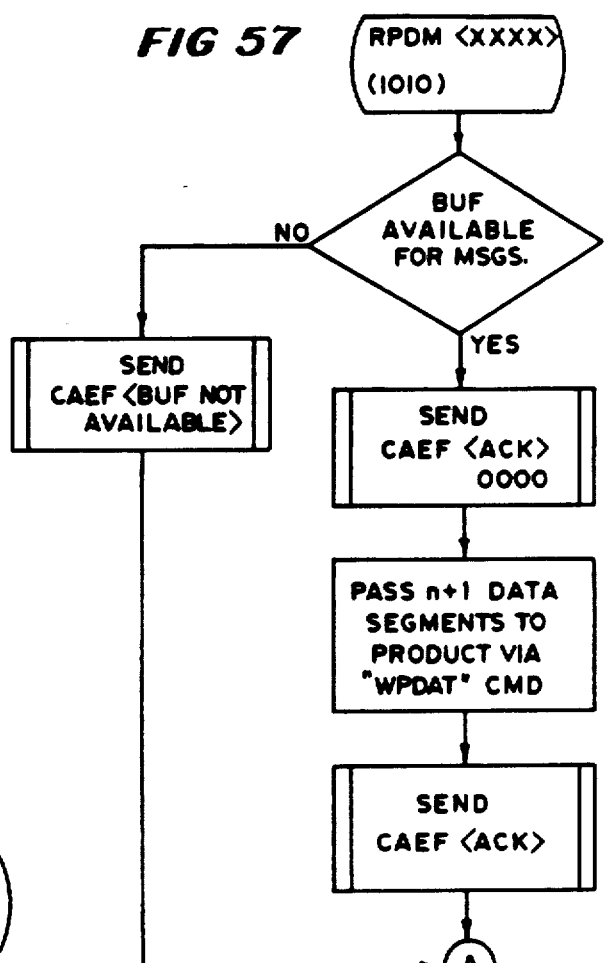
Figure 58:
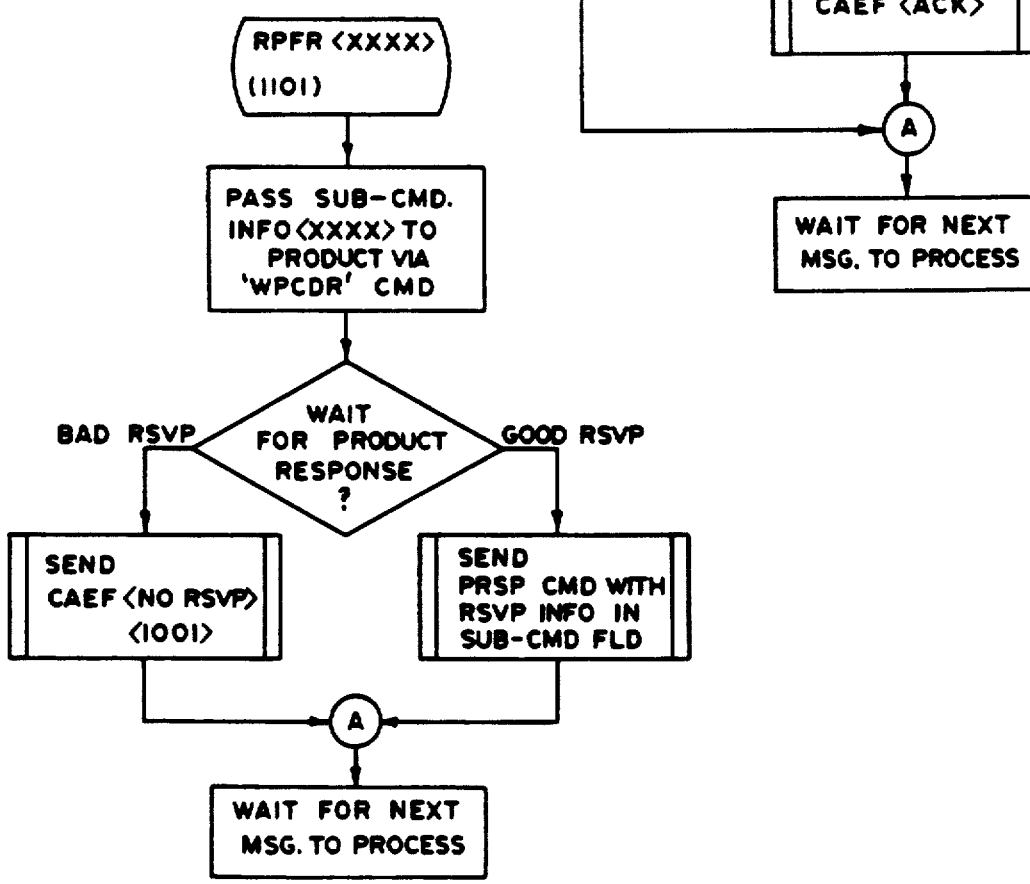
Figure 59:
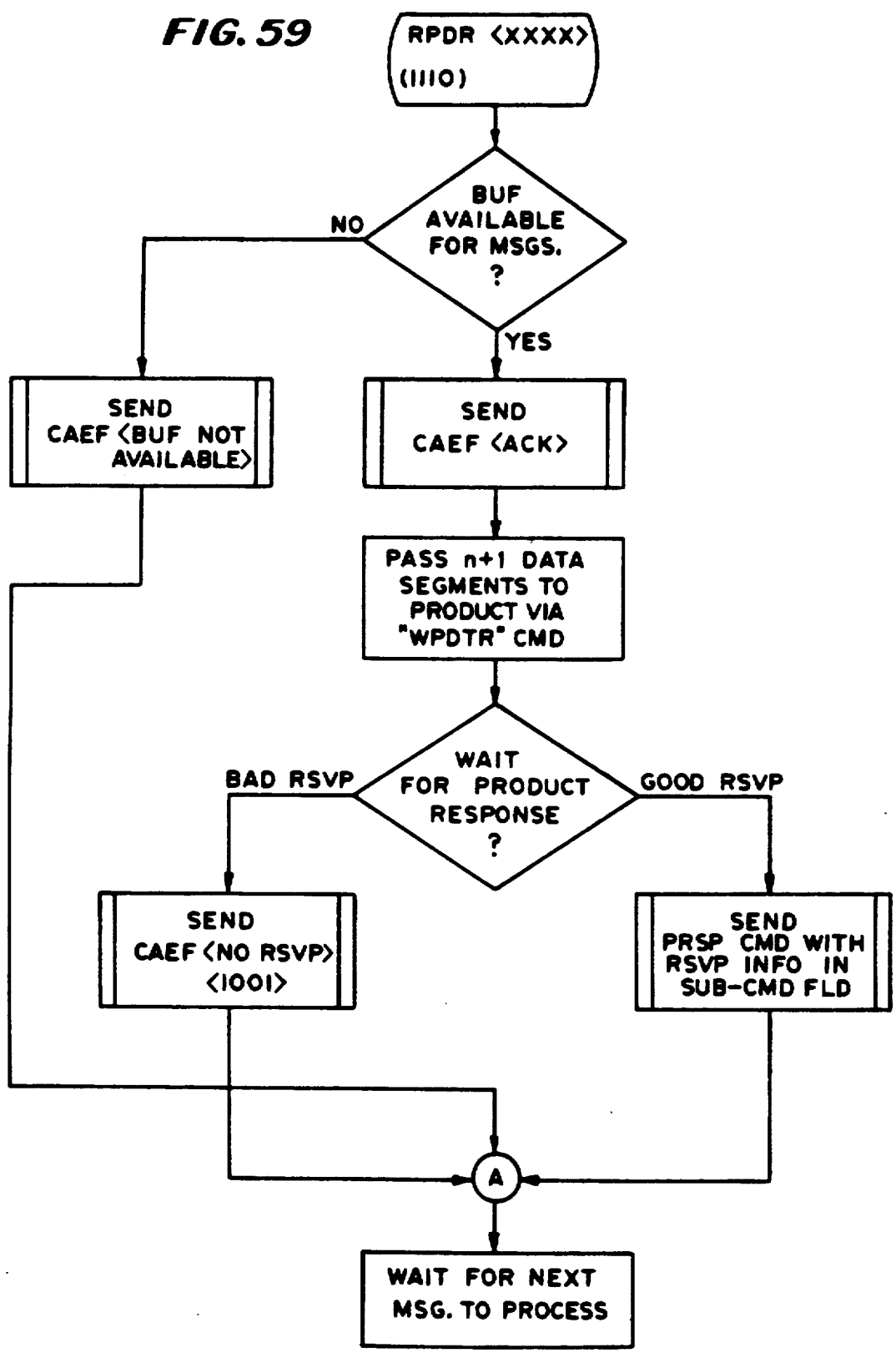

In FIG. 57 the sequence of events in response to an RPDM [pass n+1 data messages to product] command are given. In this figure "n" is the decimal representation of the binary value [xxxx]. In this figure it is also assumed that all data messages have been received (see FIG. 51) before the flow chart of FIG. 57 is entered. FIG. 58 shows the sequence of events in response to an RPFR [pass code #n with product response] command is given. FIG. 59 shows the sequence of events in response to an RPDR [pass n+1 data messages with product response] command.

Figure 60:
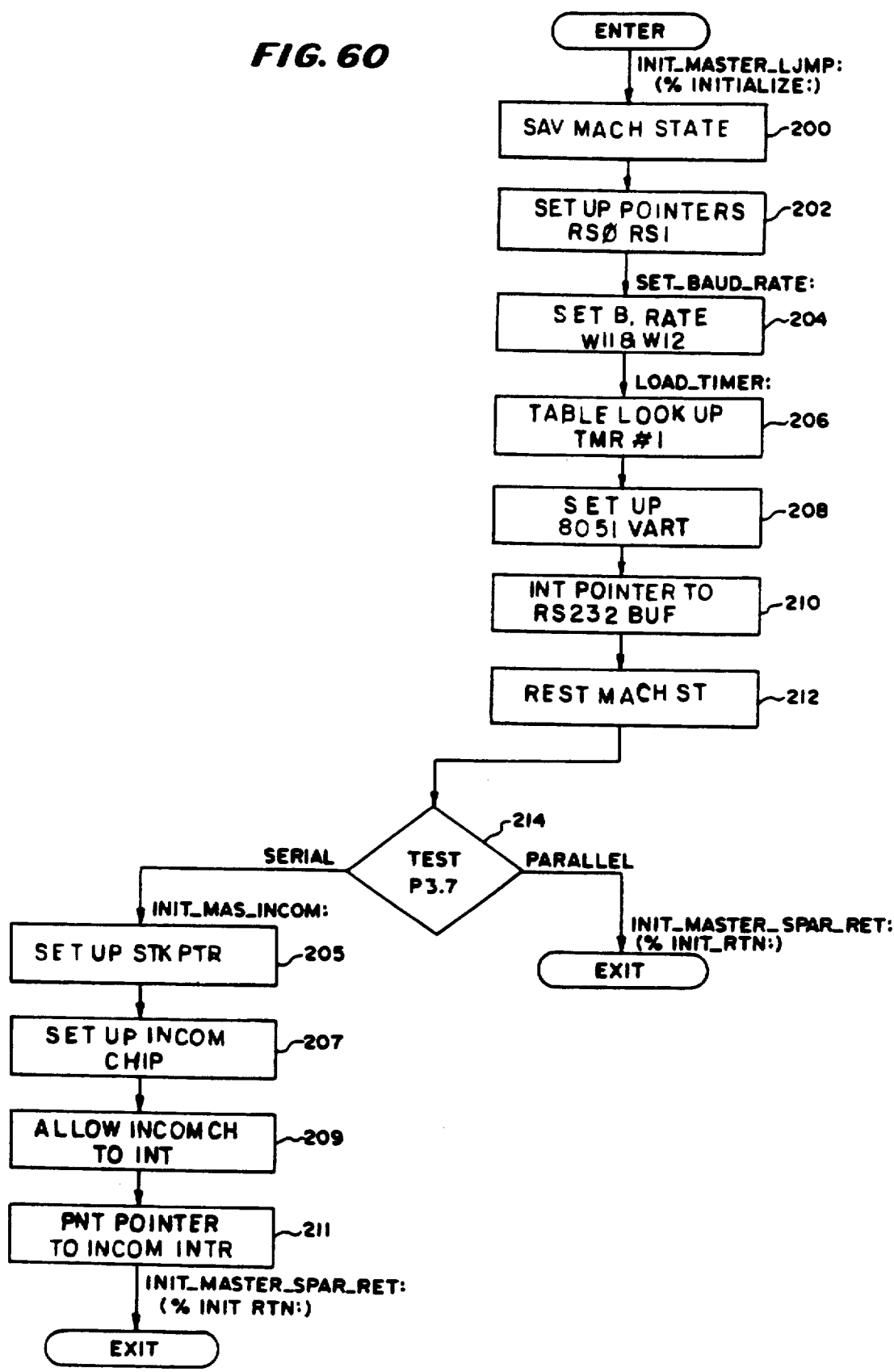
FIG. 60 is a flow chart of the initialization portions of the master/product and master/INCOM programs.

With the above described overview of FIGS. 50 to 59, inclusive, in mind, reference may now be had to FIG. 60 which is a detailed flow chart of the initialization procedure performed when the main initialization program of FIGS. 33-35 detects either a master/product configuration or a master/INCOM configuration. In this flow chart, and in succeeding detailed flow charts of the master/product configuration and the master/INCOM configuration, source code labels associated with the flow chart block precede that block. These labels are in capital letters and each with a colon. Furthermore, in those instances where a second label is used in the master/product or master/INCOM configurations as a synonym, this synonym label is given in parentheses and starts with a "%". Also, as in the flow charts of FIGS. 33-49 of the INCOM/product configuration, a "!D" disables all interrupts at that point in the program and before the next instruction is executed. Similarly, a "!E" enables all interrupts at that point before the next instruction is executed. In the master configuration flow charts the following additional abbreviations are used:

MSG—Message
RCV—Receive
FMT—Format
PNDG—Pending
BUF—Buffer
RESP—Response
SNDG—Sending
OBTD—Obtained
W/I—Within
REQD—Required
PROC—Process
TX—Transmit
CHAR—Character
SECT—Section
REQTD—Requested
DEF—Defined
RECD—Received
XPTD—Expected As discussed generally heretofore, the initialization procedure for all three configurations starts as shown in FIG. 33. However, when a master configuration is detected and the program proceeds to the block EXTERNAL ROUTINE a INIT-master-LJMP, shown in FIG. 33, the program jumps to the master initialization shown in FIG. 60 as shown by the label INIT-MASTER-LJMP: at the start of this flow chart. In this connection it will be noted that the synonym %INITIAL- IZE: is used in the master configuration rather than the label INIT-MASTER-LJMP of the IN-COM/product configuration.

In FIG. 60 the block 200 saves the machine state of the microcontroller 38, block 202 sets up pointers RS0, RS1 to register bank #3, block 204 reads the hardware baud rate jumpers W11 and W12 (FIG. 19 for baud rate selection on the RS232C link, block 206 is a table lookup for baud rate timer #1 settings corresponding to the settings of the jumpers W11 and W12, block 208 sets up the 8051 UART as 9 bit, 2 stop bits; enables serial reception and interrupt driven (?), block 210 initializes the pointers to the RS232C receive interrupt buffer, RCV-BUF and block 212 restores the machine state of the 8051. The decision block 214 tests the state of port P3.7 of the microcontroller 38 and if this is low, indicating a parallel configuration i.e., a master/product configuration, the master initialization routine exits from FIG. 60 and returns to the INT-MASTER-SPAR-RET: point of the main initialization program shown in FIG. 34. If P3.7 is high, indicating a serial configuration i.e., master/INCOM configuration, the program proceeds to the initialization phase of this configuration shown in the left hand column of FIG. 60, as will be described in more detail hereinafter.

Figure 61:
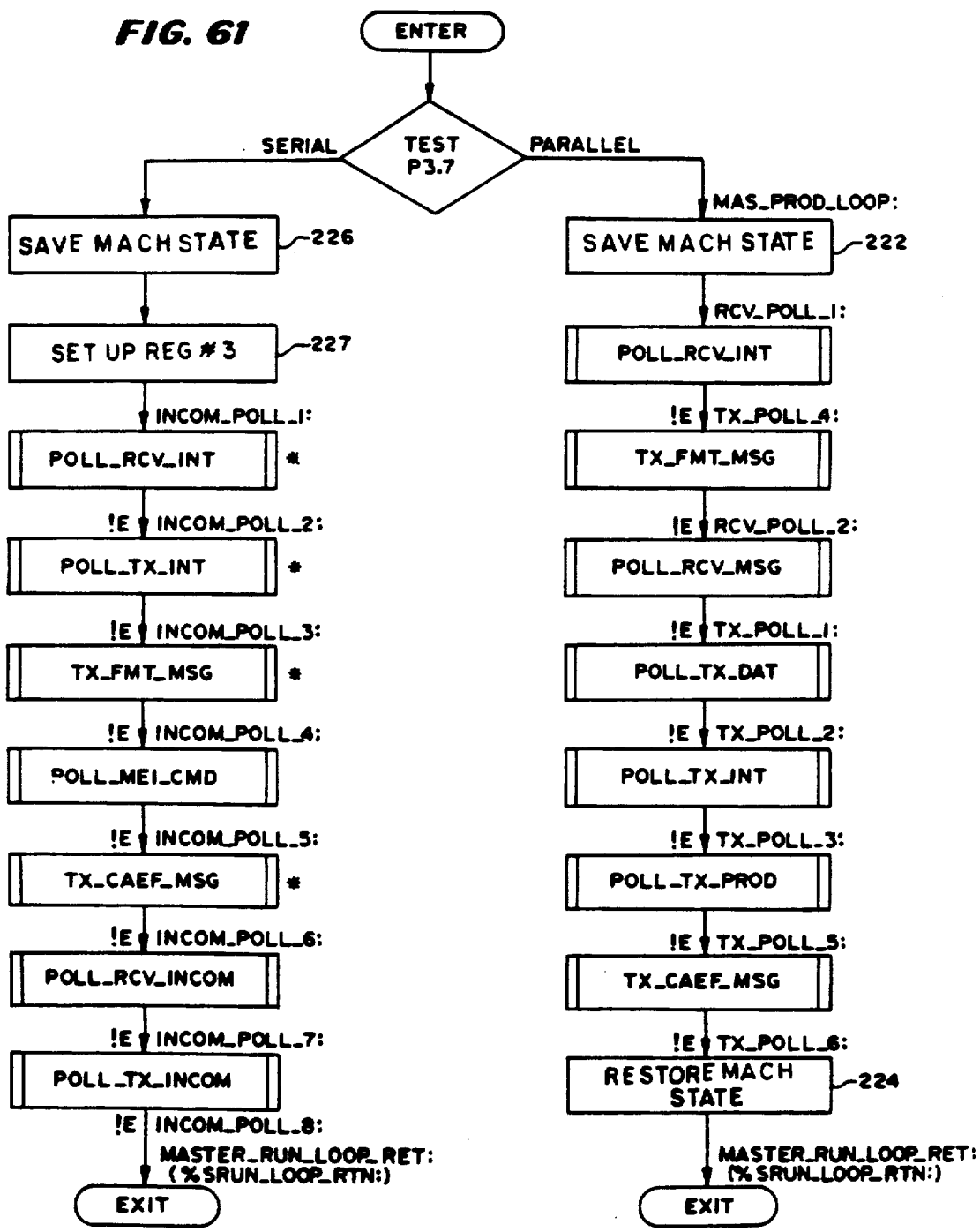
FIG. 61 is a flow chart of the main polling loops of the master/product and master/INCOM programs.

After initialization is returned to the main initialization program, it proceeds through the flow charts of FIGS. 34 and 35 and into the SRUN-LOOP program of FIG. 36 until a master configuration is detected by the decision block 216 whereupon the program jumps to the master run loop shown in FIG. 61. Referring to FIG. 61, it can be seen that the MASTER-RUN-LOOP label has the synonym %SRUN-LOOP-EXT: also assigned to it for the master configurations. Decision block 220 tests port P3.7 for the series or parallel configuration and if a parallel configuration is detected, i.e., a master/product configuration, the program proceeds to poll the subroutines discussed generally heretofore in the order shown in FIG. 61. In FIG. 61, and succeeding detailed flow charts of the master configurations, subroutines are identified by rectangles having double lines on each side, each of these subroutines being completely described in separate flow charts. When subroutines are finished, they are returned back to the statement following where they were called. Thus, the right hand portion of FIG. 61 constitutes the main polling loop of the master/product configuration. In this loop the block 222 saves the machine state of the 8051 microprocessor and sets up to use register bank #3. It should also be noted that in this main polling loop of FIG. 61 all interrupts are enabled before selection of the next subroutine in the loop, these interrupts being disabled internally at the start of each of the subroutines as shown in the respective flow charts for these subroutines. After the TX-CAEF-MSG subroutine is polled, the block 224 restores the machine state of the 8051 and the master run loop exits and returns to the point MASTER-RUN-LOOP-RET: shown in FIG. 36 and proceeds to utilize the MEI card product routines of the INCOM/product configuration shown in FIGS. 37-49.

If the test of port P3.7 indicates that this port is set, i.e., the master/INCOM configuration, the program proceeds through the left hand column of subroutines, as will be described in more detail hereinafter, block 226 in this left hand column being employed to save the machine state of the 8051 and block 227 sets up register bank #3 for use.

Figure 62:
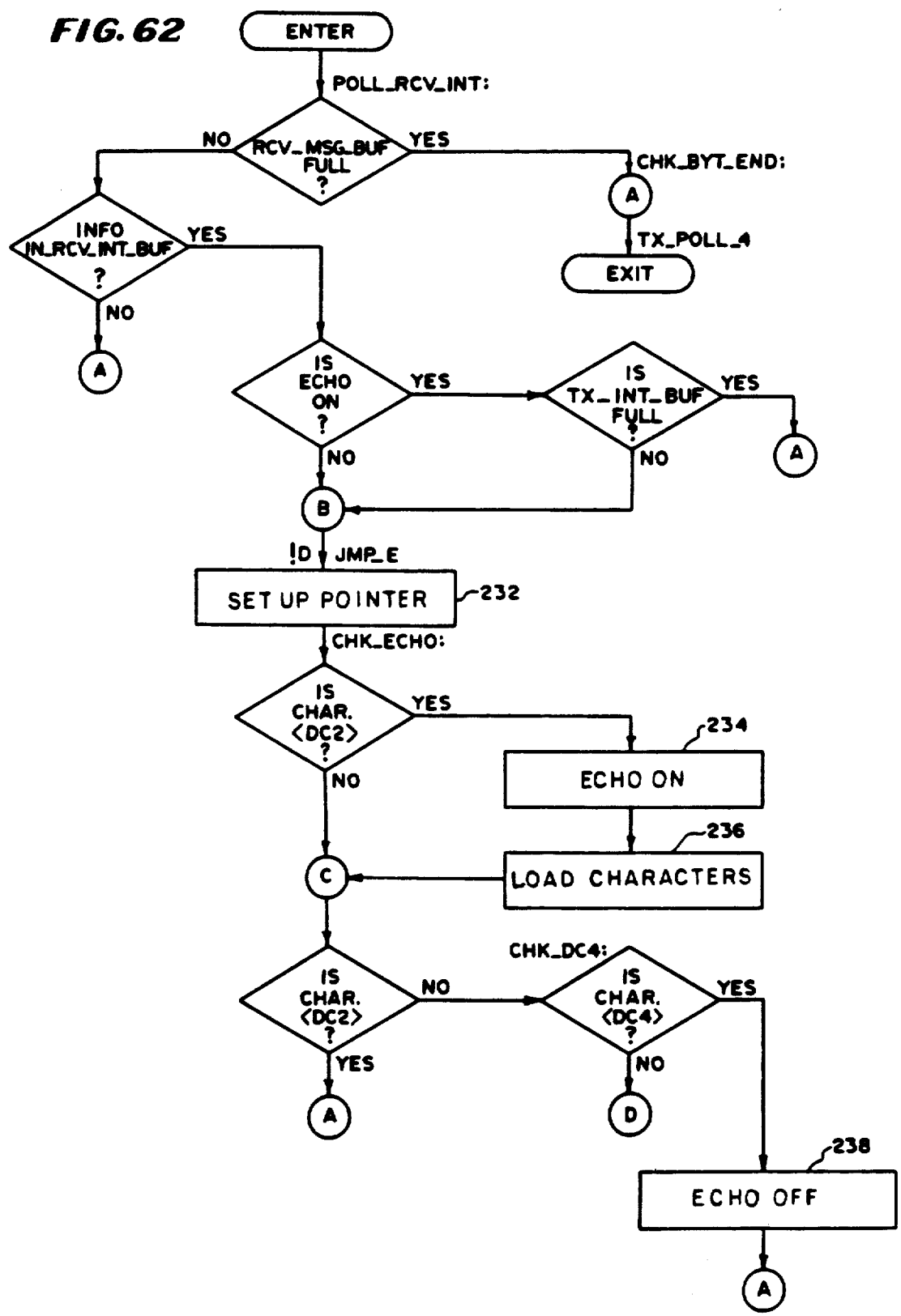
FIGS. 62, 63 and 64 comprise a detailed flow chart of the POLL-RCV-INT routine used in both the master/product and master/INCOM programs.
Figure 63:
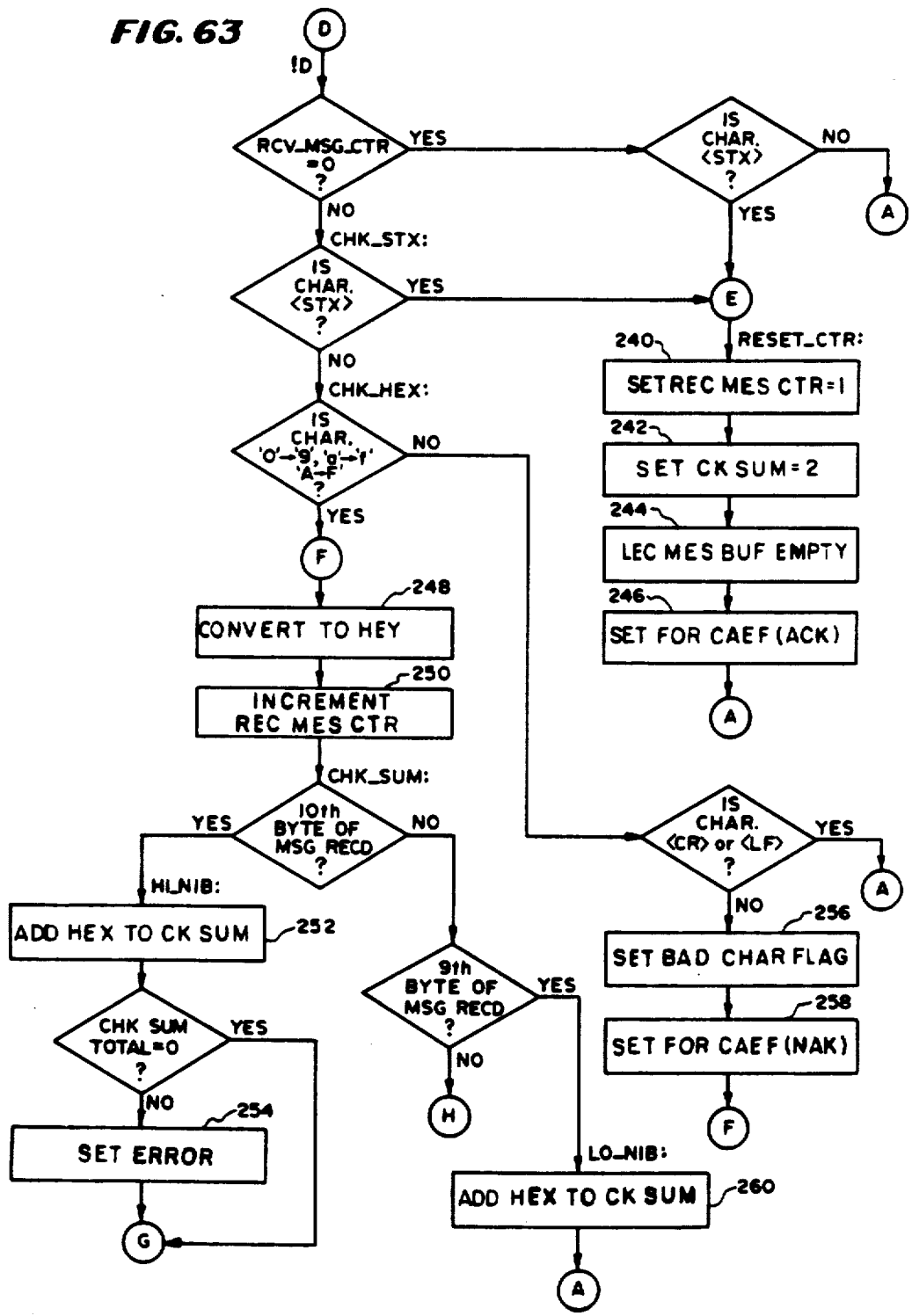
Figure 64:
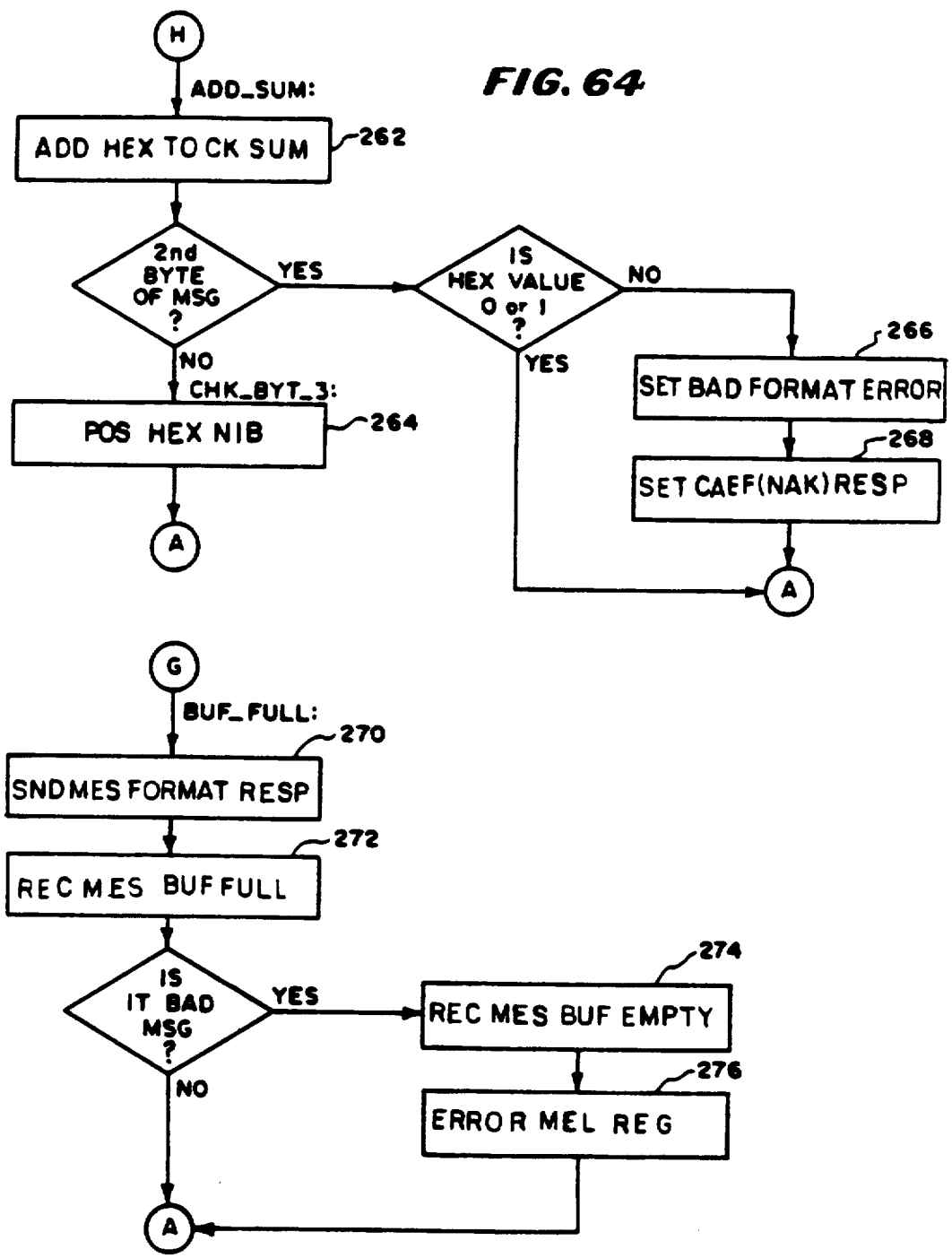

Considering now the separate routines which are polled by the main polling loop of the master/product configuration, the first routine polled is the POLL-RCV-INT routine the flow chart of which is shown in FIGS. 62, 63 and 64. In this detailed flow chart, and in other flow charts of the master configurations, an encircled letter which has only a flow arrow leading to the circle is considered to be connected to the same encircled letter which has an arrow leading away from the circle in the same routine flow chart. Thus, in FIGS. 62 and 63 the encircled letters "A" which only have arrows leading into the circle are all connected to the encircled "A" identified by the reference numeral 230. Considered generally, this routine processes the incoming RS232 ASCII II encoded characters in the interrupt buffer and accumulates an INCOM message in the receive message buffer.)

In FIG. 62 the block 232 sets up the pointer to the character in the receive interrupt buffer. The block 234 turns the echo on. Block 236 loads the received character pointed to into the transmit interrupt buffer and requests the character to be sent. Block 238 turns the echo off.

In FIG. 63 the block 240 sets the receive message counter equal to 1, the block 242 sets the check sum total equal to 2, the block 244 designates the receive message buffer is empty, the block 246 sets up for the CAEF [ACK]. In the ASCII II decoding line the block 248 converts the ASCII II coded character to the hexadecimal value number, and the block 250 increments the receive message counter. The block 252 adds the hexadecimal value to the check sum and the block 254 sets an error in the case of a bad check sum. In the nonhexadecimal line the block 256 sets a flag that a bad character was received and the block 258 sets up for a CAEF [NAK]. The block 260 adds a hexadecimal value to the check sum.

In FIG. 64 the block 262 adds the hexadecimal value to the check sum and the block 264 puts the hexadecimal nibble in the proper position of the IN-COM message format in the receive message buffer. The block 266 sets an error for bad format, i.e., a bad command-/data field. The block 268 sets up for a CAEF [NAK] response to the master 40. The block 270 sets up a request to send a format response, the block 272 designates the receive message buffer as full, the block 274 ignores the bad message and designates the receive message buffer as empty and the block 276 designates an error in the MEI status register.

Figure 65:
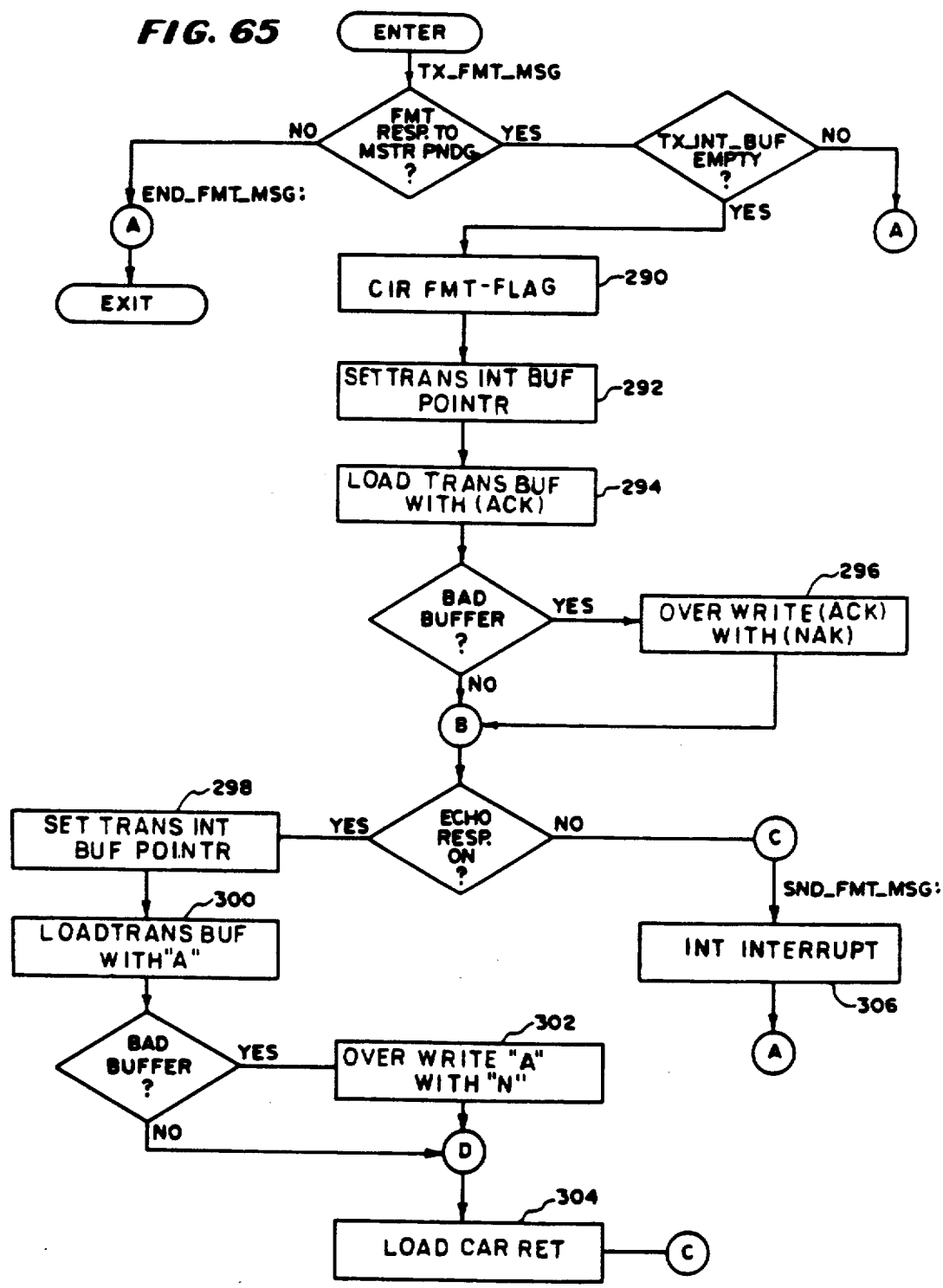
FIG. 65 is a detailed flow chart of the TX-FMT-MSG routine used in both the master/product and master/INCOM programs.

Considering now the TX-FMT-MSG routine, which is the next routine polled in the main polling loop of the master/product configuration, this routine is shown in FIG. 65. As discussed generally heretofore, this routine transmits a format response to the RS232 message received. It should be noted that this routine returns to one of two locations depending upon which configuration called it. In the master/product configuration this routine returns to the RCV-POLL-2 location as shown in the right hand column of FIG. 61. In the master/INCOM configuration this routine returns to the INCOM-POLL-4, as shown in the left hand column of FIG. 61. Referring to FIG. 65, if a format response to the master is pending and the transmit interrupt buffer is empty the block 290 clears the FMT-FLG designating that no format response is pending, the block 292 sets up the transmit interrupt buffer pointers, and the block 294 loads the transmit buffer with [ACK]. If a bad buffer is indicated the block 296 overwrites [ACK] with [NAK].

If an echo response is on, the block 298 sets the transmit interrupt buffer pointers and the block 300 loads the character 'A' in the transmit interrupt buffer. If a bad buffer is indicated the block 302 overwrites the 'A' with 'N' in the transmit interrupt buffer. The block 304 loads [CR] carriage return into the transmit interrupt buffer and updates the pointer. The logic flow then goes to block 306 which initiates an interrupt to send the RS232 message in the transmit interrupt buffer and the routine exits.

Figure 66:
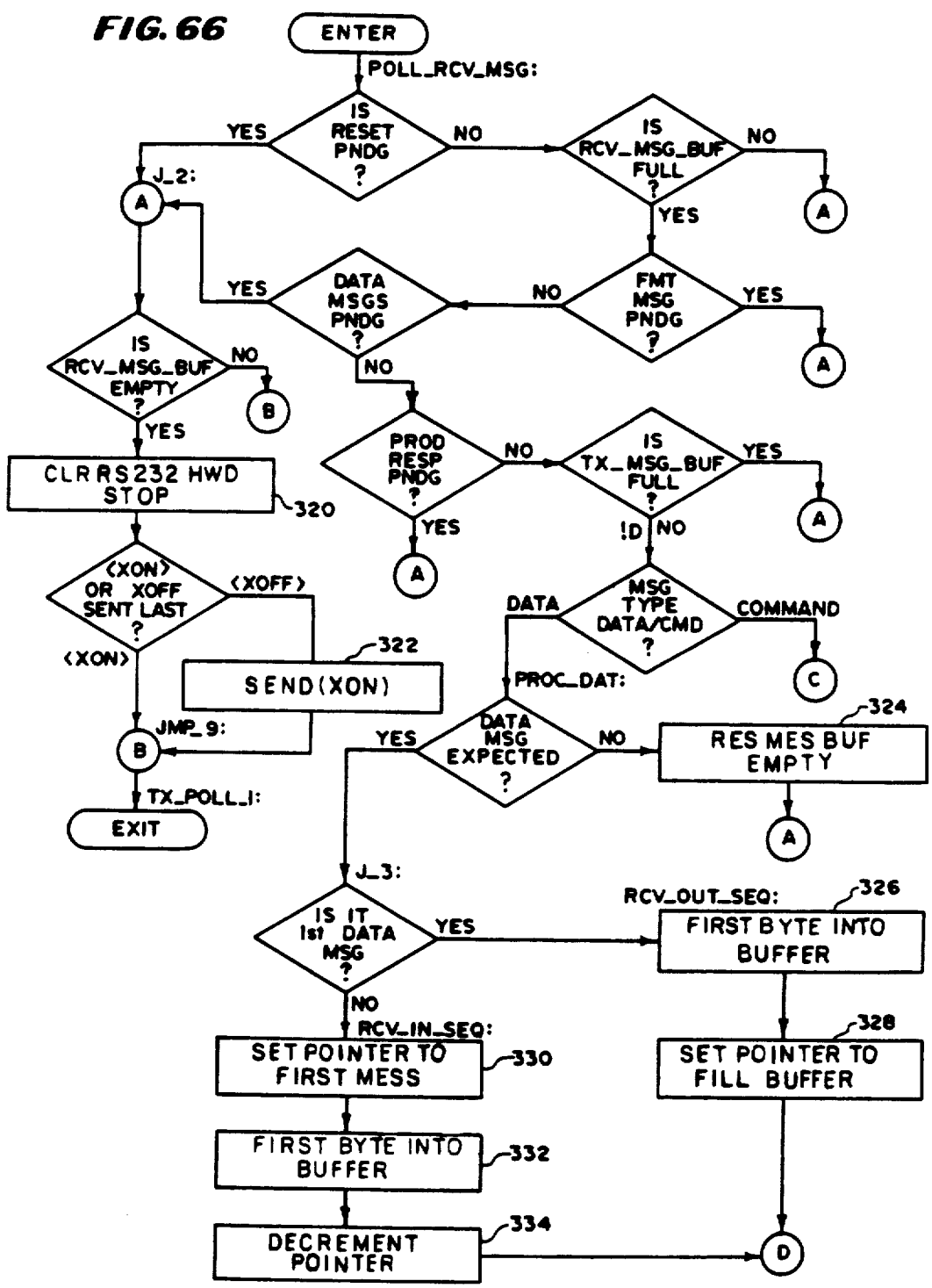

Considering now the POLL-RCV-MSG routine which is the next routine polled in the main polling loop of the master/product configuration, this routine is shown in FIGS. 66 to 75. As discussed generally heretofore, this routine processes an INCOM formatted message in the receive message buffer obtained from the RS232 master 40. Referring to FIG. 66, if a reset is pending and the receive message buffer is empty the block 320 clears the RS232 hardware stop to allow transmission. The block 322 requests the sending of the character [XON] to the master 40 and the program exits. If a data message is indicated but no data message was expected, the block 324 ignores the message and designates the receive message buffer empty. If a data message was expected and it is the first data message, the block 326 obtains a product buffer to use and puts the first byte of the message from the receive message buffer into it. The block 328 sets up a pointer to the remainder of the product buffer to fill. If it is not the first data message, the block 330 sets up the pointer to the message in the product buffer defined by the first message, the block 332 stores the first byte of the message from the receive message buffer at this location in the product buffer and the block 334 decrements the pointer.

Figure 67:
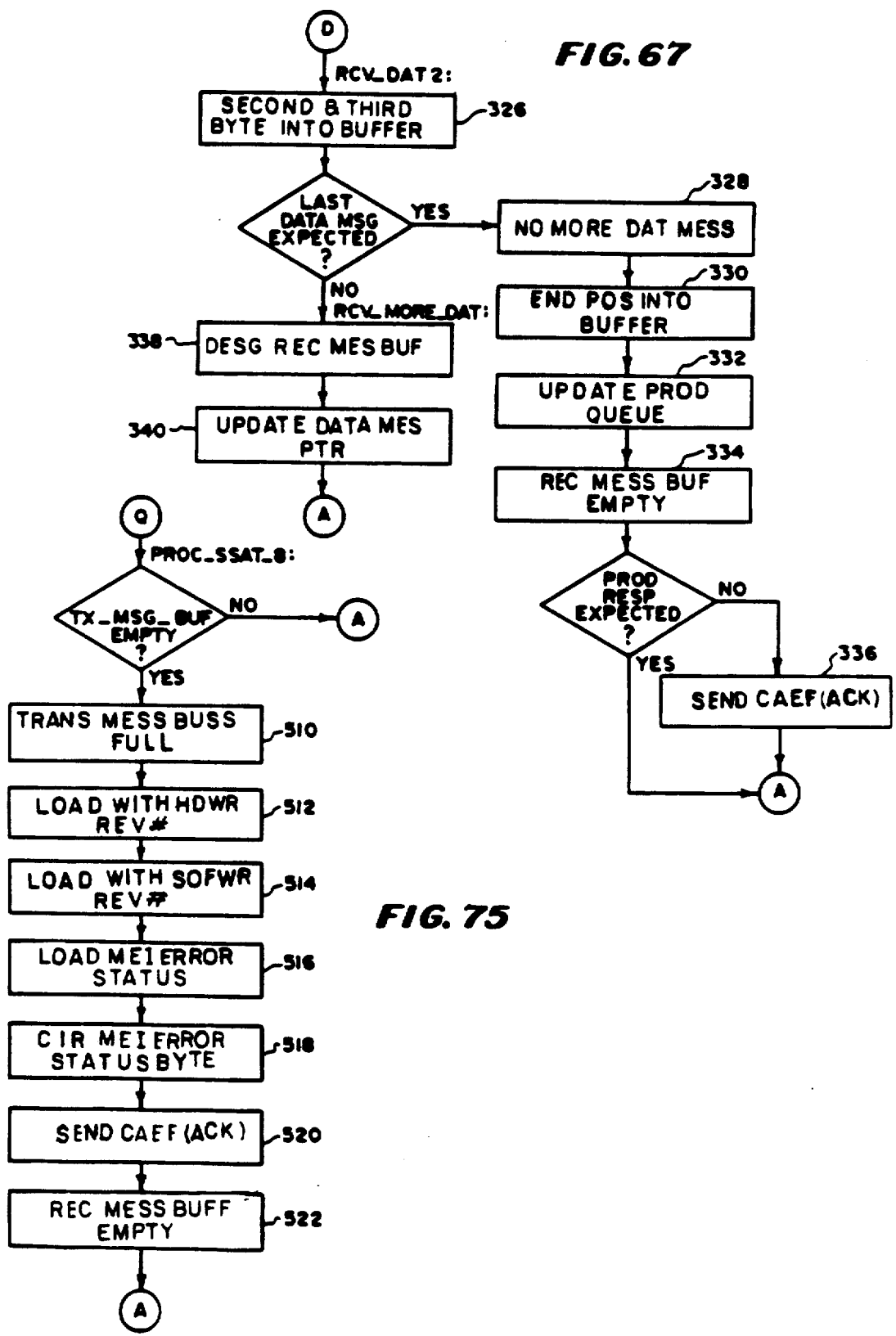

Referring to FIG. 67, the block 336 stores the second and third bytes of the receive message buffer in the product buffer. If this is the last data message expected, the block 328 designates that no more data messages are expected, the block 330 saves the ending position in the product buffer and designates it valid, the block 332 updates the product queue of command associated with the data messages received and the block 334 designates the receive message buffer empty. If a product response is not expected, the block 336 initiates a request to send CAEF [ACK]. If more data messages are expected the block 338 designates the receive message buffer empty and the block 340 updates the data message pointer.

Figure 68:
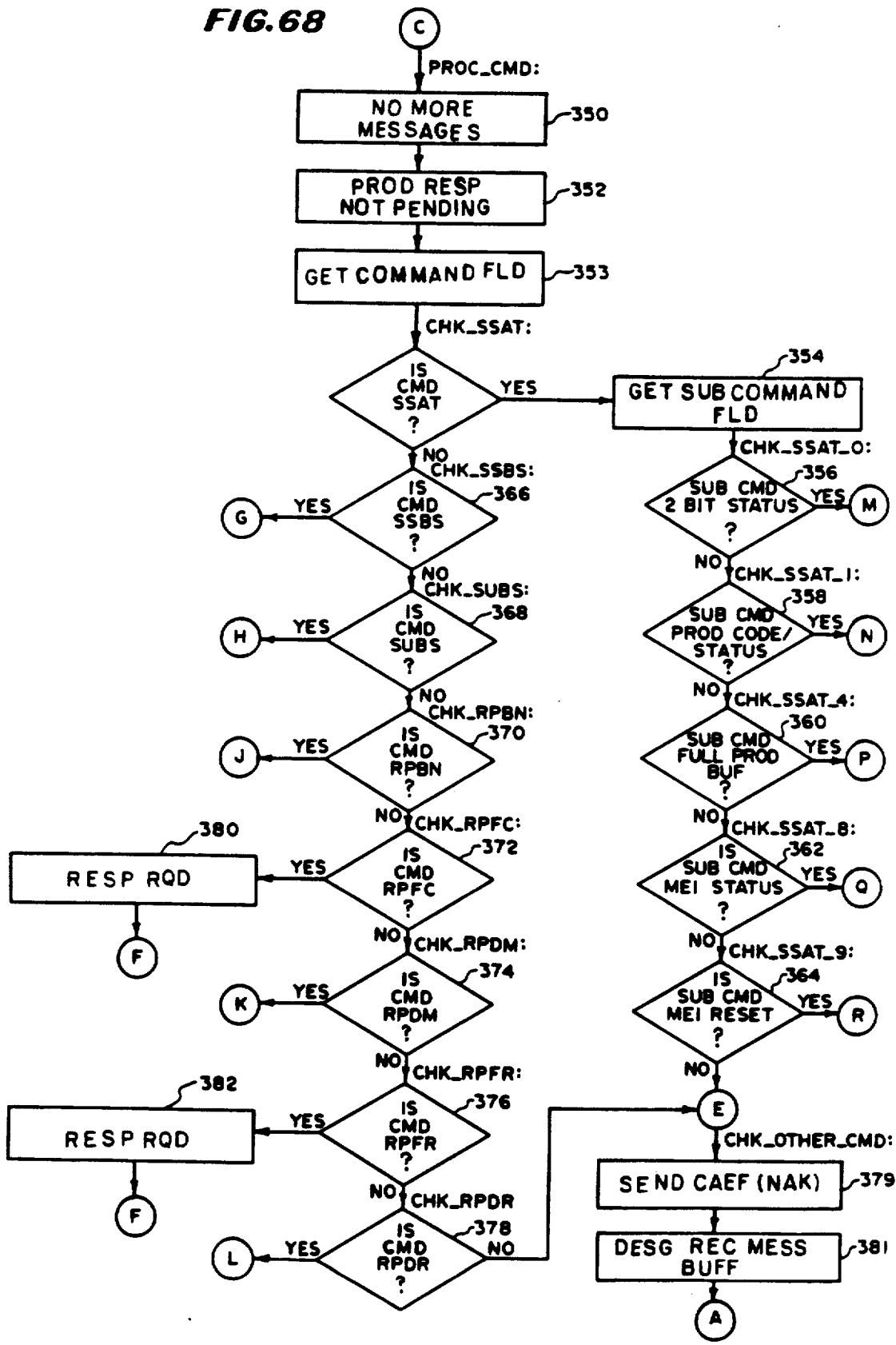

Referring to FIG. 68, wherein a command from the external master 40 is processed, the block 350 designates no more data messages expected, the block 352 designates the product response not pending and the block 353 instructs to get the command field of the INCOM format message. If the command is an SSAT command the block 354 gets the subcommand field of the message which is decoded in the decision blocks 356-364. If the command is not an SSAT command the command field is decoded to determine the nature of the command, as discussed in detail heretofore in connection with Tables I and II, this decoding being achieved by the decision blocks 366-378. If the command is RPFC the block 380 designates that a product RESP is required. If the command is RPFR the block 382 designates that a product RESP is required. The outputs of the decision blocks in FIG. 68 are supplied to the indicated subroutines in the other figures of the POLL-RCV-MSG routine. If the command is not any of those tested for in these decision blocks, the block 379 initiates a request to send CAEF [NAK] and the block 381 designates the receive message buffer empty.

Referring to FIG. 69, the flow points G, H and P are first sent to the SETUP-SUBS subroutine, as block 390 gets the message information to set up pointers of the data message to send. The block 392 gets the message information to set up pointers of data messages to send, and the block 394 sets up pointers from the product buffer information for the number of messages to send. If the pointers are within the range of the product buffer, the block 396 designates a data message pending to be sent to the master. If not, the block 398 designates the receive message buffer empty, the block 400 releases the product buffer grabbed for use, and the block 402 requests a CAEF [out-of-range] to be sent.

Referring to FIG. 70, the output of the decision block 358 (FIG. 68), after going to the GET-BUFF routine described in more detail hereinafter, asks if a product buffer has been obtained in the decision block 404. If it has, the block 406 sets up pointers to message number 1. If no buffer is obtained the block 408 designates the receive message buffer as empty and the block 410 initiates a request to send CAEF [no valid buffer]. If the command is RPBN, the block 412 designates no product RSVP required. If a previous buffer number was specified and this is not the same as the new buffer number, the block 414 designates invalid product buffers and the block 416 saves the new buffer number. If the new buffer number is the same as the old buffer number the block 418 designates that a buffer number has been received and the block 420 initiates a request to send CAEF [ACK].

Figure 71:
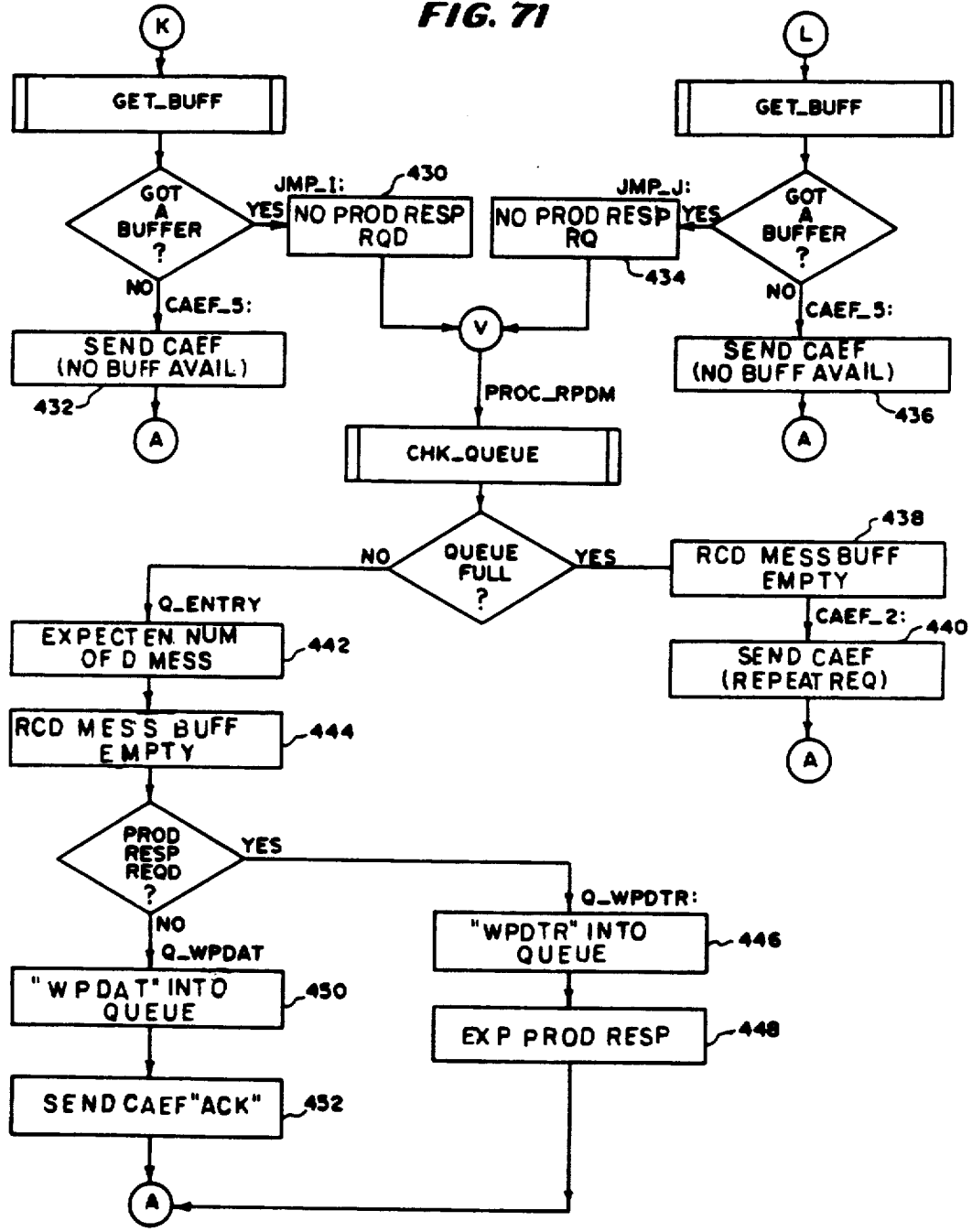

Referring to FIG. 71, if the command is RPDN and a product buffer is obtained, the block 430 designates no product response required. If no buffer is obtained the block 432 initiates a request to send CAEF [no buffer available]. Similarly, if the command is RPBR and a buffer is obtained the block 434 indicates no product response is required whereas if no buffer is obtained, block 436 initiates a request to send CAEF [no buffer available]. The subroutine CHK-QUEUE is then called, as described in more detail hereinafter. If the queue is filled the block 438 designates the receive message buffer as empty and the block 440 initiates a request to send CAEF [repeat request]. If the queue is not full the block 442 sets up the expected number of data messages from the master and in the product queue, and the block 444 designates the receive message buffer as empty. If a product response is required the block 446 puts "WPDTR" in the product queue and the block 448 sets up to expect a product response. If no product response is required the block 450 puts "WPDAT" in the product queue and the block 452 initiates a request to send CAEF [ACK].

Figure 72:
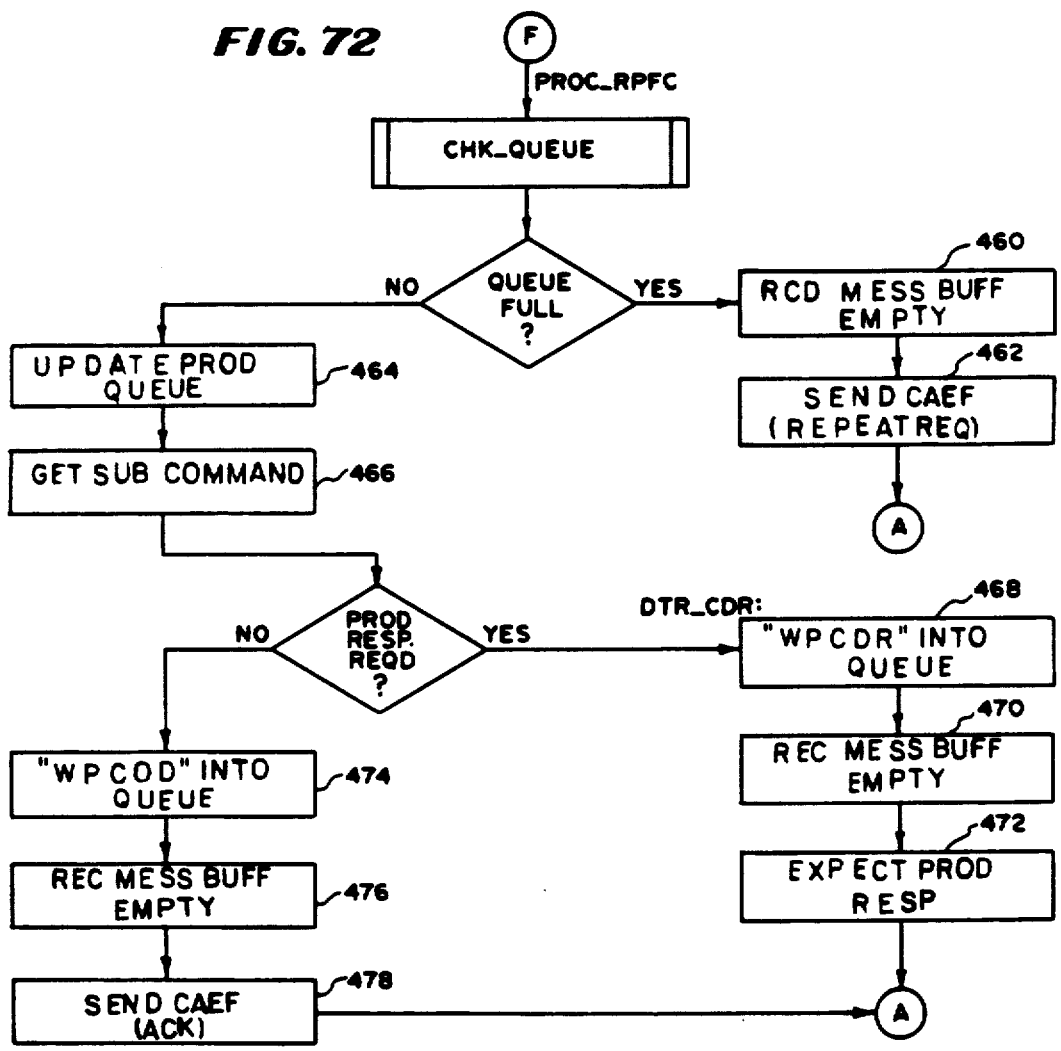

Referring to FIG. 72 if the command is RPFC the CHK-QUEUE routine is called. If the queue is full blocks 460 and 462 function the same as the blocks 438 and 440 in FIG. 71. If the queue is not full the block 464 updates the product queue and the block 466 gets the subcommand to put in the product queue. If a product RSVP is required the block 468 puts "WPCDR" in the product queue, the block 470 sets the receive message buffer empty and the block 472 sets up to expect a product response. If no product RSVP is required the block 474 puts "WPCOD" in the product queue, block 476 sets the receive message buffer empty and the block 478 initiates a request to send CAEF [ACK].

Figure 73:
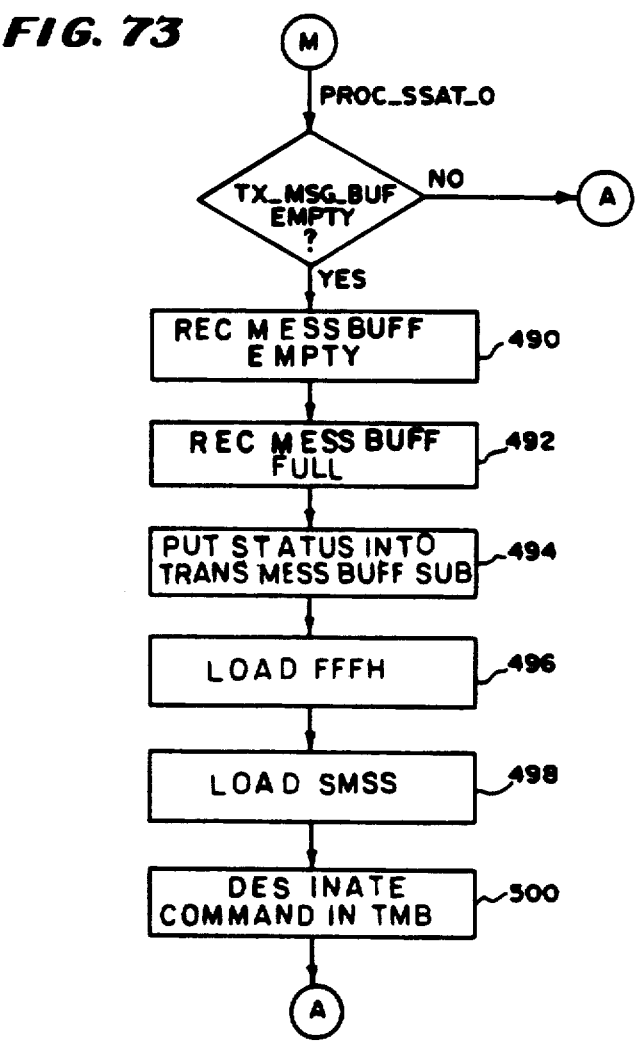

Referring to FIG. 73, if the subcommand requests a two bit status and the transmit message buffer is available, the block 490 designates the receive message buffer empty, the block 492 designates the transmit message buffer as full, the block 494 obtains a product buffer and puts the two bit status in the transmit message buffer subcommand. The block 496 loads the address of FFFH, the block 498 loads SMSS into the response command field, and the block 500 designates the command in the transmit message buffer.

Figure 74:
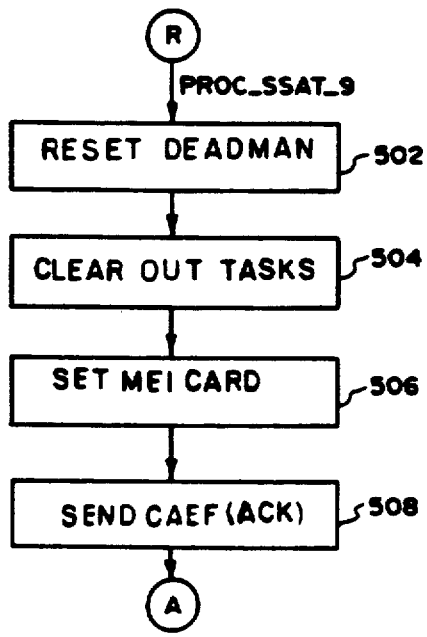

Referring to FIG. 74, if the subcommand is an MEI reset the block 502 resets the deadman hardware, the block 504 clears out any pending tasks of the MEI card 30, the block 506 sets the MEI reset flag on and the block 508 initiates a request to send CAEF [ACK].

Referring to FIG. 75, if the subcommand is a request for MEI status and the transmit message buffer is available, the block 510 designates the transmit message buffer full and containing a data message, the block 512 loads message byte #1 with the hardware revision #, the block 514 loads message byte number 2 with the software revision #, block 516 loads message byte number 3 with the MEI error status byte, block 518 clears the appropriate bits in the MEI error status byte, block 520 initiates a request to send CAEF [ACK] and the block 522 designates the receive message buffer empty.

Figure 76:
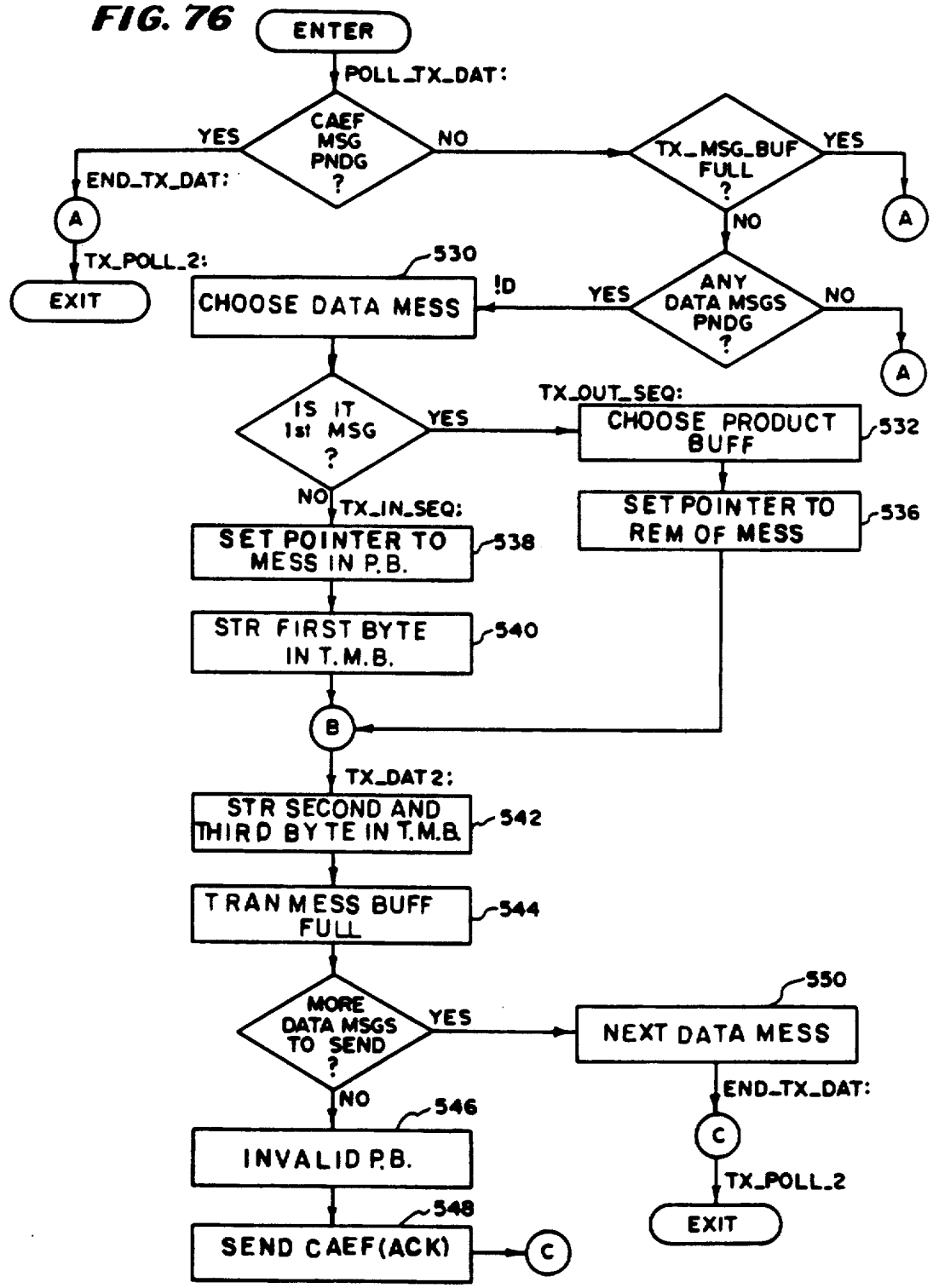
FIG. 76 is a detailed flow chart of the POLL-TX-DAT routine used in the master/product program.

Considering now the POLL-TX-DAT routine, which is the next routine in the main polling loop of the master/product configuration, this routine is shown in FIG. 76. Considered generally, this routine processes data messages in a product buffer and sets them up to be sent to the RS232 master. Referring to FIG. 76, if a CAEF message is not pending, the transmit message buffer is not full and there are data messages pending, the block 530 sets up which data message to process. If this is the first data message the block 532 determines the product buffer to use and gets the out-of-order byte into the transmit message buffer and the block 536 sets up a pointer to the remainder of the message. If this is not the first data message, the block 538 sets up a pointer to the message in the product buffer defined by the first message (?), and the block 540 gets the first byte and stores it in the transmit message buffer. Block 542 gets the second and third bytes and stores them in the transmit message buffer and block 544 designates the transmit message buffer full and pending to be sent to the RS232 master. If there are no more data messages to send, the block 546 designates an invalid product buffer and gives control of it back to the product port software, and the block 548 sets up to send a CAEF [ACK] and makes it a pending request. If there are more data messages to be sent the block 550 increments a pointer to designate the next data message to process and the program exits.

Figure 77:
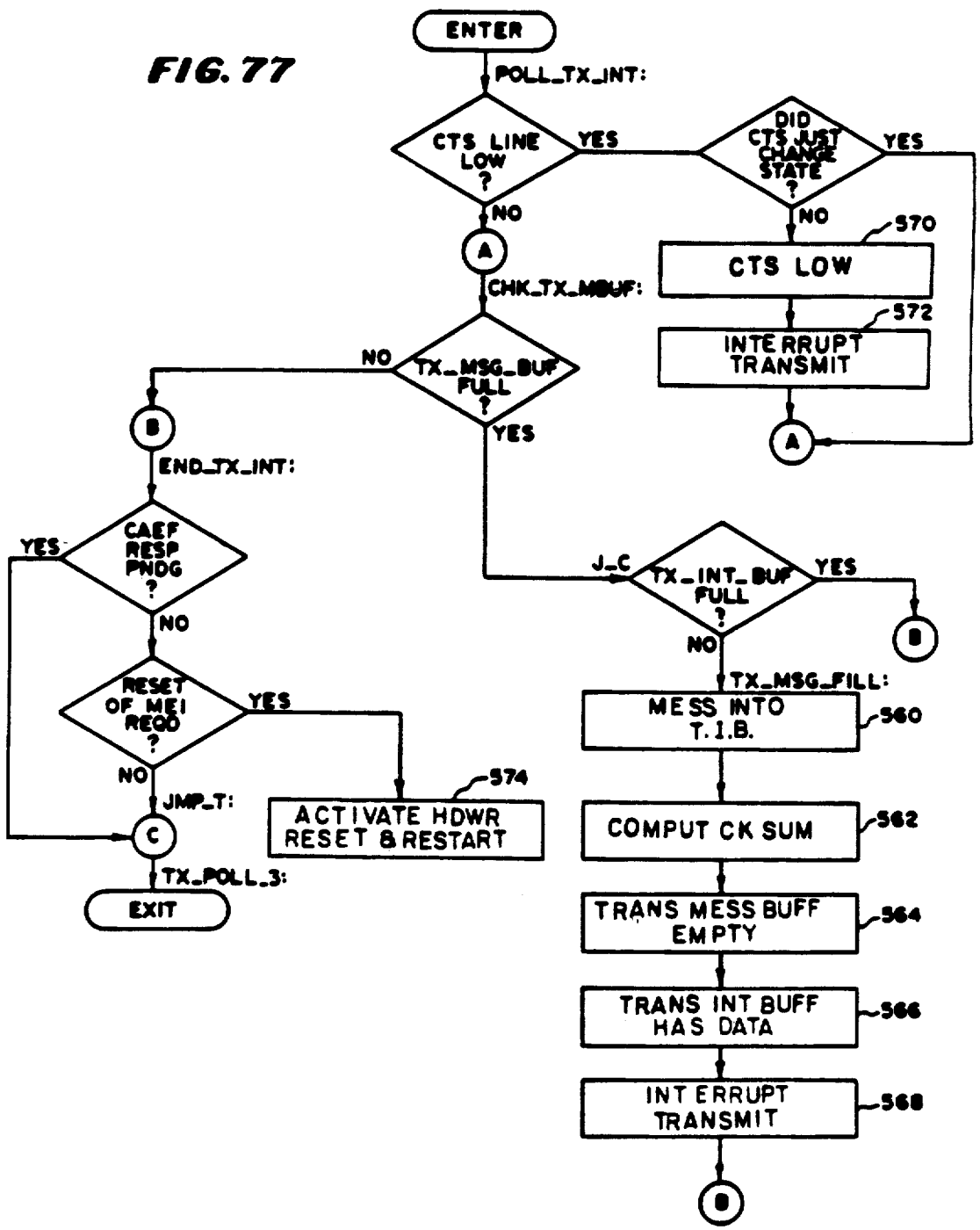
FIG. 77 comprises a detailed flow chart of the POLL-TX-INT routine used in both the master/product and master/INCOM programs.

The POLL-TX-INT routine, which is the next routine in the main polling loop of the master/product configuration, is shown in FIG. 77. Considered generally, this routine moves a message from the INCOM format buffer to the RS232 transmit interrupt buffer. This routine also tests for hardware transmit stop request and hardware reset (SSAT-09 from the master 40). Referring to FIG. 77, if the hardware "stop transmit" CTS line is high, there is a message to send and the transmit interrupt buffer is not full, the block 560 moves the message in the transmit buffer to the transmit interrupt buffer, changing the nibble order to match the RS232 protocol. The block 562 computes the check sum of the nibbles in the message and enters this check sum in the transmit interrupt buffer to be sent to the RS232 master, the block 564 designates the transmit message buffer empty, the block 566 sets up pointers to designate that the transmit interrupt buffer has data to be sent and the block 568 requests an RS232 transmit interrupt. If the CTS line is low and did not just change state, the block 570 designates the prior state of the CTS line as low and the block 572 requests an RS232 transmit interrupt. If there is no message to send, no CAEF response is pending and a reset of the 8051 is requested by the RS232 master, the block 574 sits in an infinite loop. This will cause the deadman to activate an 8051 hardware reset and restart.

Figure 78:
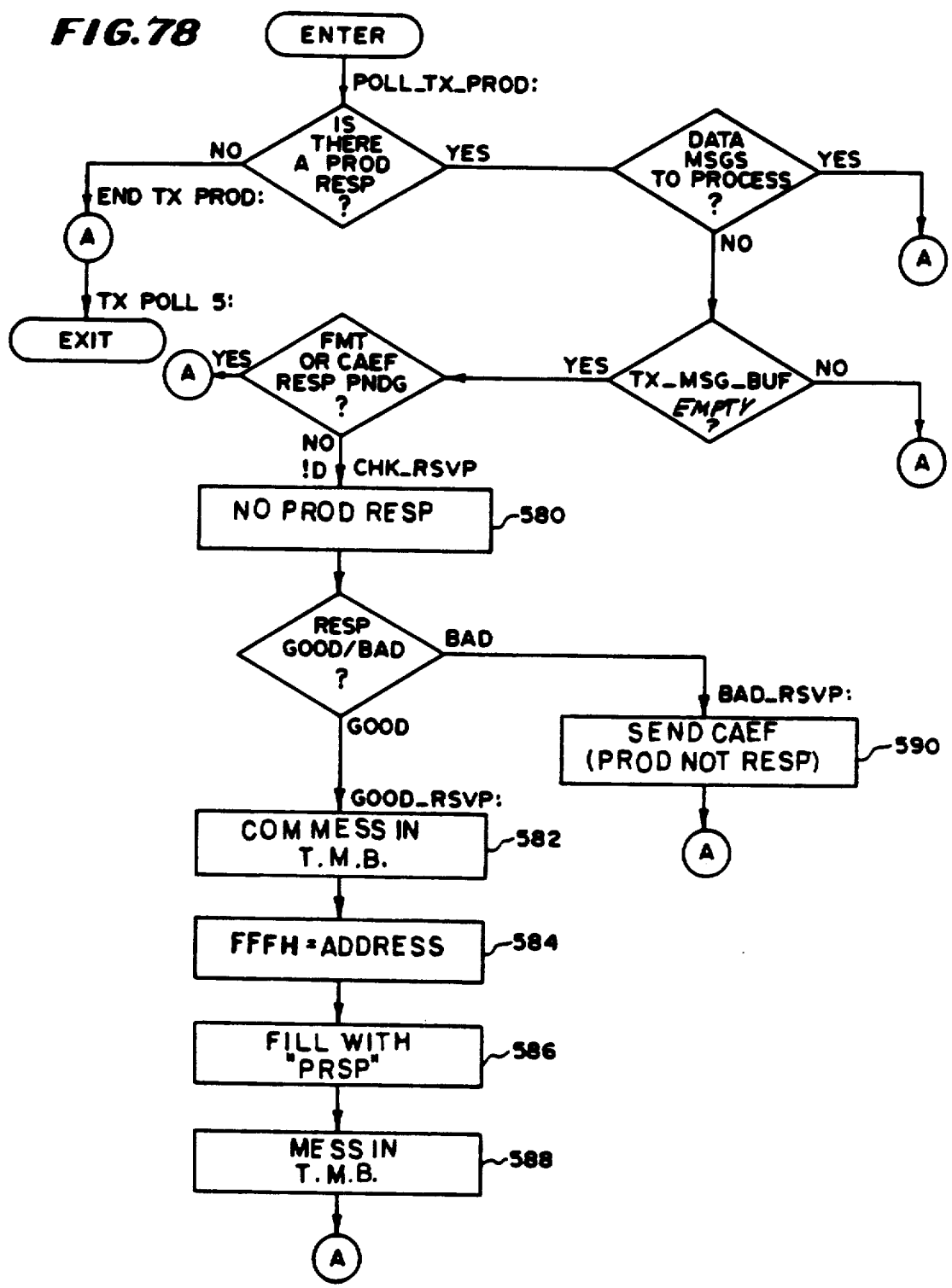
FIG. 78 is a detailed flow chart of the POLL-TX-PROD routine used in the master/product program.

The POLL-TX-PROD routine, which is the next routine polled in the main polling loop of the master/product configuration, is shown in FIG. 78. Considered generally, this routine checks for a product response and prepares it to be sent to the RS232 master 40. Referring to FIG. 78, if there is a product response, there are no data messages to process, the transmit message buffer is empty and no format or CAEF response is pending, the block 580 designates no product response is necessary after this routine is completed. If the response is good, the block 582 defines a command message in the transmit message buffer, the block 584 gives the address of FFFH to this message, the block 586 fills the subcommand field of the message with the product response and the command field with "PRSP" code and the block 588 designates that a message in the transmit message buffer is pending to send. If there is a bad response, the block 590 sets up and requests to send CAEF [product not responding].

Figure 79:
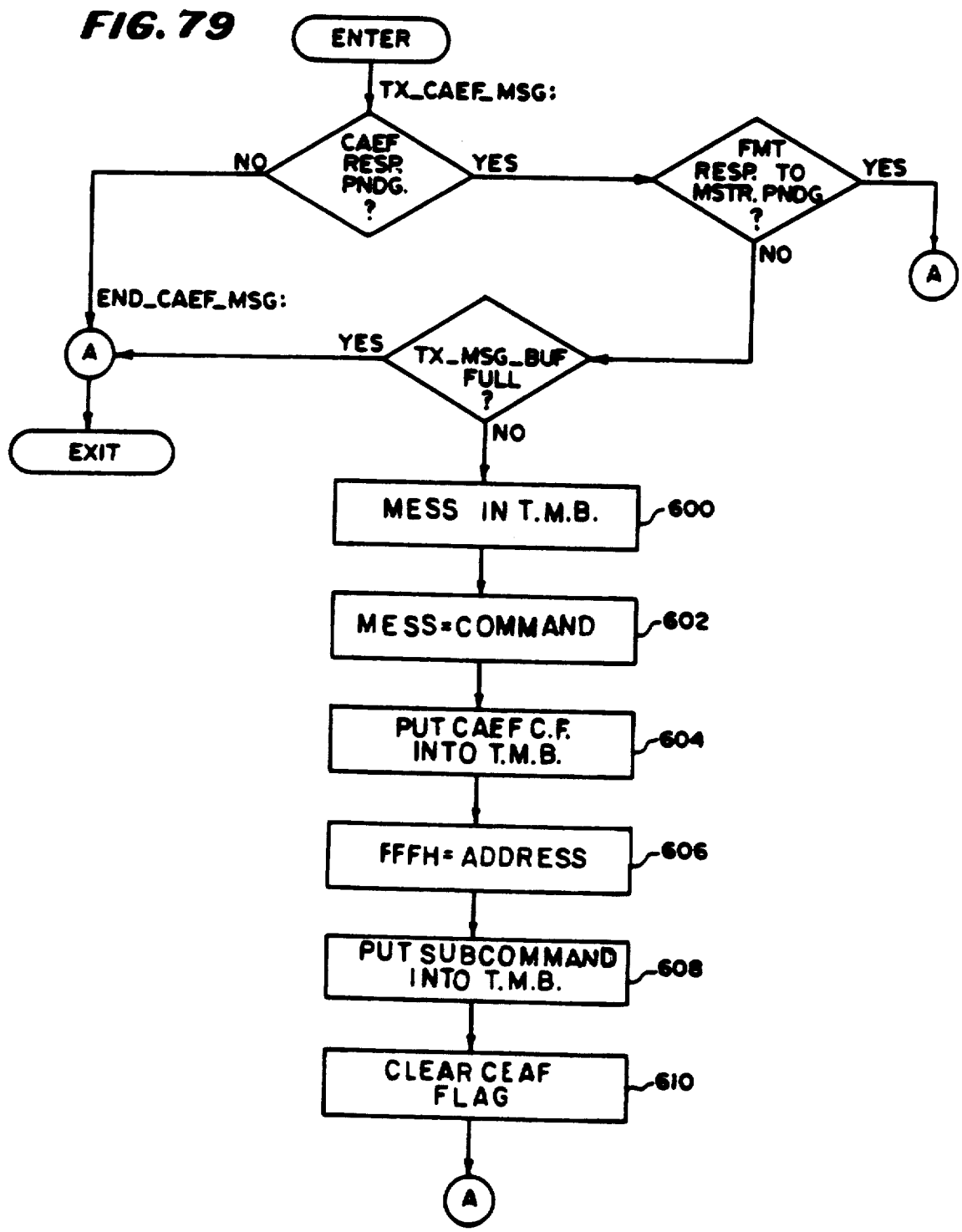
FIG. 79 is a detailed flow chart of the TX-CAEF-MSG routine used in the master/product programs.

The TX-CAEF-MSG routine, which is the last routine in the main polling loop of the master/product configuration, is shown in FIG. 79. Considered generally, this routine transmits a CAEF response to certain messages received from the RS232 master. It should be noted that this routine returns to one of two locations depending upon which configuration called it. Thus, in the master/product configuration this routine returns to TX-POLL-6; (FIG. 61) and in the master/INCOM configuration this routine returns to INCOM-POLL-6 (FIG. 61). Referring to FIG. 79, if a CAEF response is pending, no format response to the master is pending and the transmit message buffer is not full, the block 600 designates the message in the transmit message buffer, the block 602 designates that the message is a command and not data, the block 604 loads the transmit message buffer with the CAEF command field, the block 606 loads the transmit message buffer with FFFH as the address field, the block 608 gets the subcommand to be sent and puts it into the transmit message buffer, and the block 610 clears the CAEF flag, designating no CAEF message pending.

Figure 80:
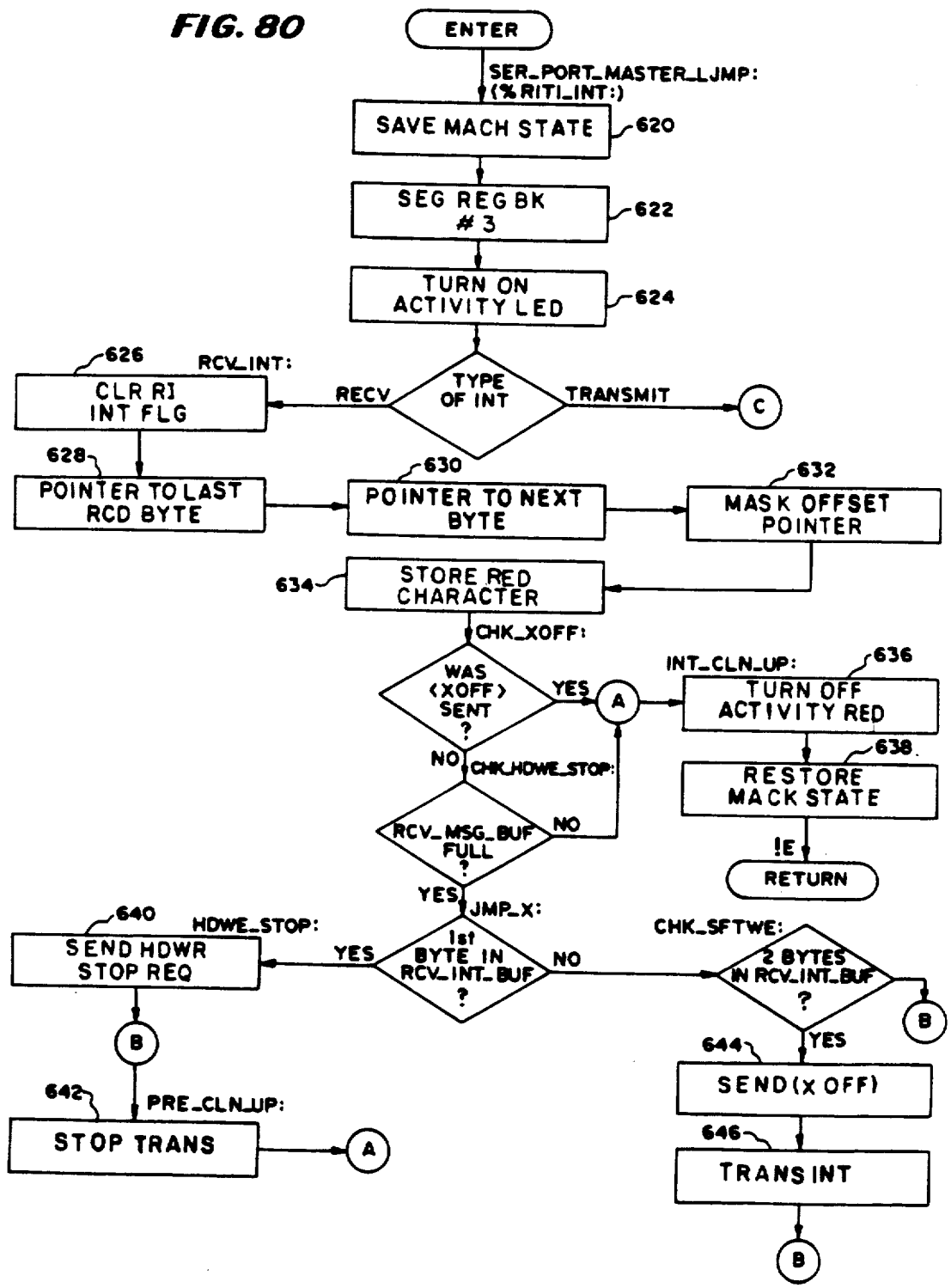
FIGS. 80 and 81 comprise a detailed flow chart of the RITI-INT routine used in the master/product program.
Figure 81:
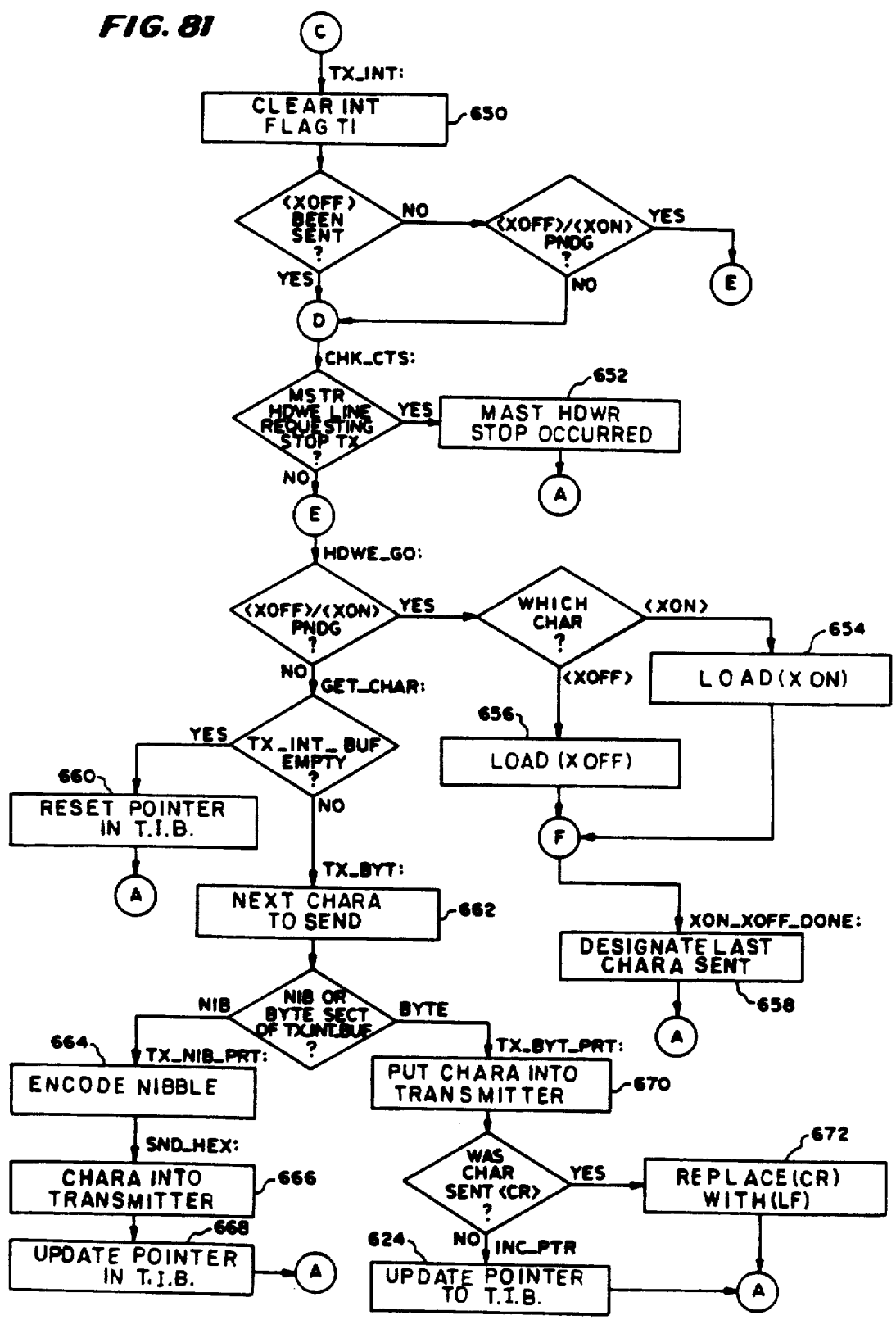

As discussed generally heretofore, the interrupt routine %RITI-INT processes both receiver and transmitter interrupts. This interrupt routine is shown in FIGS. 80 and 81. Referring to FIG. 80, the machine state of the 8051 is saved by the block 620, the block 622 sets up for register bank #3 and the block 624 turns on the activity LED shown in FIG. 6. If a receive interrupt occurs the block 626 clears the RI interrupt flag, the block 628 gets a pointer on where the last received byte is, and block 630 increments the pointer for the next byte. Block 632 masks the offset pointer to a value between 0 and 3 for the four byte interrupt ring buffer, and block 634 stores the character received after masking off bit 7 to a value of 0. If an [XOFF] was sent, the block 636 turns off the activity LED and block 638 restores the machine state of the 8051. If no [XOFF] was sent, the receive message buffer is full, and the receive interrupt buffer has 1 byte stored the block 640 sends an RS232 hardware stop request to have the master 40 stop transmitting and block 642 cleans up the error, status register and stack. If the receive interrupt buffer has 2 bytes stored, the block 644 sets up a request to send [XOFF] and block 646 requests an RS232 transmit interrupt.

Referring to FIG. 81 the block 650 clears the interrupt flag TI. If the MEI card is sent an [XOFF] or an RS232 and the master hardware line is requesting to stop transmission, the block 652 denotes a master hardware stop has occurred. If an [XON] is pending the block 654 loads the RS232 transmitter with [XON]. If an [XOFF] is pending the block 656 loads the RS232 transmitter with [XOFF], and the block 658 designates the last character of the [XON]/[XOFF] pair sent and that none are pending. If there are no characters to send the block 660 resets the pointers in the transmit interrupt buffer. If characters are to be sent, the block 662 gets a pointer to determine next character to send. If this character is in the nibble section of the transmit interrupt buffer the block 664 gets the nibble and encodes it into hexadecimal ASCII II characters, the block 666 puts the characters into the RS232 transmitter and the block 668 updates the pointers into the transmit interrupt buffer. If the character is in the byte section of the transmit interrupt buffer the block 670 puts the character into the RS232 transmitter. If the character sent is a carriage return [CR] the block 672 replaces [CR] with [LF] in the transmit interrupt buffer. If the character is not [CR] the block 674 updates the pointers to the transmit interrupt buffer.

Figure 82:
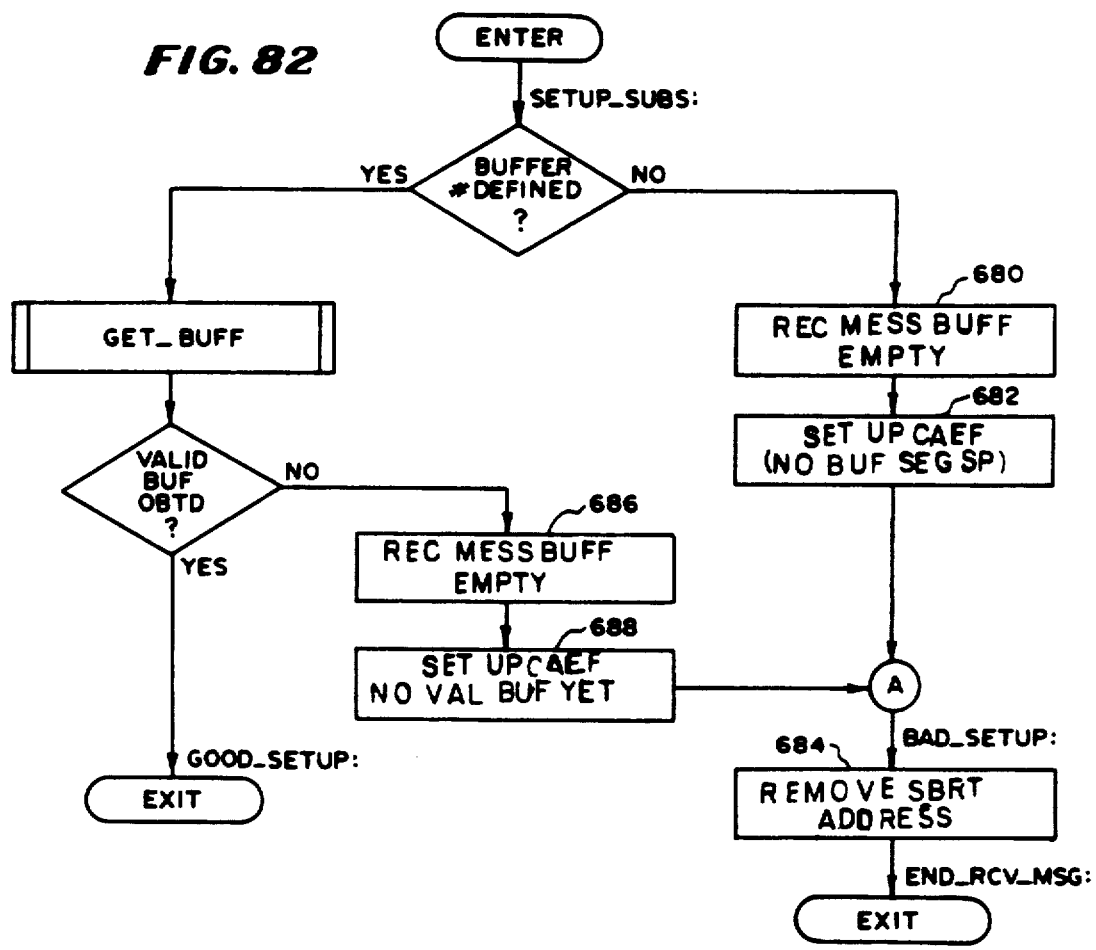
FIG. 82 is a detailed flow chart of the SETUP-SUBS routine used in the master/product program.

The SETUP-SUBS subroutine is used to determined if a product buffer is available or no buffer segment # is defined. This subroutine is used, for example, in FIG. 69. The flow chart of the SET-UP-SUBS subroutine is shown in FIG. 82. Referring to this figure, if a buffer number has not been defined, the block 680 designates the receive message buffer empty, the block 682 sets up CAEF [no buffer segment specified] and requests that it be sent, and the block 684 removes the subroutine return address from the stack. Block 684 exits by going to flow point A on the POLL-RCV-MSG routine shown on FIG. 66. If a valid buffer is not obtained the block 686 designates the receive message buffer empty and the block 688 sets up CAEF [no valid buffer yet] and requests it to be sent.

Figure 83:
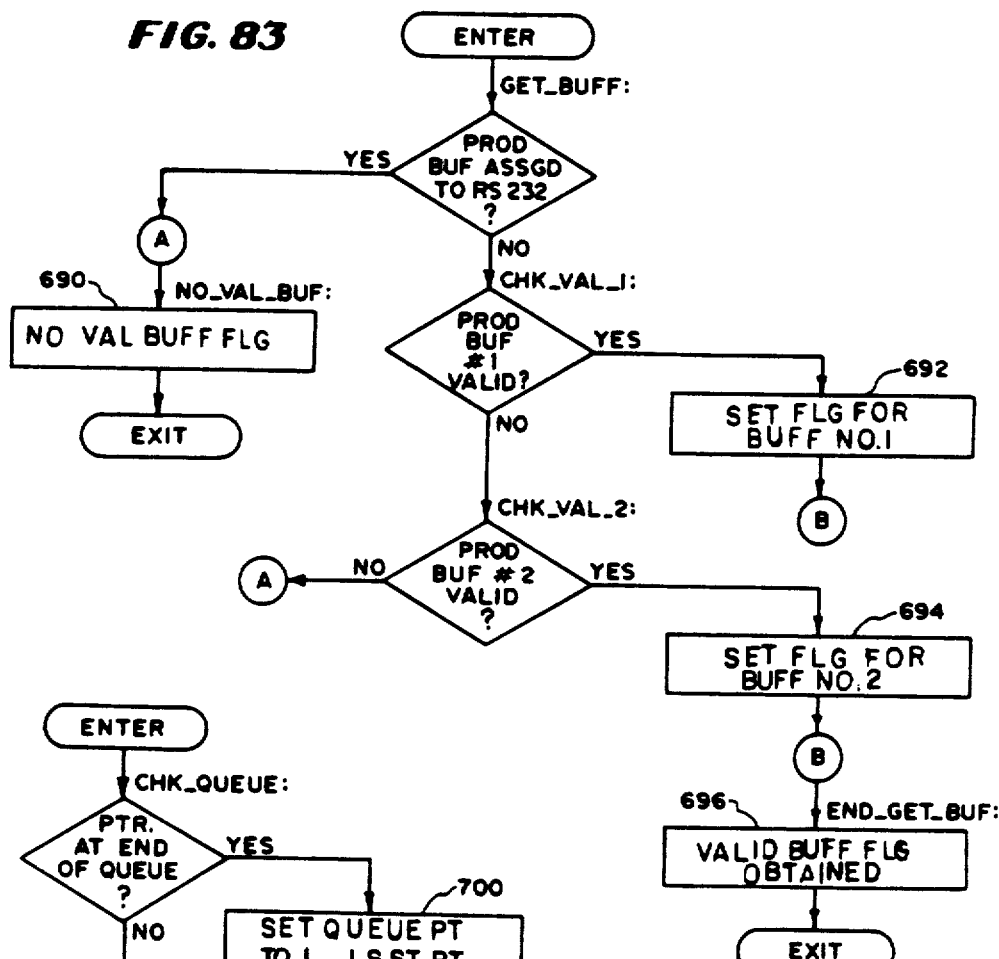
FIG. 83 is a detailed flow chart of the GET-BUF subroutine used in the master/product program.

As discussed generally heretofore, the GET-BUF subroutine checks the two product buffers to obtain a valid product buffer for use by the master RS232 port routines. This subroutine is shown in FIG. 83. Referring to this figure if the RS232 port already has control of a product buffer the block 690 designates no valid buffer flag and the program exits. If the RS232 port does not control a product buffer and the product buffer #1 is valid the block 692 sets flags for buffer #1 to designate its use by the RS232 routines. If product buffer #1 is not valid but product buffer #2 is, the block 694 sets flags for buffer #2 and designates its use by the RS232 routines. Block 696 designates the valid buffer flag obtained and the subroutine exits.

Figure 84:
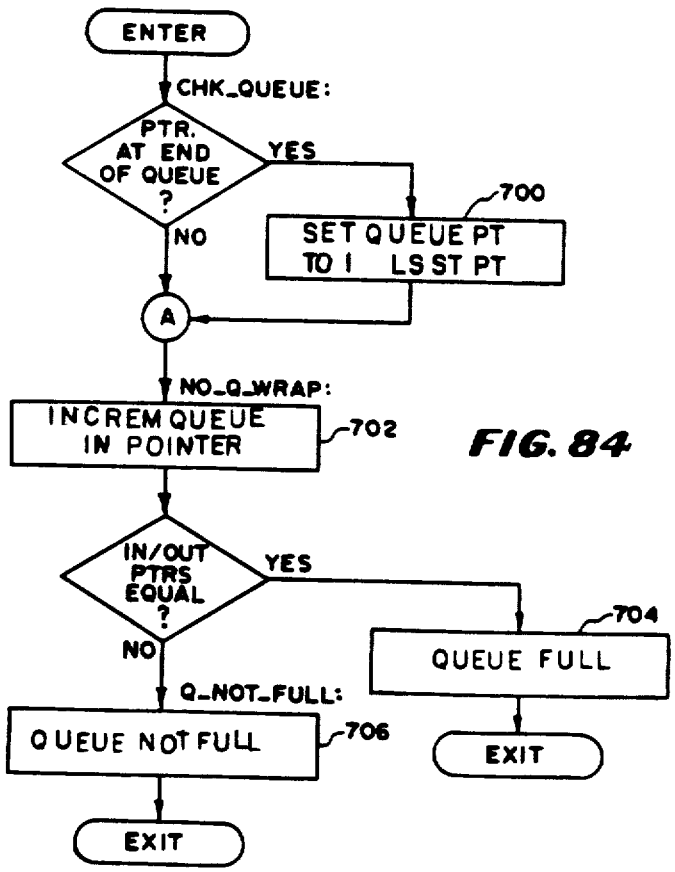
FIG. 84 is a flow chart of the CHK-QUEUE subroutine used in the master/product program.

As discussed generally heretofore, the CHK-QUEUE subroutine checks the product queue for pending commands this queue is 4 bytes (commands) deep. The CHK-QUEUE subroutine is shown in FIG. 84. Referring to this figure, if the queue input pointer is at the end of the queue the block 700 sets the queue pointer to one less than the start point of the queue and the block 702 increments the queue input pointer. If the queue input pointer has the same value as the queue output pointer the block 704 passes back that the queue is full. If these two pointers do not agree the block 706 passes back that the queue is not full.

Master/INCOM Configuration

The master/INCOM configuration of the MEI card allows the external master 40 to tap into the INCOM network 34 and control stand alone slaves or expanded mode slaves on the INCOM network. The master/INCOM configuration controls two ports of the MEI card 30, i.e., the INCOM port and the RS232C port. The INCOM routines of the INCOM/product configuration are not used in the master/INCOM configuration.

The routines used by the master/INCOM configuration can be broken into polling routines and interrupt routines. Polling routines are noncritical with respect to time. They move, process, and transform information that has been received from one port and send it to a transmitter of the same or another port. Interrupt routines are those routines that process and receive data from an external device and store it in a buffer so that the polling routine can process it at a later time. A time out interrupt also tests delays in command responses.

Some of the polling routines used in the master/INCOM configuration are also used in the master/product configuration. However, a brief description of the polling routines used in the master/INCOM configuration in the order in which they are polled in FIG. 61 is given below together with comments relevant to the master/INCOM configuration:

POLL-RCV-INT

This routine tests for data in the RS232C receive interrupt buffer, transforming it from the RS232 format into an INCOM format in another buffer. (Data flow: source=RS232C, destination=INCOM unless intercepted as an MEI command).

POLL-TX-INT

This routine moves data in an INCOM formatted buffer to the RS232 transmit interrupt buffer which is sent to the external master 40. In the process the data is reformatted for transmission. (Data flow: source=INCOM or MEI, destination=RS232C).

TX-FMT-MSG

This routine sends a response to the master 40 concerning the format of the message just received from the master. (Data flow: source=MEI, destination=RS232C).

TX-CAEF-MSG

This routine sends a response to the master 40 concerning the processing of the command sent to the MEI card. (Data flow: source=MEI, destination=RS232C).

POLL-MEI-CMD

This routine determines if the message received from the master 40 and in the INCOM formatted buffer is directed to the MEI card as a command. If it is, the routine performs the required actions. (Data flow: source=RS232C, destination=MEI).

POLL-RCV-INCOM

If the INCOM holding buffer has data pending that it received from the INCOM network, this routine moves the data to an INCOM formatted buffer for transmittal to the master 40. (Data flow: source=INCOM, destination=RS232C).

POLL-TX-INCOM

This routine determines if the message received from the RS232C master 40 and located in the INCOM formatted buffer, is directed to the INCOM network. If so, it sends a message to the INCOM chip to put onto the INCOM network 34.

A brief description of the interrupt routines employed in the master/INCOM configuration is as follows:

%INT-INCOM

This routine processes receive and transmit interrupts generated by the INCOM chip 36. For receive, it moves a message from the INCOM chip to the INCOM holding buffer. For transmit, it only clears out the interrupt line.

%INT-TIMER

This routine is a time out interrupt. An error flag is set if a response from the INCOM network is not received after a command request to it, within a given time period.

%RITI-INT

This routine processes receive and transmit interrupts generated by the RS232 master 40. For receive, a byte is moved from the receiver logic and stored in the receive interrupt buffer. For transmit, a byte is moved from the transmit interrupt buffer to the RS232 transmitter circuitry.

In addition to the above polling and interrupt routines, the master/INCOM configuration employs an INCOM-IN subroutine to clock a data byte from the INCOM chip into the microcontroller 38. It also employs the INCOM-OUT subroutine to clock a data byte from the microcontroller 38 into the INCOM chip 36.

The INCOM-BUF, also described as the INCOM holding buffer, is a contiguous circular/ring buffer of 72 bytes using RAM locations 38H through 7FH. It is a temporary storage for data received from the INCOM network that is pending to be processed and sent to the RS232 master 40. Three pieces of information control the status of this buffer: BEGIN-PTR, END-PTR, and BUF-FLG. BEGIN-PTR is a byte pointer used to designate where data is to be removed from the buffer for processing and transmission to the RS232 port. The value must be incremented to point to the proper location where this data is stored. END-PTR is a byte pointer used to designate where new data is to be placed in the buffer when received from the INCOM network. The value must be incremented to point to the next free location to store the data. BUF-FLG is a bit flag used to designate the ambiguous condition when both of the above pointers are equal. When not equal, this flag is always 0. When both pointers are equal and the flag=0, the buffer is empty. When equal and the flag=1, the buffer is full.

The INCOM holding buffer is filled in increasing memory location order (except for the loop back condition), and can be considered a FIFO queue. Data is stored in this buffer by the %INT-INCOM routine and removed by the POL-RCV-INCOM routine. The buffer (72 bytes), can hold 18 messages of 4 bytes each. The first byte of each message contains the BCH error in bit #0. The BCH error bit is 1 if an error was detected by the INCOM chip, otherwise it is 0. Also in this byte is the message type in bit #1 where command messages are represented by 1 and data messages by 0. The remaining bits of this byte are not used. The second, third and fourth bytes of this message correspond to the INCOM received message.

In the master/INCOM configuration, the MEI card 30 is programmed to respond to any command from the external master 40 with an address of FFFH. All other commands are passed on to the INCOM network without interpretation, other than format checking. Of those commands sent to the MEI card, only two are valid: a request of the MEI card to reset, and a request for the MEI card status. The MEI card will respond to any other command with a CAEF (not acknowledge).

The MEI reset command has a command field equal to 0000B (the binary code for the SSAT command) and a subcommand field of 1001B. When this command is received and interpreted, the only response processed and sent back before a hardware reset is the CAEF [acknowledge]. Of course, any information yet pending in the INCOM formatted transmit buffer and RS232 transmit interrupt buffer are allowed to be sent. After transmission, the MEI card 30 locks into a loop, waiting for the deadman circuitry to initiate a hardware reset. All status information concerned with events prior to reset is cleared.

The MEI status command has a command field equal to 0000B (the SSAT command) and a subcommand field of 1000B. The format for the status is the same as that received from an MEI slave on the network except for the interpretation of bits in the third byte of the message. For the master/INCOM configuration these bits are:

| Byte #3 | Description (0 = no error, 1 = error) |
|---|---|
| bit 16* (lsb) | BCH error |
| 17* | RS-232 received message format error |
| 18* | input data overflow/lost from RS-232 |
| 19* | input data overflow/lost from INCOM |
| 20* | INCOM timeout error for response to request |
| 21 | INCOM hardware error |
| 22 | MEI configuration must = 1 (serial) |
| 23 (msb) | MEI configuration, must = 0 (master) |
| For the master/product configuration, these bits are: | |
| bit 16* (lsb) | |
| 17* | RS-232 received message format error |
| 18* | input data overflow/lost from RS-232 |
| 19* | product timeout error |
| 20* | product interface link error |
| 21 | not used |
| 22 | MEI configuration, must = 0 (parallel) |
| 23 (msb) | MEI configuration, must = 0 (master) |

*bit is reset after the MEI status is read.

Considering first the initialization which is unique to the master/INCOM configuration, when the decision block 214 tests serial, the block 205 sets the stack pointer register to 7, the block 207 sets up the INCOM chip 36 and lines to the 8051, the block 209 sets up to allow the INCOM chip to interrupt the 8051 and the block 211 initializes pointers to the INCOM interrupt buffer where incoming messages are stored. The program then returns to the initialization at the INIT-MASTER-SPAR-RET point on FIG. 34.

Figure 85:
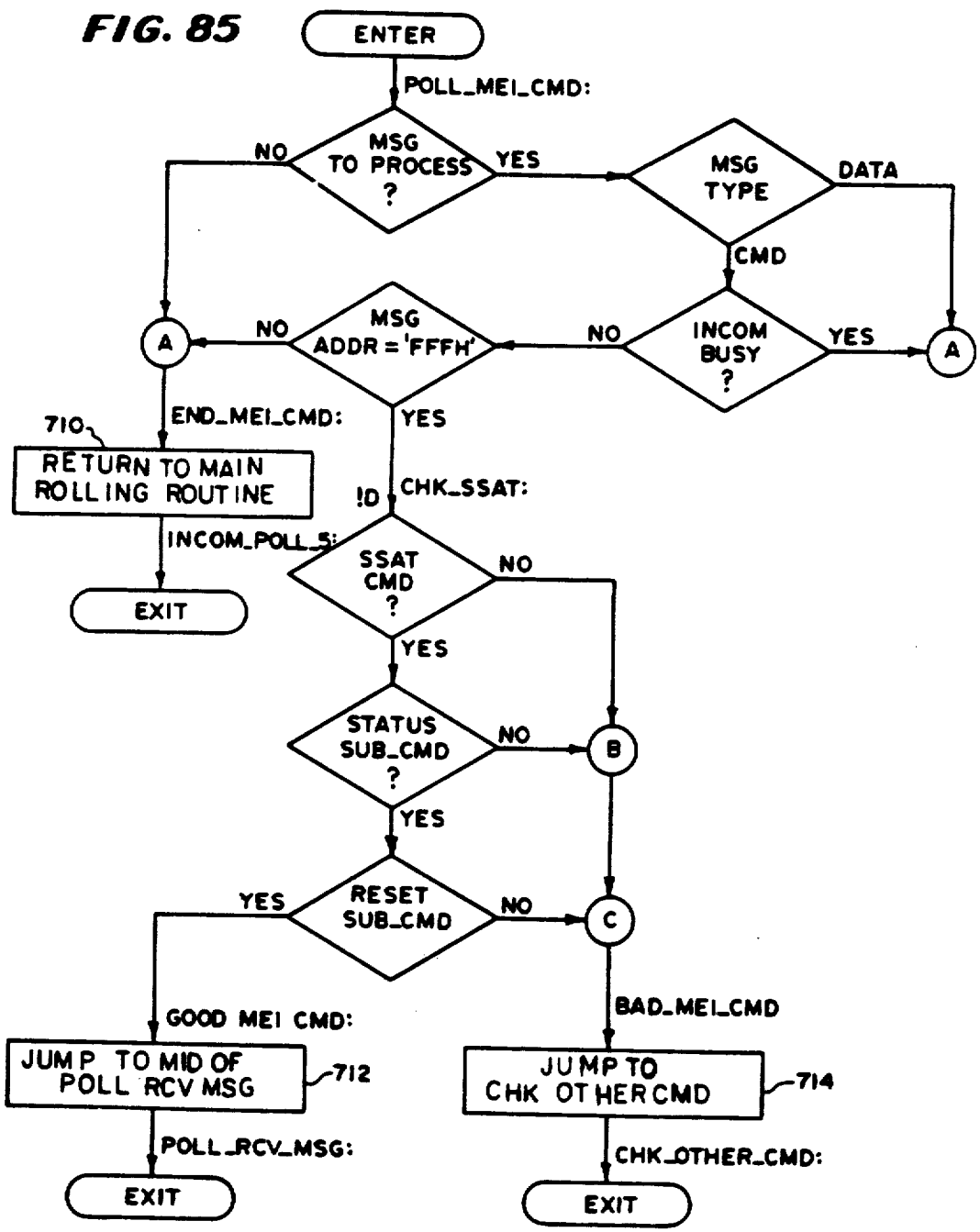
FIG. 85 is a detailed flow chart of the POLL-MEI-CMD routine which is the main polling loop of the master/INCOM program.

Considering now the detailed flow charts of the routines which are polled during the main polling loop of the master/INCOM configuration, it can be seen from FIG. 61 that four of these routines (indicated by asterisks) are common to the master/product configuration. The first routine which is used only in the master/INCOM configuration is the POLL-MEI-CMD routine which is shown in FIG. 85. Considered generally, this routine processes commands directed to the MEI card (address=FFFH) rather than the INCOM network. The only valid commands are SSAT-RESET and SSAT-STATUS. This routine test for a command from the RS232 port to the MEI card rather than to the INCOM network. Referring to this figure, if there is no message to process the block 710 returns the routine to the main polling routine of FIG. 61. On the other hand, if a message is in process, the message is a command type, the INCOM is not busy, the address is FFFH, the command is SSAT, and the subcommand is STATUS or RESET, the block 712 jumps to the middle of the routine POLL-RCV-MSG of the master/product configuration (we should probably give the figure No.). If the command meets one of these requirements, a bad MEI command is indicated and the block 714 jumps to the CHK-OTHER-CMD: point of the POLL-RCV-MSG routine.

Figure 86:
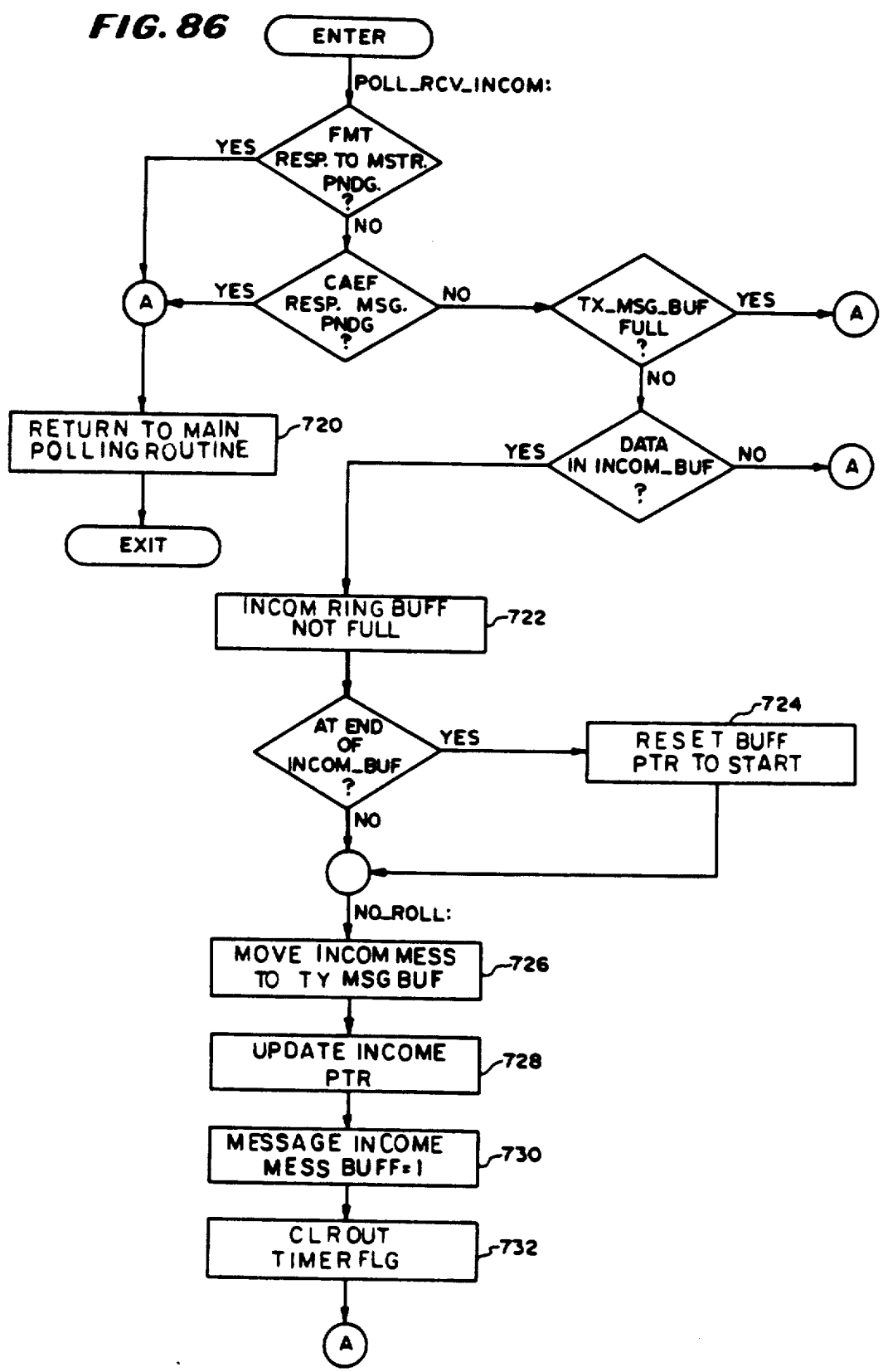
FIG. 86 is a detailed flow chart of the POLL-RCV-INCOM routine which is in the main polling loop of the master/INCOM program.

The POLL-RCV-INCOM routine, which is the next routine in the main polling loop of the master/INCOM configuration which is not common to the master/product configuration, is shown in FIG. 86. Considered generally, this routine processes an INCOM message from the INCOM input holding buffer, INCOM-BUF to the output buffer, TX-MSG-BUF. Referring to FIG. 86, if the format response to the RS232 master is pending the block 720 returns to the main polling routine. This is also true if a CAEF message is pending. If neither of these messages is pending, the transmit message buffer is not full and there is data in the INCOM buffer, the block 722 designates the INCOM ring buffer not full, BUF-FLG=0. If the INCOM buffer is empty the block 724 resets the buffer pointer to the start of the buffer, less 1. If the INCOM buffer is not empty the block 726 moves an INCOM network message from INCOM-BUF to the RS232 three byte output buffer, TX-MSG-BUF, and defines the command/data flag, TX-MSG-FLG. The block 728 updates the pointers for the INCOM buffer, the block 730 designates the message in the transmit message buffer via TX-MBUF-FLG=1, and the block 732 clears the time out flag, TIMER-FLG, to prevent a time out error.

Figure 87:
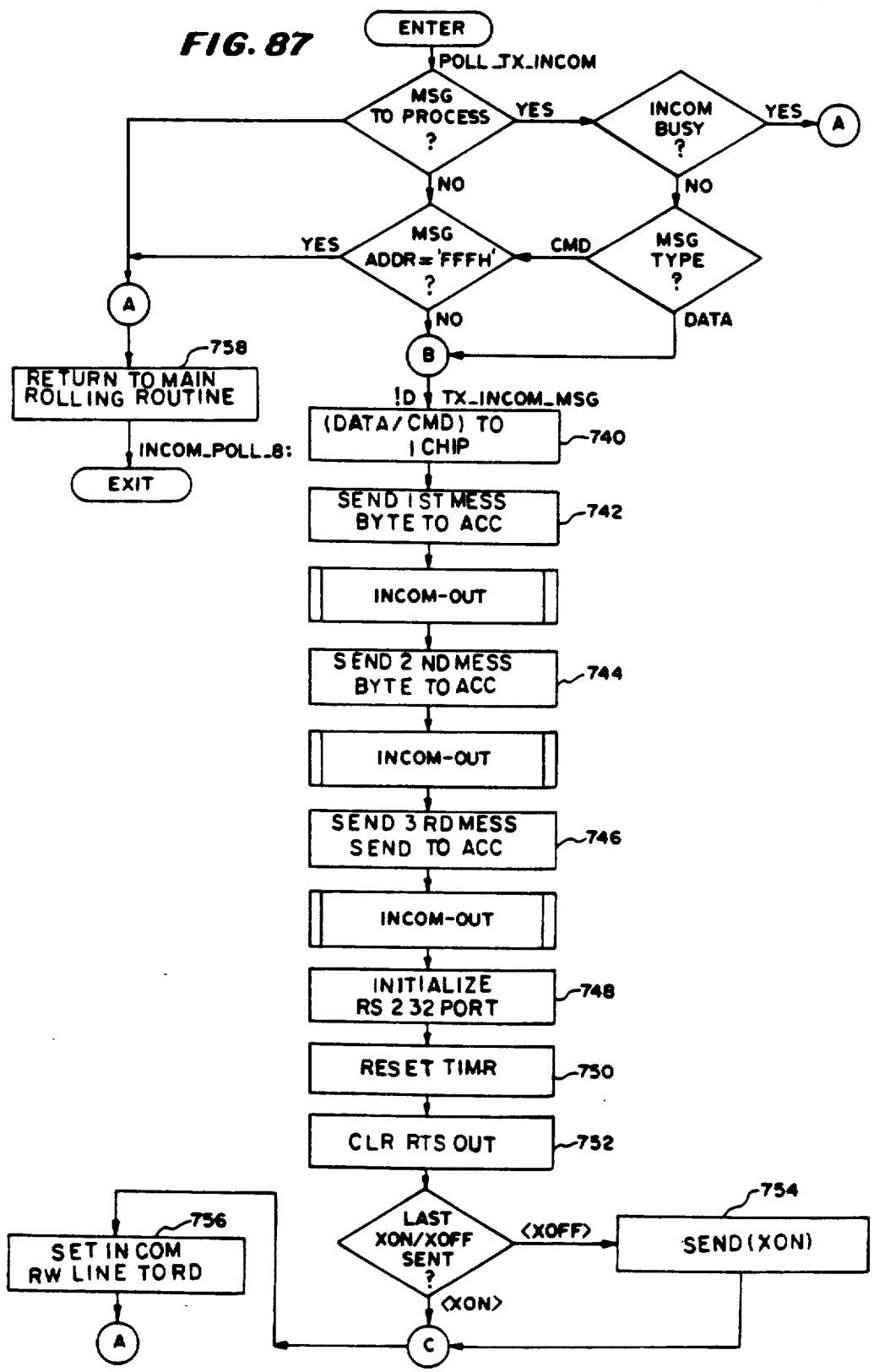
FIG. 87 is a detailed flow chart of the POLL-TX-INCOM routine which is in the main polling loop of the master/INCOM program.

The next routine in the main polling loop of the master/INCOM configuration is the POLL-TX-INCOM routine which is shown in FIG. 87. In general, this routine moves the RS232 input message in the INCOM formatted buffer to the INCOM chip for sending out on the INCOM network. Referring to FIG. 87 if a message is in process and the INCOM chip is not busy the block 740 sends the message bit (DATA/CMD) to the INCOM chip, and the block 742 sends the first message byte to the accumulator. The INCOM-OUT subroutine is then employed to move a message byte from the 8051 of the INCOM chip, as described in more detail hereinafter. The second message byte is then sent to the accumulator by the block 744 and after this has been moved to the INCOM chip the block 746 moves the third message byte to the accumulator. After this third byte is moved to the INCOM chip the block 748 initializes the RS232 port so it can accept another message, the block 750 resets the timeout timer to wait for an INCOM response, and the block 752 clears RTS-OUT, RS232 hardware, allowing the master to restart transmitting. If an XOFF was last sent the block 754 sends [XON] the RS232 software restart transmitting. The block 756 sets the INCOM RW line to the read state. If no message is in process or the address is FFFH the block 758 returns to the main polling routine of the master/INCOM configuration.

Figure 88:
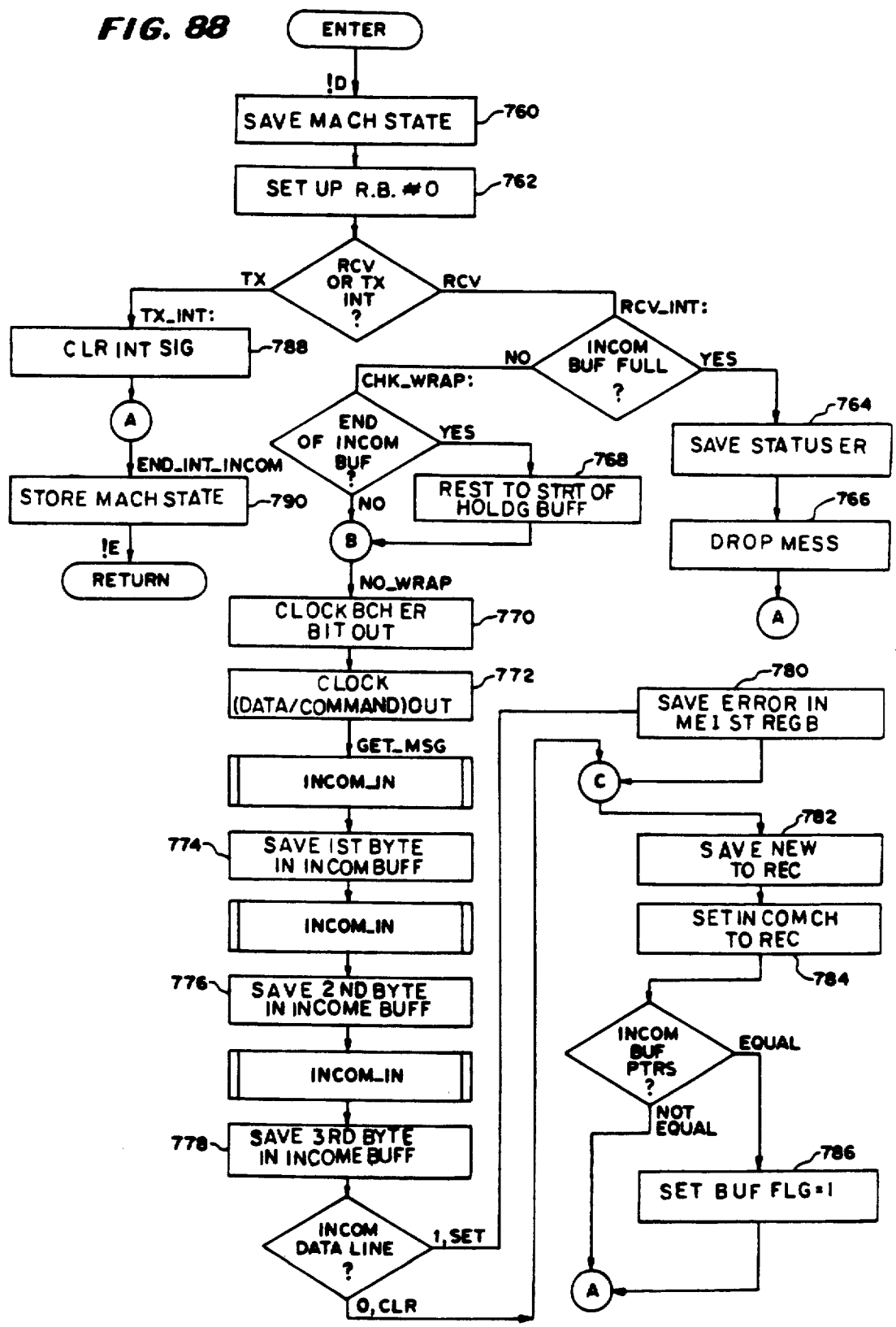
FIG. 88 is a detailed flow chart of the INT-INCOM subroutine used in the master/INCOM program.

As discussed generally heretofore, the %INT-INCOM routine processes INCOM messages received from the network. More specifically, this routine takes an INCOM message from the INCOM chip 36 after an interrupt occurs and stores it in the INCOM holding buffer, INCOM-BUF. This routine is shown in FIG. 88. Referring to this figure, the machine state of the 8051 is saved by the block 760 and the block 762 sets up to use register bank #0. If a receive interrupt occurs and the INCOM holding buffer is full, the block 764 saves a status error and the block 766 drops the message by clocking out of the INCOM chip. If the program is at the end of the ring INCOM holding buffer the block 768 resets to the start of the holding buffer. The block 770 clocks the BCH error bit out of the INCOM chip and saves it, the block 772 clocks a message type bit (DATA/COMMAND) out of the INCOM chip and saves it in the holding buffer, and the INCOM-IN routine described in more detail hereinafter is called. Returning from this routine, the block 774 saves the first byte of the message in the INCOM buffer, the block 776 saves the second byte of the message in the INCOM buffer and the block 778 saves the third byte in this message. If the INCOM data line is set the block 780 saves an error in the MEI status register B. If the INCOM data line is low, the block 782 saves new pointers to valid messages, saved in the INCOM holding buffer, and the block 784 sets up the INCOM chip to receive a new message. If the INCOM holding buffer pointers are equal the block 786 sets the BUF-FLG=1 to designate the INCOM holding buffer is full. If a TX interrupt occurs the block 788 clears the interrupt signal from the INCOM chip and the block 790 stores the machine state of the 8051.

Figure 89:
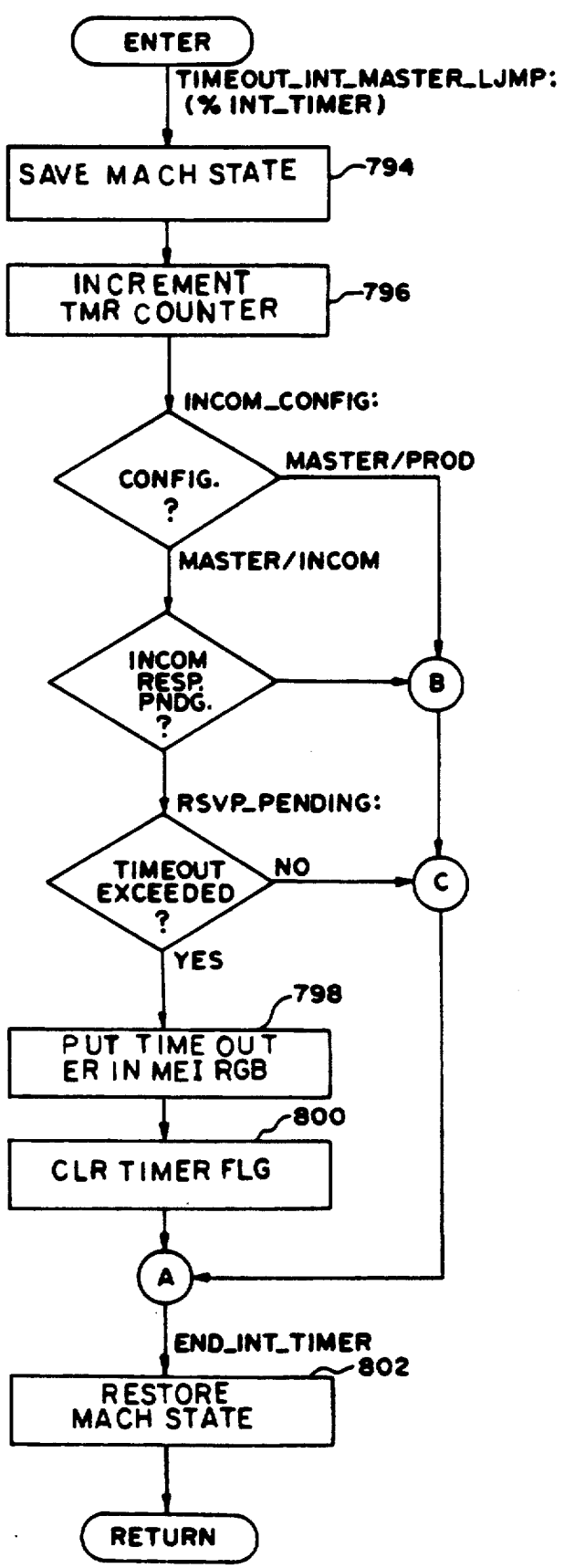
FIG. 89 is a detailed flow chart of the INT-TIMER interrupt routine which is used in the master/INCOM program.

As discussed generally heretofore, the %INIT-TIMER routine is a time out interrupt which checks for a response to a request on the INCOM network. An error flag is set if the response from the INCOM network is not received after a command request to it, within a given time period. This routine is shown in FIG. 89. Referring to this figure, the machine state of the 8051 is saved in the block 794 and the block 796 increments the timer counter, TIMER-CTR. If a master/INCOM configuration is found, a response from the INCOM network is pending and time out has been exceeded, the block 798 produces a time out error and sets it in the MEI status register B. The block 800 clears the TIMER-FLG to designate no response pending and the block 802 restores the machine state of the 8051.

As discussed generally heretofore, the master/INCOM configuration employs an INCOM-IN subroutine to clock a data byte from the INCOM chip into the microcontroller 38. This subroutine is shown in FIG. 90. Referring to this figure the block 810 sets the loop counter to 8, the block 812 clocks an INCOM bit into carry, the block 814 moves the carry bit into the accumulator and the block 816 decrements the loop counter.

The INCOM-OUT subroutine, shown on FIG. 81 clocks the data bytes from the microcontroller 38 to the INCOM chip 36. Referring to this figure the loop counter is set to 8 by the block 820, the block 822 rotates the accumulator bit into carry and onto the INCOM data line, the block 824 clocks the data line into the INCOM chip and the block 826 decrements the loop counter.

While there have been illustrated and described several embodiments of the present invention, it will be apparent that various changes and modifications thereof will occur to those skilled in the art. It is intended in the appended claims to cover all such changes and modifications as fall within the true spirit and scope of the present invention.

What is claimed and desired to be secured by Letters Patent is:

1. In a bidirectional communication and control network which includes a common link over which messages are transmitted in a specific message format and a hardware-based digital IC coupled to said common link for receiving messages from and transmitting messages to said link in said specific format, the combination of a multiconductor cable, a microcontroller connected to said digital IC for receiving messages from and transmitting messages to said digital IC, a controlled product interconnected with said microcontroller through said multiconductor cable, said multiconductor cable including a conductor for transmitting data between said microcontroller and said controlled product in a serial data format and a control line, means in said controlled product for producing a control signal on said control line requesting transfer of data in said serial format on said conductor, and means in said microcontroller and responsive to said control signal for transmitting messages to and receiving messages from said controlled product over said conductor in said serial data format.

* * * * *